US012073787B2

(12) United States Patent
Wang et al.

(10) Patent No.: US 12,073,787 B2
(45) Date of Patent: Aug. 27, 2024

(54) DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Rui Wang, Beijing (CN); Haijun Qiu, Beijing (CN); Fei Shang, Beijing (CN); Ming Hu, Beijing (CN); Shaoru Li, Beijing (CN); Minho Ko, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/320,042

(22) Filed: May 18, 2023

(65) Prior Publication Data

US 2023/0290310 A1 Sep. 14, 2023

Related U.S. Application Data

(63) Continuation-in-part of application No. 17/763,598, filed as application No. PCT/CN2021/087044 on Apr. 13, 2021, now Pat. No. 11,688,348.

(30) Foreign Application Priority Data

May 29, 2020 (CN) ........................ 202010479787.X

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01);
(Continued)

(58) Field of Classification Search
CPC ............... G09G 3/3258; G09G 3/3233; G09G 2300/0426; G09G 2300/0842;
(Continued)

(56) References Cited

U.S. PATENT DOCUMENTS 10,249,242 B2 4/2019 Wu et al.
10,373,557 B2 * 8/2019 Zhu ...................... G09G 3/3233
(Continued)

FOREIGN PATENT DOCUMENTS

CN 104658484 A 5/2015
CN 106128360 A 11/2016
(Continued)

OTHER PUBLICATIONS

First Office Action for Chinese Patent Application No. 202010479787.X issued by the Chinese Patent Office on Jan. 19, 2021.
(Continued)

*Primary Examiner* — Tom V Sheng
(74) *Attorney, Agent, or Firm* — IP&T GROUP LLP

(57) ABSTRACT

A display panel includes pixel circuits, and the pixel circuit includes: a driving sub-circuit, a fourth sub-circuit and a first reset sub-circuit. The driving sub-circuit includes a driving transistor and a storage capacitor. The driving transistor includes a gate and an active pattern including a source portion and a drain portion. The storage capacitor includes a first storage electrode sharing a same electrode with the gate and a second storage electrode used to be connected to a first voltage signal line. The fourth sub-circuit is configured such that the drain portion and the gate are connected when being turned on. The first reset sub-circuit includes a first active pattern, which is arranged in a same layer as the active pattern and includes a first source portion being used to be connected to a first initialization signal line and a first drain portion being connected to the drain portion.

20 Claims, 70 Drawing Sheets

(52) U.S. Cl.
CPC ................. *G09G 2310/061* (2013.01); *G09G 2320/0233* (2013.01); *G09G 2320/0247* (2013.01)

(58) Field of Classification Search
CPC ..... G09G 2300/0819; G09G 2310/061; G09G 2310/0251; G09G 2320/043; G09G 2320/0233; G09G 2320/045; G09G 2320/0247
USPC .......................................................... 345/204
See application file for complete search history.

(56) References Cited

U.S. PATENT DOCUMENTS

| | | | | |
|---|---|---|---|---|
| 10,535,300 | B2 | 1/2020 | Kim et al. | |
| 10,535,306 | B2 | 1/2020 | Yang et al. | |
| 10,657,894 | B2 * | 5/2020 | Peng | G09G 3/3233 |
| 10,672,345 | B2 | 6/2020 | Xiang et al. | |
| 10,796,625 | B2 * | 10/2020 | Zhou | G09G 3/22 |
| 11,244,611 | B2 * | 2/2022 | Yang | G09G 3/3233 |
| 2006/0244688 | A1 | 11/2006 | Ahn et al. | |
| 2014/0111503 | A1 * | 4/2014 | Kwon | G09G 3/3233 345/82 |
| 2016/0140900 | A1 * | 5/2016 | Yang | G09G 3/3258 345/206 |
| 2016/0275854 | A1 | 9/2016 | Wang et al. | |
| 2016/0351121 | A1 | 12/2016 | Kim et al. | |
| 2017/0124941 | A1 | 5/2017 | Na et al. | |
| 2017/0221418 | A1 | 8/2017 | Xiang et al. | |
| 2017/0221420 | A1 | 8/2017 | Zhu | |
| 2017/0249903 | A1 | 8/2017 | Xiang et al. | |
| 2017/0270853 | A1 * | 9/2017 | Xiang | G09G 3/3258 |
| 2018/0047337 | A1 * | 2/2018 | Zhu | G09G 3/3233 |
| 2018/0197458 | A1 * | 7/2018 | Xi | G09G 3/30 |
| 2018/0308427 | A1 | 10/2018 | Zhang et al. | |
| 2018/0315374 | A1 | 11/2018 | Zhang et al. | |
| 2019/0266943 | A1 | 8/2019 | Gao et al. | |
| 2019/0371238 | A1 * | 12/2019 | Gao | H10K 59/131 |
| 2020/0410926 | A1 * | 12/2020 | Li | G09G 3/325 |
| 2021/0012713 | A1 | 1/2021 | Dong | |
| 2021/0118361 | A1 | 4/2021 | Li | |
| 2021/0366362 | A1 | 11/2021 | Xuan et al. | |
| 2021/0375209 | A1 * | 12/2021 | Han | G09G 3/3258 |
| 2021/0407390 | A1 | 12/2021 | Li et al. | |
| 2022/0343852 | A1 | 10/2022 | Wang et al. | |

FOREIGN PATENT DOCUMENTS

| | | | |
|---|---|---|---|
| CN | 106531076 | A | 3/2017 |
| CN | 106910468 | A | 6/2017 |
| CN | 109087610 | A | 12/2018 |
| CN | 110223636 | A | 9/2019 |
| CN | 111508426 | A | 8/2020 |

OTHER PUBLICATIONS

Second Office Action for Chinese Patent Application No. 202010479787.X issued by the Chinese Patent Office on Jul. 27, 2021.

Notice of Allowance for U.S. Appl. No. 17/763,598 issued by the United States Patent and Trademark Office on Feb. 13, 2023.

International Search Report and Written Opinion for Chinese patent Application No. PCT/CN2021/087044 issued by the International Searching Authority (Chinese patent Office) on Jun. 23, 2021.

* cited by examiner

DISPLAY PANEL

CROSS-REFERENCE TO RELATED APPLICATIONS

This application is a continuation-in-part of U.S. patent application Ser. No. 17/763,598, filed on Mar. 24, 2022, which claims priority to International Patent Application No. PCT/CN2021/087044, filed on Apr. 13, 2021, which in turn claims priority to Chinese Patent Application No. 202010479787.X, filed on May 29, 2020, which are incorporated herein by reference in their entirety.

TECHNICAL FIELD

The present disclosure relates to the field of display technologies, and in particular, to a display panel.

BACKGROUND

With the development of display technologies, self-luminous display apparatuses such as organic light-emitting diode (OLED) display apparatuses, micro light-emitting diode (micro LED) display apparatuses, and mini light-emitting diode (mini LED) display is apparatuses have broad development prospects due to their characteristics such as self-luminous, high contrast, low energy consumption, wide viewing angle, and fast response speed.

SUMMARY

In an aspect, a display panel is provided in some embodiments of the present disclosure. The display panel includes a plurality of pixel circuits, and a pixel circuit in the plurality of pixel circuits includes: a driving sub-circuit, a fourth sub-circuit and a first reset sub-circuit. The driving sub-circuit includes a driving transistor and a storage capacitor. The driving transistor includes a gate and an active pattern, the active pattern includes a source portion and a drain portion. The storage capacitor includes a first storage electrode and a second storage electrode, the first storage electrode and the gate share a same electrode, and the second storage electrode is used to be connected to a first voltage signal line. The fourth sub-circuit is configured such that the drain portion and the gate are connected when the fourth sub-circuit is turned on. The first reset sub-circuit includes a first active pattern; the first active pattern is arranged in a same layer as the active pattern, and the first active pattern includes a first source portion and a first drain portion; the first drain portion is connected to the drain portion, and the first source portion is used to be connected to a first initialization signal line.

In some embodiments, the fourth sub-circuit includes a sixth transistor, the sixth transistor includes a sixth active pattern, and a material of the sixth active pattern includes an oxide semiconductor material.

In some embodiments, the pixel circuit further includes a third sub-circuit, and the third sub-circuit includes a fifth transistor; the fifth transistor includes a fifth active pattern, and the fifth active pattern includes a fifth source portion and a fifth drain portion; the fifth drain portion and the source portion are connected to be a one-piece structure, and the fifth source portion is used to be connected to a data line.

In some embodiments, the fifth transistor further includes a fifth gate, and the sixth transistor further includes a sixth gate; portions of two different scanning lines serve as the fifth gate and the sixth gate, respectively, and one of the two different scanning is lines, a portion of which serves as the fifth gate, is arranged in the same layer as the gate, and another of the two different scanning lines, a portion of which serves as the sixth gate, is located in a different layer from the gate. Alternatively, the fifth transistor further includes the fifth gate, and the sixth transistor further includes a sixth bottom gate and a sixth top gate; portions of two scanning lines serve as the sixth bottom gate and the sixth top gate, respectively, and the two scanning lines are located in different layers; a portion of another scanning line serves as the fifth gate, and the another scanning line is arranged in the same layer as the gate and in a different layer from the two scanning lines.

In some embodiments, the display panel further includes a first connection layer. The first connection layer includes a first connection electrode; the sixth active pattern includes a sixth source portion and a sixth drain portion; the sixth drain portion is electrically connected to the gate through the first connection electrode, and the sixth source portion is electrically connected to the drain portion. The first connection electrode, the gate and the second storage electrode are located in different layers.

In some embodiments, the second storage electrode is located between the gate and the first connection electrode in a thickness direction of the display panel. The second storage electrode includes an opening, and the opening overlaps with a portion, connected to the gate in the thickness direction of the display panel, of the first connection electrode.

In some embodiments, the display panel further includes a first connection layer. The first connection layer includes a second connection electrode; the first drain portion and the drain portion are electrically connected through the second connection electrode. The second connection electrode, the gate and the second storage electrode are located in different layers.

In some embodiments, the first initialization signal line is located in the first connection layer. The first transistor further includes a first gate; a portion of a first reset signal line serves as the first gate, and the first reset signal line is arranged in a same layer as the gate. Extending directions of the first reset signal line and the first initialization signal line are approximately same.

In some embodiments, the pixel circuit further includes a second sub-circuit, and the second sub-circuit includes a fourth transistor. The fourth transistor includes a fourth is active pattern, and the fourth active pattern includes a fourth source portion and a fourth drain portion; the fourth source portion and the drain portion are connected to be a one-piece structure, and the fourth drain portion is used to be connected to a light-emitting device.

In some embodiments, the pixel circuit further includes a first sub-circuit, and the first sub-circuit includes a third transistor; the third transistor includes a third active pattern, and the third active pattern includes a third source portion and a third drain portion; the third drain portion and the source portion are connected to be a one-piece structure. The first connection layer further includes a third connection electrode, and the third source portion and the second storage electrode are electrically connected through the third connection electrode.

In some embodiments, the display panel further includes a second connection layer, and the first voltage signal line and the data line are located in the second connection layer. The fourth sub-circuit includes a sixth transistor, and the sixth transistor includes a sixth active pattern; the sixth active pattern is located in a different layer from both the active pattern and the fifth active pattern, and a material of the sixth active pattern includes an oxide semiconductor material. The first connection layer further includes a first connection electrode; the sixth active pattern includes a sixth source portion and a sixth drain portion; the sixth drain portion is electrically connected to the gate through the first connection electrode, and the sixth source portion is electrically connected to the drain portion. A layer where the gate is located, a layer where the second storage electrode is located, the first connection layer and the second connection layer are sequentially arranged along a thickness direction of the display panel; the first voltage signal line covers the first connection electrode in the thickness direction of the display panel.

In some embodiments, the fourth transistor further includes a fourth gate, and the third transistor further includes a third gate. Two portions of a same enable signal line serve as the third gate and the fourth gate, respectively, and the enable signal line is arranged in a same layer as the gate; or two portions of two different enable signal lines serve as the third gate and the fourth gate, respectively.

In some embodiments, the pixel circuit further includes a plurality of light-emitting is devices, and the light-emitting device is one of the plurality of light-emitting devices. The pixel circuit further includes a second reset sub-circuit, and the second reset sub-circuit includes a second transistor; the second transistor includes a second active pattern, and the second active pattern includes a second source portion and a second drain portion; the second drain portion and the fourth drain portion are connected to be a one-piece structure. The first connection layer further includes a second initialization signal line, and the second initialization signal line is electrically connected to the second source portion.

In some embodiments, the second transistor further includes a second gate, and a portion of a second reset signal line serves as the second gate. Extending directions of the second reset signal line and the second initialization signal line are substantially same.

In some embodiments, in two pixel circuits that are adjacent in a column direction, a second gate of a second transistor in a former pixel circuit and a first gate of a first transistor in a latter pixel circuit are connected to a same reset signal line.

In some embodiments, the pixel circuit further includes a second reset sub-circuit and a third reset sub-circuit. The second reset sub-circuit includes a second transistor, and the second transistor includes a second active pattern; the second active pattern includes a second source portion and a second drain portion; the second drain portion and the fourth drain portion are connected to be a one-piece structure, and the second source portion is used to be connected to a third initialization signal line. The third reset sub-circuit includes a tenth transistor, and the tenth transistor includes a tenth active pattern; the tenth active pattern is arranged in a same layer as the second active pattern; the tenth active pattern includes a tenth source portion and a tenth drain portion. The first connection layer further includes a fourth connection electrode; the tenth drain portion and the third drain portion are electrically connected through the fourth connection electrode, and the tenth source portion is used to be connected to a fourth initialization signal line.

In some embodiments, the display panel further includes a connection line layer. The third initialization signal line and the fourth initialization signal line are located in the connection line layer, and a layer where the gate is located, a layer where the second storage electrode is located, the connection line layer and the first connection layer are sequentially arranged along a thickness direction of the display panel. The first connection is layer further includes a fifth connection electrode and a sixth connection electrode; the second source portion is electrically connected to the third initialization signal line through the sixth connection electrode, and the tenth source portion is electrically connected to the fourth initialization signal line through the fifth connection electrode.

In some embodiments, the first initialization signal line and the second storage electrode are arranged in the same layer. The first connection layer further includes a plurality of seventh connection electrodes and a plurality of eighth connection trances; two first source portions in two adjacent pixel circuits in a same row of pixel circuits are electrically connected to the first initialization signal line through a seventh connection electrode in the plurality of seventh connection electrodes; an extending direction of an eighth connection trace in the plurality of eighth connection trances intersects an extending direction of the seventh connection electrode, and both the seventh connection electrode and the third initialization signal line are electrically connected to the eighth connection trace.

In some embodiments, the second transistor further includes a second gate, and the tenth transistor further includes a tenth gate. Two portions of a same reset signal line serve as the second gate and the tenth gate, respectively, and the reset signal line is in a same layer as the gate.

In some embodiments, the display panel further includes a shielding layer. The shielding layer is located at a side of the first storage electrode away from the second storage electrode. The shielding layer includes a first shielding portion and a second shielding portion; the first shielding portion overlaps with the second storage electrode in a thickness direction of the display panel, and the second shielding portion overlaps with a portion, electrically connected to the drain portion in the thickness direction of the display panel, of the second connection electrode.

In some embodiments, two second storage electrodes in two pixel circuits that are adjacent in a row direction are connected by a connection trace, and the connection trace is arranged in a same layer as the two second storage electrodes.

BRIEF DESCRIPTION OF THE DRAWINGS

In order to describe technical solutions in the present disclosure more clearly, accompanying drawings to be used in some embodiments of the present disclosure will is be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products, actual processes of methods and actual timings of signals involved in the embodiments of the present disclosure.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, is the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "connected" may be used. For example, the term "connected" may be used in the description of some embodiments to indicate that two or more components are in direct physical contact or electrical contact with each other.

Figure 1A:
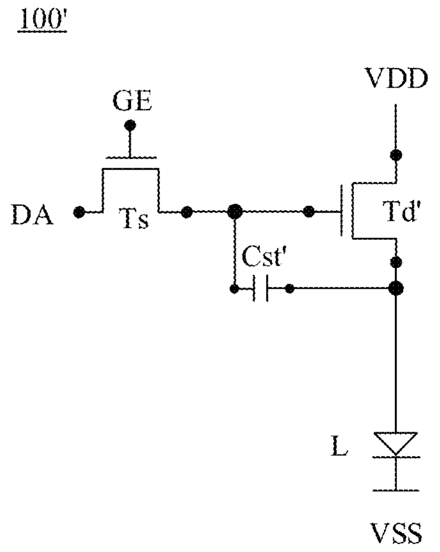
FIG. 1A is a structural diagram of a driving circuit provided in the related art.

Light-emitting diodes (e.g., organic light-emitting diodes) are current-driven type devices. FIG. 1A shows a driving circuit 100' for driving a light-emitting diode L in the related art, and the driving circuit 100' is composed of a driving transistor Td', a switching transistor Ts and a storage capacitor Cst'. When the driving circuit 100' drives the light-emitting diode L to emit light, a gate of the switching transistor Ts receives a scanning signal from a scanning signal terminal GE, so that the switching transistor Ts is turned on. A data signal of a data signal terminal DA is transmitted to a gate of the driving transistor Td' through the switching transistor Ts, and the driving transistor Td' is turned on, which makes a first voltage terminal VDD, the light-emitting diode L, and a second voltage terminal VSS communicate, so that a driving current generated by the driving transistor is Td' drives the light-emitting diode L to emit light. In this process, the data signal of the data signal terminal DA charges the storage capacitor Cst' connected to the turned-on switching transistor Ts, and electric energy stored in the storage capacitor Cst' keeps the driving transistor Td' turned on for time required for displaying an image frame.

A formula of a saturation current of a driving transistor is:

$$I=K(Vgs-Vth)^2 \tag{1}$$

Here, K is a coefficient related to characteristics of the driving transistor, Vgs is a gate-source voltage of the driving transistor, and Vth is a threshold voltage of the driving transistor.

In a display apparatus, the display apparatus usually includes a plurality of light-emitting diodes L, and correspondingly, there are a plurality of driving circuits for driving the plurality of light-emitting diodes L to emit light.

Due to difference in process, temperature, device aging, etc., a threshold voltage Vth of the driving transistor Td' may drift, which causes the driving current provided by the driving transistor Td' to the light-emitting diode L to deviate from a target current value. Since threshold voltages Vth of driving transistors Td' in different driving circuits may be different, brightness of the light-emitting diodes L may be different, which causes non-uniform display of the display apparatus.

Figure 1B:
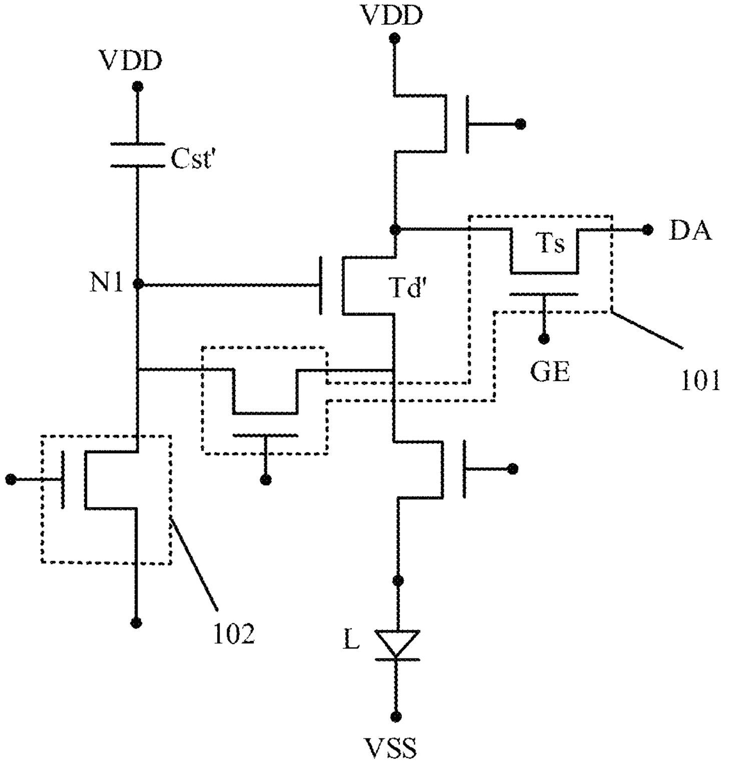
FIG. 1B is a structural diagram of another driving circuit provided in the related art.

In order to improve effect of the drift of the threshold voltage Vth of the driving transistor Td', as shown in FIG. 1B, a threshold voltage compensation sub-circuit 101 is added to the driving circuit shown in FIG. 1A, so as to compensate the threshold voltage Vth of the driving transistor Td' before the driving circuit drives the light-emitting diode L to emit light, thereby eliminating effect of the drift of the threshold voltage Vth on the display apparatus.

In addition, after an image frame is displayed and before a next image frame is displayed, there may be a residual voltage at the gate of the driving transistor Td'. In order to eliminate an effect of the residual voltage of the image frame on the next image frame, as shown in FIG. 1B, the driving circuit further includes a reset sub-circuit 102 to reset the gate of the driving transistor Td' before the next image frame is displayed.

In the related art, as shown in FIG. 1B, the threshold voltage compensation sub-circuit 101 and the reset sub-circuit 102 are electrically connected to a first node N1 (i.e., is the gate of the driving transistor Td'), resulting in a voltage of the first node N1 being affected by transistors in the threshold voltage compensation sub-circuit 101 and the reset sub-circuit 102. The threshold voltage compensation sub-circuit 101 and the reset sub-circuit 102 each include at least one transistor, and a transistor has a leakage current, which affects the voltage of the first node N1, resulting in a change in the gate-source voltage of the driving transistor Td'. It can be seen from the formula (1) that, the driving current may change due to the change in the gate-source voltage of the driving transistor Td', which causes a change in brightness of the light-emitting diode L, resulting in flicker phenomenon in an image displayed on the display apparatus.

In the related art, test results of the flicker phenomenon are shown in Table 1.

TABLE 1

| Flicker phenomenon | | | | | | | |
|---|---|---|---|---|---|---|---|
| Display | Driving frequency (Hz) | | | | | | |
| apparatus | 60 | 50 | 40 | 30 | 20 | 15 | 7.5 |
| M1 | None | None | Yes (L1) | Yes (L2) | Yes (L3) | Yes (abnormal scrolling display) | Yes (severe abnormal scrolling display) |
| M2 | None | None | Yes (L1) | Yes (L2) | Yes (L3) | Yes (abnormal scrolling display) | Yes (severe abnormal scrolling display) |

As shown in Table 1, in a case where display apparatuses are driven at a low driving frequency (e.g., less than 40 Hz), both the display apparatus M1 and the display apparatus M2 have the flicker phenomenon. As the driving frequency decreases, the flicker phenomenon becomes more serious. For example, when the driving frequency is 40 Hz, the flicker phenomenon is at level one (L1), and when the driving frequency is 20 Hz, the flicker phenomenon is at level three (L3); when the driving frequency is 15 Hz, the display apparatuses display abnormal scrolling, and when the driving frequency is 7.5 Hz, the display apparatuses display serious abnormal scrolling.

Figure 1C:
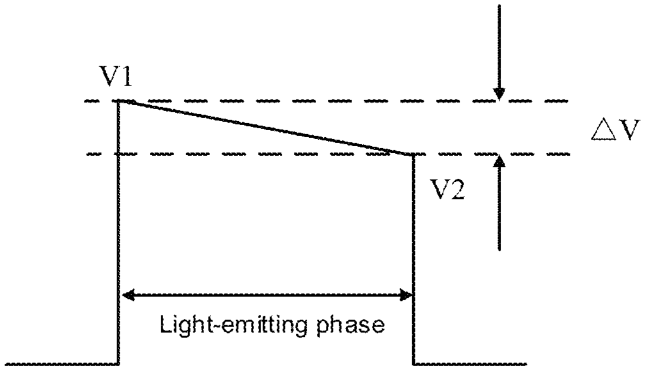
FIG. 1C is a schematic diagram showing a change in a voltage of a gate of a driving transistor in a driving circuit provided in the related art.

A reason for the flicker phenomenon is as the follows. As shown in FIG. 1C, the voltage of the first node N1 is V1 at a start of a light-emitting phase; during the light-emitting phase, the transistors in the threshold voltage compensation sub-circuit 101 and the reset sub-circuit 102 are in an off state; and due to leakage currents of the transistors, the voltage of the first node N1 continuously changes in the light-emitting phase. The voltage on the first node N1 is V2 at an end of the light-emitting phase; and during the is light-emitting phase, a change amount of the voltage of the first node N1 is ΔV. The smaller the driving frequency, the longer the time of an image frame. The larger the ΔV, the more serious the change in the brightness of the light-emitting diode LED, and thus the more serious the flicker phenomenon.

Figure 2:
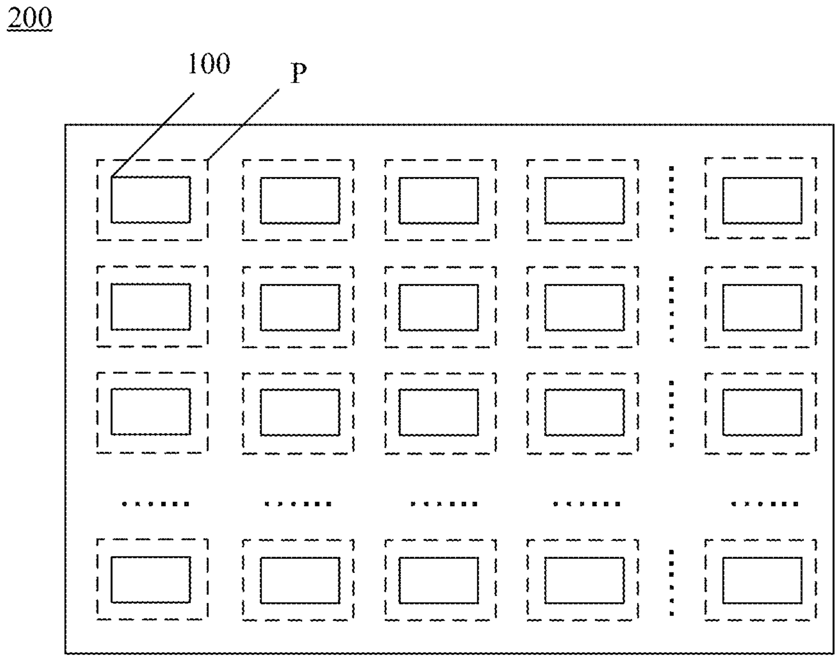
FIG. 2 is a top view showing a structure of a display panel provided in embodiments of the present disclosure.

Some embodiments of the present disclosure provide a display panel. As shown in FIG. 2, the display panel 200 includes a plurality of pixel circuits 100.

In some embodiments, as shown in FIG. 2, the display panel 200 has a plurality of sub-pixel regions P arranged in an array, and each sub-pixel region P is provided with a pixel circuit 100.

Figure 3A:
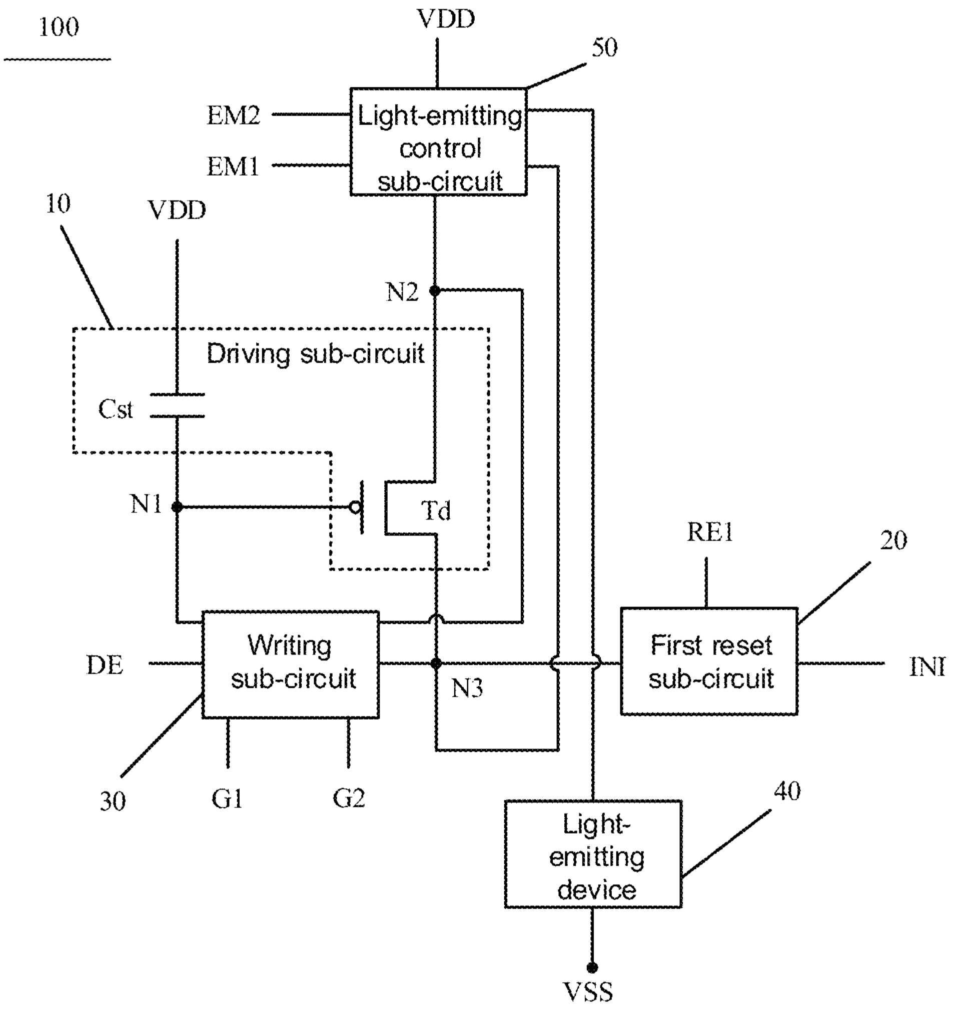
FIG. 3A is a structural diagram of a pixel circuit provided in embodiments of the present disclosure.

As shown in FIG. 3A, the pixel circuit 100 provided in some embodiments of the present disclosure includes: a driving sub-circuit 10, a first reset sub-circuit 20, a writing sub-circuit 30, a light-emitting device 40 and a light-emitting control sub-circuit 50.

The driving sub-circuit 10 includes a driving transistor Td and a storage capacitor Cst. A gate of the driving transistor Td is connected to a first node N1, a first electrode of the driving transistor Td is connected to a second node N2, and a second electrode of the driving transistor Td is connected to a third node N3. The storage capacitor Cst includes a first storage electrode and a second storage electrode, the first storage electrode is connected to the first node N1, and the second storage electrode is connected to a first voltage terminal VDD.

The driving transistor Td is a transistor that supplies a current to the light-emitting device 40. A width-to-length ratio of the driving transistor Td is greater than a width-to-length ratio of a transistor for switching.

The first reset sub-circuit 20 is connected to at least the third node N3, a first reset signal terminal RE1 and an initialization signal terminal INI. The first reset signal terminal RE1 is configured to receive a first reset signal and transmit the first reset signal to the first reset sub-circuit 20. The initialization signal terminal INI is configured to receive an initialization signal and transmit the initialization signal to the first reset sub-circuit 20.

The first reset sub-circuit 20 is configured to, in an initialization phase, transmit is the initialization signal from the initialization signal terminal INI to the third node N3 under control of at least the first reset signal received at the first reset signal terminal RE1.

The writing sub-circuit 30 is connected to a first scanning terminal G1, a second scanning terminal G2, a data terminal DE, the first node N1, the second node N2 and the third node N3. The first scanning terminal G1 is configured to receive a first scanning signal and transmit the first scanning signal to the writing sub-circuit 30. The second scanning terminal G2 is configured to receive a second scanning signal and transmit the second scanning signal to the writing sub-circuit 30. The data terminal DE is configured to receive a data signal and transmit the data signal to the writing sub-circuit 30.

The writing sub-circuit 30 is configured to: in the initialization phase, under control of the first scanning signal received at the first scanning terminal G1, transmit the initialization signal at the third node N3 to the first node N1, so as to reset the first node N1; and in a data writing phase, under the control of the first scanning signal received at the first scanning terminal G1 and control of the second scanning signal received at the second scanning terminal G2, write the data signal received at the data terminal DE into the first node N1 and perform threshold voltage compensation on the driving transistor Td.

The light-emitting device 40 includes an anode and a cathode, and the cathode is connected to a second voltage terminal VSS. For example, the light-emitting device 40 is an organic light-emitting diode (OLED), a micro light-emitting diode (micro LED), or a mini light-emitting diode (mini LED).

The light-emitting control sub-circuit 50 is connected to the second node N2, the third node N3, the first voltage terminal VDD, a first enable signal terminal EM1, a second enable signal terminal EM2, and the anode of the light-emitting device 40. The first voltage terminal VDD is configured to receive a voltage signal and transmit the voltage signal to the light-emitting control sub-circuit 50. The first enable signal terminal EM1 is configured to receive a first enable signal and transmit the first enable signal to the light-emitting control sub-circuit 50. The second enable signal terminal EM2 is configured to receive a second enable signal and transmit the second enable signal to the light-emitting control sub-circuit 50. Here, the voltage signal of the first voltage terminal VDD is a high-level signal, and a voltage signal of the second voltage terminal VSS is a low-level signal.

The light-emitting control sub-circuit 50 is configured to: in the light-emitting phase, under control of the first enable signal received at the first enable signal terminal EM1 and control of the second enable signal received at the second enable signal terminal EM2, transmit the voltage signal of the first voltage terminal VDD to the second node N2, and transmit a current output by the driving transistor Td to the light-emitting device 40, so that the light-emitting device 40 emits light.

In the pixel circuit 100 provided in some embodiments of the present disclosure, the writing sub-circuit 30 is connected to the first node N1 (i.e., the gate of the driving transistor Td), and the first reset sub-circuit 20 is connected to the third node N3. Compared with the driving circuit 100' in the related art, in the embodiments of the present disclosure, only the writing sub-circuit 30 is directly connected to the gate of the driving transistor Td. In this way, an effect on a voltage of the gate of the driving transistor Td is small, and in the light-emitting phase, a change amount ΔV of the voltage of the gate of the driving transistor Td is reduced, so that the effect on a light-emitting performance of the light-emitting device 40 is reduced. As a result, a light-emitting performance of the display panel may be improved, and probability of the flicker phenomenon is reduced.

Figure 3B:
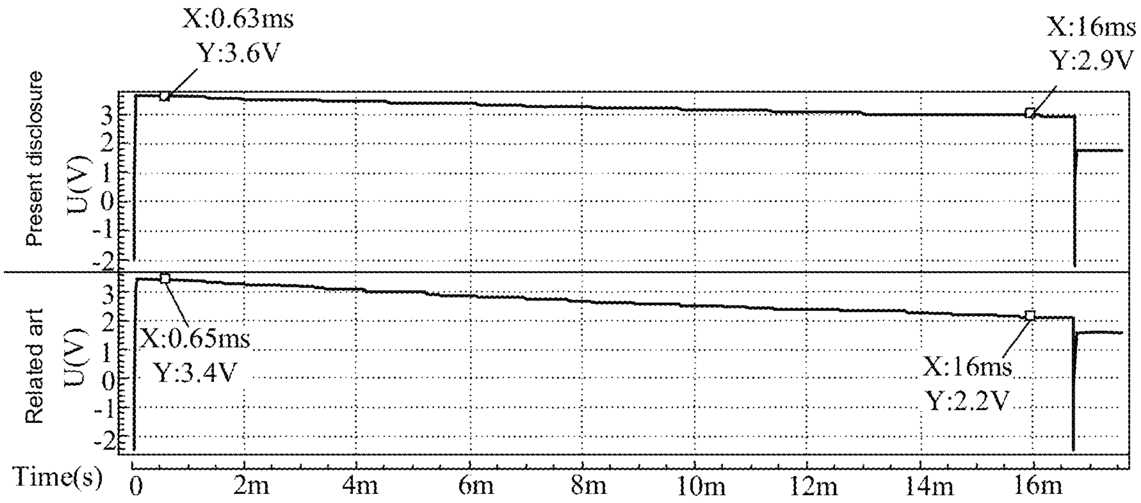
FIG. 3B is a diagram showing a simulation result of voltages of a gate of a driving transistor in a pixel circuit provided in embodiments of the present disclosure and a gate of a driving transistor in a driving circuit provided in the related art.

FIG. 3B is a diagram showing a simulation result, in one image frame, of voltages of the gate of the driving transistor Td in the pixel circuit 100 provided in the embodiments of the present disclosure and the gate of the driving transistor Td' in the driving circuit 100' provided in the related art. As shown in FIG. 3B, in the light-emitting phase, the voltage of the gate of the driving transistor Td' in the driving circuit 100' provided in the related art changes from 3.4 V to 2.2 V, and the change amount ΔV of the voltage thereof is 1.2 V. The voltage of the gate of the driving transistor Td in the pixel circuit 100 provided in the embodiments of the present disclosure changes from 3.6 V to 2.9 V, and the change amount ΔV of the voltage thereof is 0.7 V. Therefore, the pixel circuit 100 provided in the embodiments of the present disclosure can effectively maintain the voltage of the gate of the driving transistor Td, which is conducive to improving the flicker phenomenon.

Figure 4:
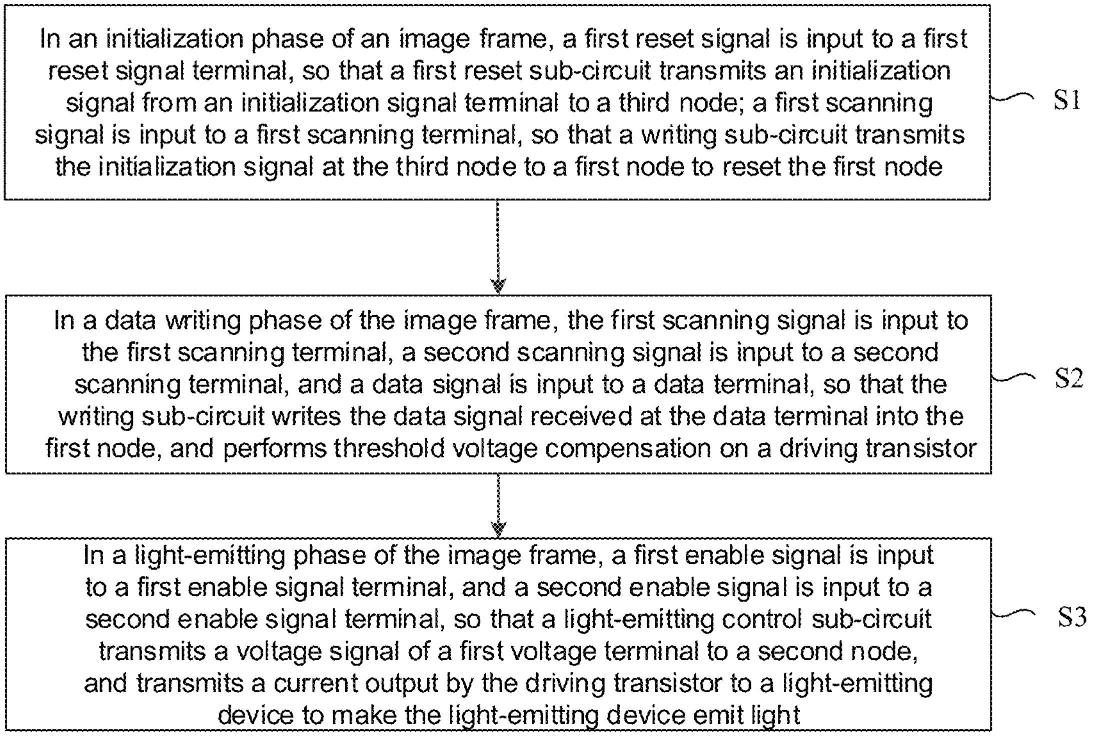
FIG. 4 is a flow diagram of a driving method of a pixel circuit provided in embodiments of the present disclosure.

Some embodiments of the present disclosure provide a driving method of the pixel circuit 100. As shown in FIG. 4, the driving method includes steps 1 to 3 (S1 to S3).

In S1, in an initialization phase of an image frame, the first reset signal is input to the first reset signal terminal RE1, so that the first reset sub-circuit 20 transmits the is initialization signal from the initialization signal terminal INI to the third node N3; and the first scanning signal is input to the first scanning terminal G1, so that the writing sub-circuit 30 transmits the initialization signal at the third node N3 to the first node N1 to reset the first node N1.

In S2, in a data writing phase of the image frame, the first scanning signal is input to the first scanning terminal G1, the second scanning signal is input to the second scanning terminal G2, and the data signal is input to the data terminal DE, so that the writing sub-circuit 30 writes the data signal received at the data terminal DE into the first node N1, and performs the threshold voltage compensation on the driving transistor Td.

In S3, in a light-emitting phase of the image frame, the first enable signal is input to the first enable signal terminal EM1, and the second enable signal is input to the second enable signal terminal EM2, so that the light-emitting control sub-circuit 50 transmits the voltage signal of the first voltage terminal VDD to the second node N2, and transmits the current output by the driving transistor Td to the light-emitting device 40 to cause the light-emitting device 40 to emit light.

In some embodiments, the driving method of the pixel circuit 100 further includes: in the initialization phase of the image frame, inputting the data signal to the data terminal DE for precharging. Thus, it is conducive to writing the data signal.

Figure 5:
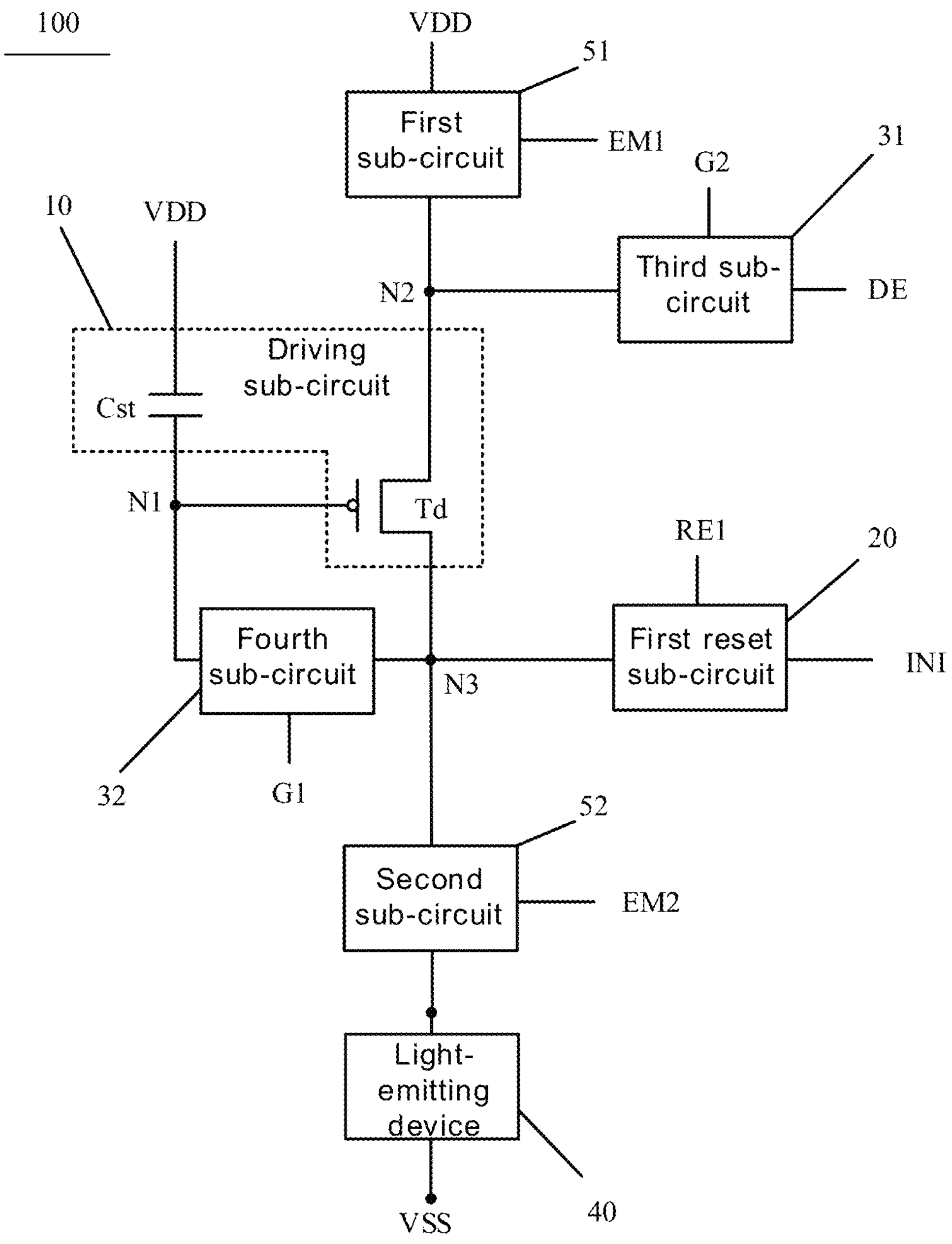
FIG. 5 is a structural diagram of another pixel circuit provided in embodiments of the present disclosure.

In some embodiments, as shown in FIG. 5, the light-emitting control sub-circuit 50 includes a first sub-circuit 51 and a second sub-circuit 52.

The first sub-circuit 51 is connected to the second node N2, the first voltage terminal VDD and the first enable signal terminal EM1.

The first sub-circuit 51 is configured to: in the light-emitting phase, transmit the voltage signal of the first voltage terminal VDD to the second node N2 under the control of the first enable signal of the first enable signal terminal EM1.

The second sub-circuit 52 is connected to the third node N3, the second enable signal terminal EM2 and the anode of the light-emitting device 40.

The second sub-circuit 52 is configured to: in the light-emitting phase, transmit the current output by the driving transistor Td to the light-emitting device 40 under the control of the second enable signal of the second enable signal terminal EM2.

In some embodiments, as shown in FIG. 5, the writing sub-circuit 30 includes a is third sub-circuit 31 and a fourth sub-circuit 32.

The third sub-circuit 31 is connected to the second scanning terminal G2, the data terminal DE and the second node N2.

The third sub-circuit 31 is configured to be turned on at least in the data writing phase under the control of the second scanning signal of the second scanning terminal G2, and transmit the data signal received at the data terminal DE to the second node N2.

The fourth sub-circuit 32 is connected to the first scanning terminal G1, the first node N1 and the third node N3.

The fourth sub-circuit 32 is configured to be turned on in the initialization phase and the data writing phase under the control of the first scanning signal received at the first scanning terminal G1, transmit the initialization signal at the third node N3 to the first node N1 in the initialization phase, and write the data signal at the second node N2 into the first node N1 and perform the threshold voltage compensation on the driving transistor Td in the data writing phase.

Figure 6A:
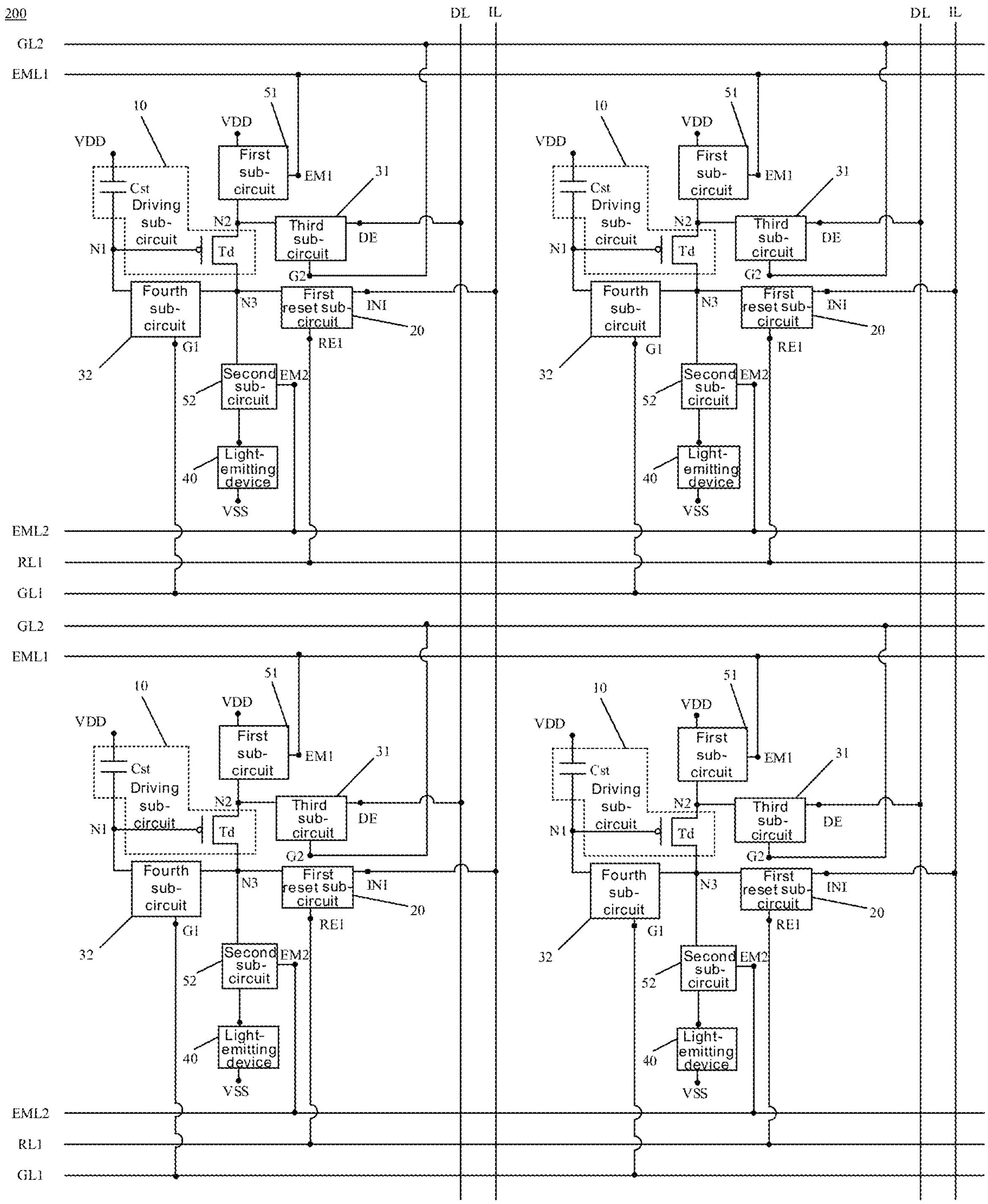
FIG. 6A is a diagram showing connections of circuits in a display panel provided in embodiments of the present disclosure.

Sub-pixel regions P of the display panel 200 that are arranged in a two by two (2×2) array are taken as an example. In some embodiments, as shown in FIG. 6A, the display panel 200 further includes a plurality of first scanning lines GL1, a plurality of second scanning lines GL2, a plurality of first enable signal lines EML1, a plurality of second enable signal lines EML2, and a plurality of first reset signal lines RL1.

First scanning terminals G1 and second scanning terminals G2 to which all pixel circuits 100 located in a same row are connected are respectively connected to a first scanning line GL1 and a second scanning line GL2. First reset signal terminals RE1 to which all the pixel circuits 100 located in the same row are connected are connected to a same first reset signal line RL1. First enable signal terminals EM1 to which all the pixel circuits 100 located in the same row are connected are connected to a same first enable signal line EML1. Second enable signal terminals EM2 to which all the pixel circuits 100 located in the same row are connected are connected to a same second enable signal line EML2.

The first scanning line GL1 is configured to provide the first scanning signal to the first scanning terminals G1 to which a row of pixel circuits 100 are connected. The second scanning line GL2 is configured to provide the second scanning signal to the second scanning terminals G2 to which a row of pixel circuits 100 are connected. The first reset signal line RL1 is configured to provide the first reset signal to the first reset signal terminals RE1 to which a row of pixel circuits 100 are connected. The first enable signal line EML1 is configured to provide the first enable signal to the first enable signal terminals EM1 to which a row of pixel circuits 100 are connected. The second enable signal line EML2 is configured to provide the second enable signal to the second enable signal terminals EM2 to which a row of pixel circuits 100 are connected.

In some embodiments, the first sub-circuit 51 is further configured to, in the initialization phase, transmit the voltage signal of the first voltage terminal VDD to the second node N2 under the control of the first enable signal of the first enable signal terminal EM1.

In the initialization phase, the fourth sub-circuit 32 transmits the initialization signal at the third node N3 to the first node N1 under the control of the first scanning signal received at the first scanning terminal G1. Therefore, the gate-source voltage of the driving transistor Td is equal to a voltage difference between the initialization signal and the voltage signal. In this way, the driving transistor Td has a stable bias voltage, which may reduce a hysteresis effect caused by the voltage change of the data signal at the gate of the driving transistor when different image frames are switched, thereby ameliorating the short-term residual image and the flicker phenomenon.

As shown in FIG. 6A, the display panel 200 further includes a plurality of data signal lines DL and a plurality of initialization signal lines IL.

In some embodiments, data terminals DE to which all pixel circuits 100 located in a same column are connected are connected to a same data signal line DL. Initialization signal terminals INI to which all the pixel circuits 100 located in the same column are connected are connected to a same initialization signal line IL.

The data signal line DL is configured to provide the data signal to the data terminals DE to which the column of pixel circuits 100 are connected. The initialization signal line IL is configured to provide the initialization signal to the initialization signal terminals INI to which the column of pixel circuits 100 are connected.

In some other embodiments, initialization signal terminals INI to which all pixel circuits 100 located in the same row are connected are connected to a same initialization signal line IL (e.g., a first initialization signal line Init1 below). In this case, the initialization signal line IL is configured to provide the initialization signal to the initialization signal terminals INI to which the pixel circuits 100 located in the same row are connected.

In some embodiments, the first scanning terminal G1 and the second scanning terminal G2 are connected to a same scanning terminal. In the case where the first scanning terminal G1 and the second scanning terminal G2 are connected to the same scanning terminal, the first scanning signal and the second scanning signal are a same scanning signal.

Figure 6B:
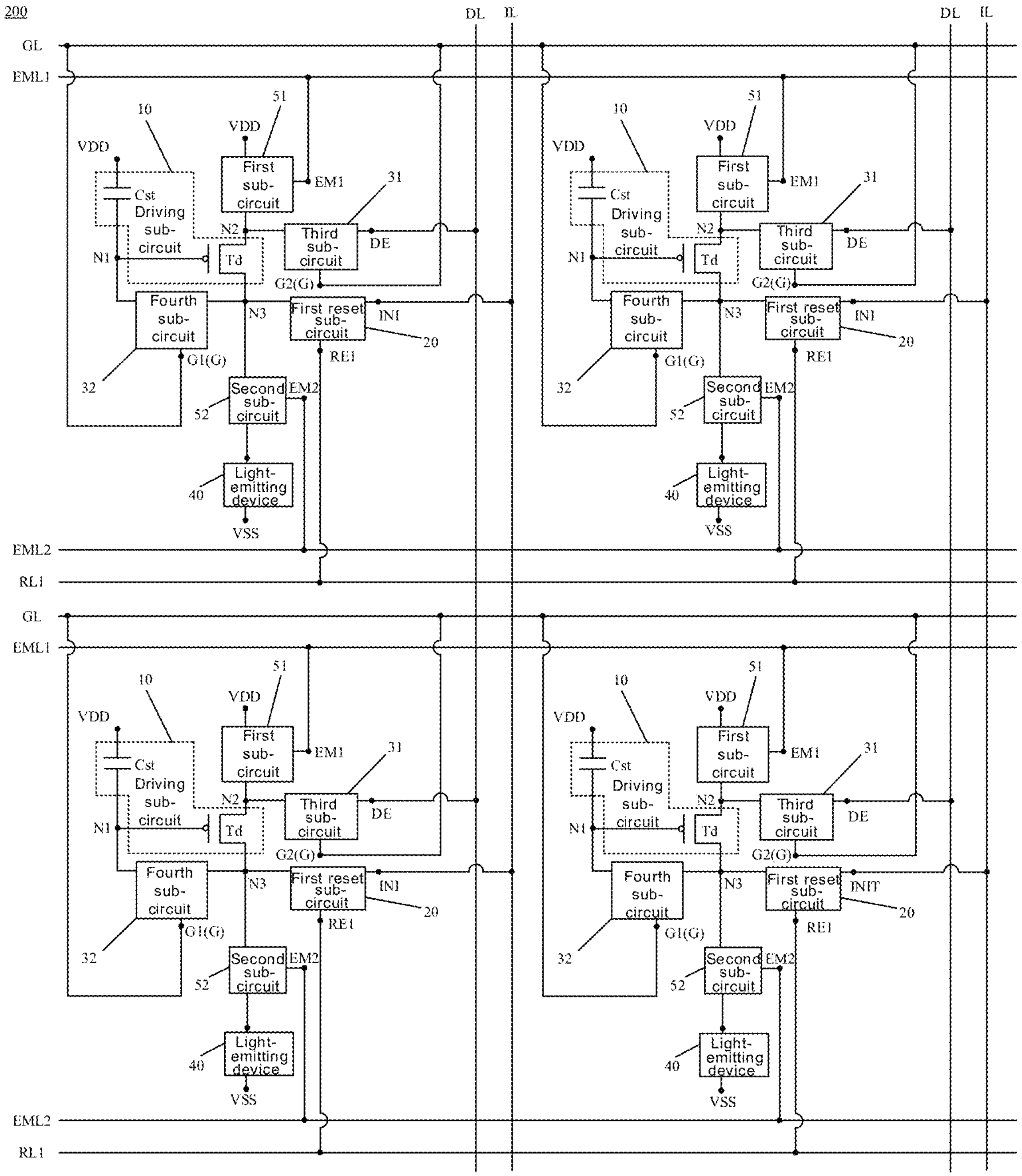
FIG. 6B is a diagram showing connections of circuits in another display panel provided in embodiments of the present disclosure.

For example, as shown in FIG. 6B, the display panel 200 includes a plurality of scanning lines GL, and first scanning terminals G1 and second scanning terminals G2 to which all pixel circuits 100 located in a same row are connected are connected to a scanning line GL. That is, the scanning terminals G to which all the pixel circuits 100 located in the same row are connected are connected to one scanning line GL.

In this case, the third sub-circuit 31 is configured to be turned on in the initialization phase and the data writing phase under the control of the second scanning signal of the second scanning terminal G2.

In some embodiments, the first enable signal terminal EM1 and the second enable signal terminal EM2 are connected to a same enable signal terminal. In the case where the first enable signal terminal EM1 and the second enable signal terminal EM2 are connected to the same enable signal terminal, the first enable signal and the second enable signal are a same enable signal.

Figure 6C:
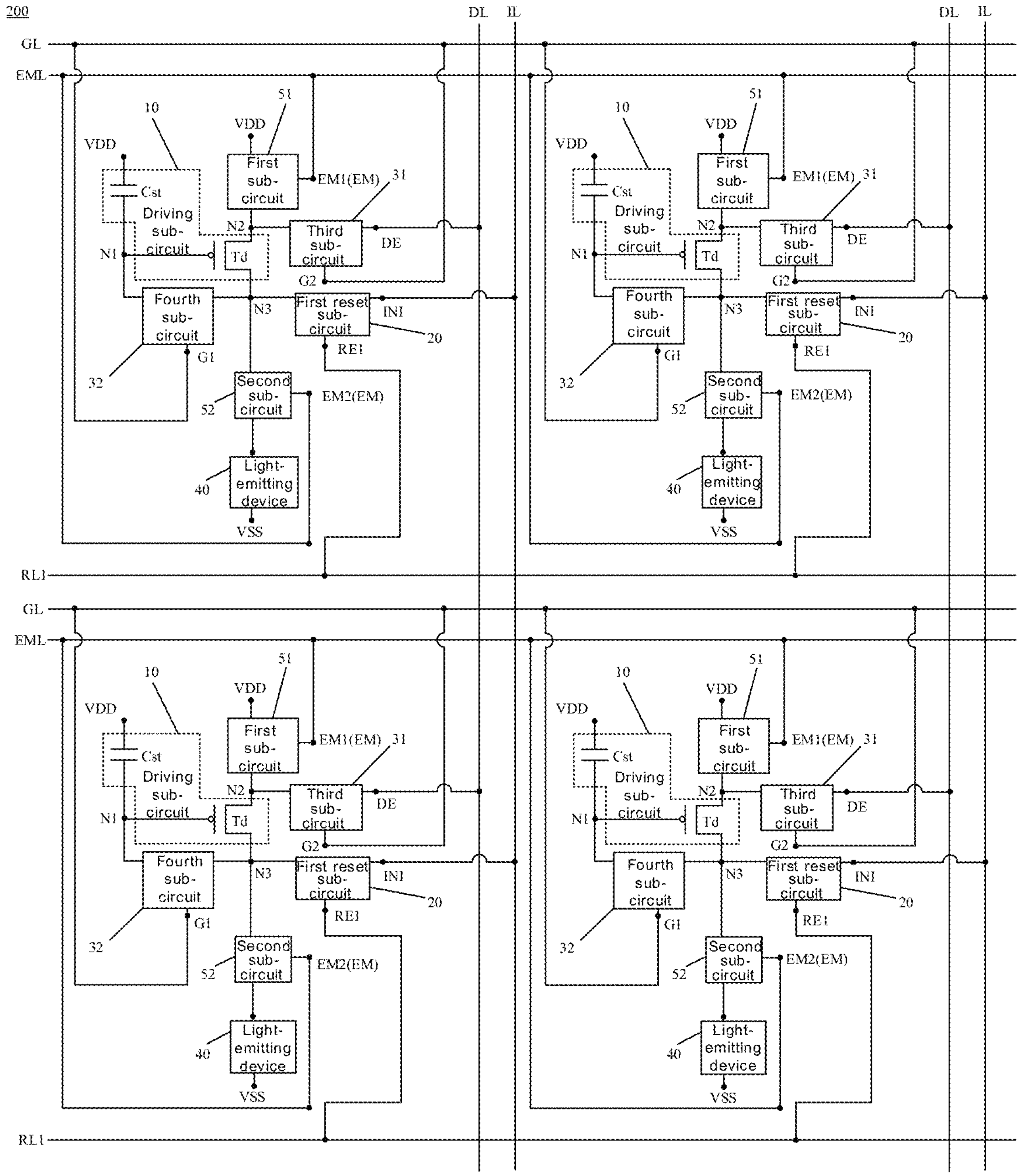
FIG. 6C is a diagram showing connections of circuits in yet another display panel provided in embodiments of the present disclosure.

For example, as shown in FIG. 6C, the display panel 200 includes a plurality of enable signal lines EML, and first enable signal terminals EM1 and second enable signal terminals EM2 to which all pixel circuits 100 located in a same row are connected are connected to an enable signal line EML. That is, the enable signal terminals EM to which all the pixel circuits 100 located in the same row are connected are connected to one enable signal line EML.

Figure 7:
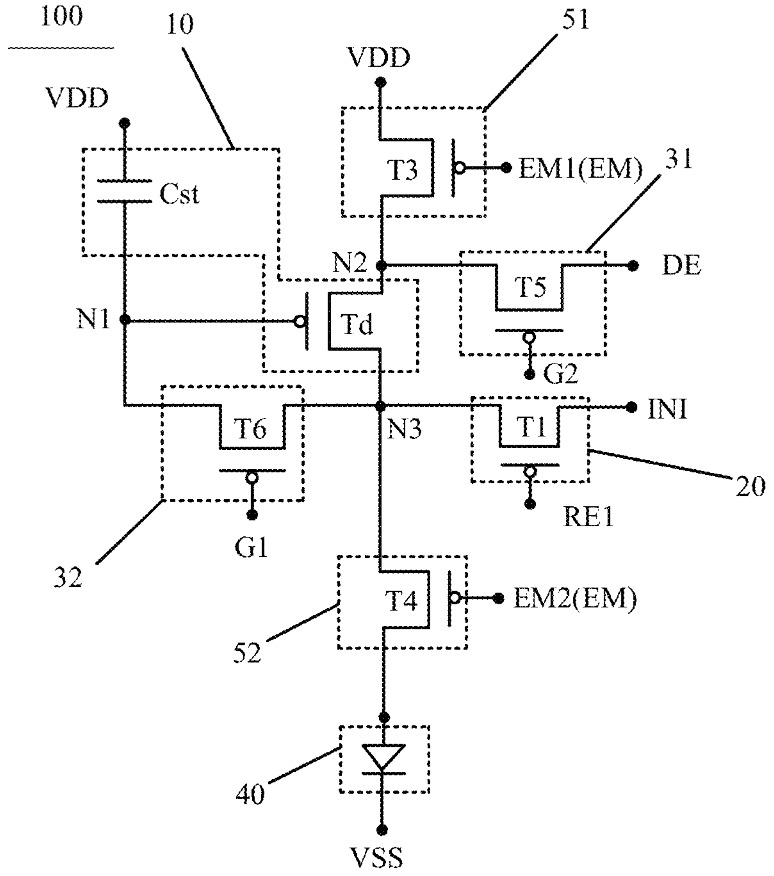
FIG. 7 is a diagram showing a structure of a pixel circuit provided in embodiments of the present disclosure.

In some examples, as shown in FIG. 7, the first reset sub-circuit 20 includes a first transistor T1. A gate of the first transistor T1 is connected to the first reset signal terminal RE1, a first electrode of the first transistor T1 is connected to the initialization signal terminal INI, and a second electrode of the first transistor T1 is connected to the third node N3.

In some other examples, the first reset sub-circuit 20 includes a plurality of first transistors T1 connected in parallel or in series. In a case where the first reset sub-circuit 20 includes the plurality of first transistors T1 connected in parallel, gates of the plurality of first transistors T1 are connected to the first reset signal terminal RE1, first electrodes of the plurality of first transistors T1 are connected to the initialization signal terminal INI, and second electrodes of the plurality of first transistors T1 are connected to the third node N3. In a case where the first reset sub-circuit 20 includes the plurality of first transistors T1 connected in series, the plurality of first transistors T1 are connected in sequence. A second electrode of a first transistor T1 is connected to a first electrode of a second first transistor T1, and so on. The gates of the plurality of first transistors T1 are connected to the first reset signal terminal RE1, and a first electrode of the first transistor T1 in the plurality of first transistors T1 is connected to the initialization signal terminal INI, a second electrode of a last first transistor T1 in the plurality of first transistors T1 is connected to the third node N3. The above descriptions are merely examples of the first reset sub-circuit 20, and other structures with the same function as the first reset sub-circuit 20 will not be repeated here, but shall all be included in the protection scope of the present disclosure.

In some examples, as shown in FIG. 7, the first sub-circuit 51 includes a third transistor T3. A gate of the third transistor T3 is connected to the first enable signal terminal EM1, a first electrode of the third transistor T3 is connected to the first voltage terminal VDD, and a second electrode of the third transistor T3 is connected to the second node N2.

In some other examples, the first sub-circuit 51 includes a plurality of third transistors T3 connected in parallel or in series. In a case where the first sub-circuit 51 includes the plurality of third transistors T3 connected in parallel, gates of the plurality of third transistors T3 are connected to the first enable signal terminal EM1, first electrodes of the plurality of third transistors T3 are connected to the first voltage terminal VDD, and second electrodes of the plurality of third transistors T3 are connected to the second node N2. In a case where the first sub-circuit 51 includes the plurality of third transistors T3 connected in series, the plurality of third transistors T3 are connected in sequence. A is second electrode of a first third transistor T3 is connected to a first electrode of a second third transistor T3, and so on. The gates of the plurality of third transistors T3 are all connected to the first enable signal terminal EM1, a first electrode of the first third transistor T3 in the plurality of third transistors T3 is connected to the first voltage terminal VDD, and a second electrode of a last third transistor T3 in the plurality of third transistors T3 is connected to the second node N2. The above descriptions are merely examples of the first sub-circuit 51, and other structures with the same function as the first sub-circuit 51 will not be repeated here, but shall all be included in the protection scope of the present disclosure.

In some examples, as shown in FIG. 7, the second sub-circuit 52 includes a fourth transistor T4. A gate of the fourth transistor T4 is connected to the second enable signal terminal EM2, a first electrode of the fourth transistor T4 is connected to the third node N3, and a second electrode of the fourth transistor T4 is connected to the anode of the light-emitting device 40.

In some other examples, the second sub-circuit 52 includes a plurality of fourth transistors T4 connected in parallel or in series. In a case where the second sub-circuit 52 includes the plurality of fourth transistors T4 connected in parallel, gates of the plurality of fourth transistors T4 are connected to the second enable signal terminal EM2, first electrodes of the plurality of fourth transistors T4 are connected to the third node N3, and second electrodes of the plurality of fourth transistors T4 are connected to the anode of the light-emitting device 40. In a case where the second sub-circuit 52 includes the plurality of fourth transistors T4 connected in series, the plurality of fourth transistors T4 are connected in sequence. A second electrode of a first fourth transistor T4 is connected to a first electrode of a second fourth transistor T4, and so on. The gates of the plurality of fourth transistors T4 are connected to the second enable signal terminal EM2, a first electrode of the first fourth transistor T4 in the plurality of fourth transistors T4 is connected to the third node N3, and a second electrode of a last fourth transistor T4 in the plurality of fourth transistors T4 is connected to the anode of the light-emitting device 40. The above descriptions are merely examples of the second sub-circuit 52, and other structures with the same function as the second sub-circuit 52 will not be repeated here, but shall all be included in the protection scope of the present disclosure.

In some examples, as shown in FIG. 7, the third sub-circuit 31 includes a fifth transistor T5. A gate of the fifth transistor T5 is connected to the second scanning terminal G2, a first electrode of the fifth transistor T5 is connected to the data terminal DE, and a second electrode of the fifth transistor T5 is connected to the second node N2.

In some other examples, the third sub-circuit 31 includes a plurality of fifth transistors T5 connected in parallel or in series. In a case where the third sub-circuit 31 includes the plurality of fifth transistors T5 connected in parallel, gates of the plurality of fifth transistors T5 are connected to the second scanning terminal G2, first electrodes of the plurality of fifth transistors T5 are connected to the data terminal DE, and second electrodes of the plurality of fifth transistors T5 are connected to the second node N2. In a case where the third sub-circuit 31 includes the plurality of fifth transistors T5 connected in series, the plurality of fifth transistors T5 are connected in sequence. A second electrode of a first fifth transistor T5 is connected to a first electrode of a second fifth transistor T5, and so on. The gates of the plurality of fifth transistors T5 are connected to the second scanning terminal G2, a first electrode of the first fifth transistor T5 in the plurality of fifth transistors T5 is connected to the data terminal DE, and a second electrode of a last fifth transistor T5 in the plurality of fifth transistors T5 is connected to the second node N2. The above descriptions are merely examples of the third sub-circuit 31, and other structures with the same function as the third sub-circuit 31 will not be repeated here, but shall all be included in the protection scope of the present disclosure.

In some examples, as shown in FIG. 7, the fourth sub-circuit 32 includes a sixth transistor T6. A gate of the sixth transistor T6 is connected to the first scanning terminal G1, a first electrode of the sixth transistor T6 is connected to the third node N3, and a second electrode of the sixth transistor T6 is connected to the first node N1.

In some other examples, the fourth sub-circuit 32 includes a plurality of sixth transistors T6 connected in parallel or in series. In a case where the fourth sub-circuit 32 includes the plurality of sixth transistors T6 connected in parallel, gates of the plurality of sixth transistors T6 are connected to the first scanning terminal G1, first electrodes of the plurality of sixth transistors T6 are connected to the third node N3, and second electrodes of the plurality of sixth transistors T6 are connected to the first node N1. In a case where the fourth sub-circuit 32 includes the plurality of sixth transistors T6 connected in series, is the plurality of sixth transistors T6 are connected in sequence. A second electrode of a first sixth transistor T6 is connected to a first electrode of a second sixth transistor T6, and so on. The gates of the plurality of sixth transistors T6 are connected to the first scanning terminal G1, a first electrode of the first sixth transistor T6 in the plurality of sixth transistors T6 is connected to the third node N3, and a second electrode of a last sixth transistor T6 in the plurality of sixth transistors T6 is connected to the first node N1. The above descriptions are merely examples of the fourth sub-circuit 32, and other structures with the same function as the fourth sub-circuit 32 will not be repeated here, but shall all be included in the protection scope of the present disclosure.

It will be noted that the embodiments of the present disclosure do not limit types of the transistors in the sub-circuits. That is, the driving transistor Td, the first transistor T1, the third transistor T3, the fourth transistor T4, the fifth transistor T5 and the sixth transistor T6 may all be P-type transistors or N-type transistors. The following embodiments will be illustrated by considering an example in which the driving transistor Td, the first transistor T1, the third transistor T3, the fourth transistor T4, the fifth transistor T5, and the sixth transistor T6 are all P-type transistors.

In addition, a first electrode is one of a source and a drain of the transistor, and a second electrode is the other of the source and the drain of the transistor. Since the source and the drain of the transistor may be symmetrical in structure, there may be no difference in structure between the source and the drain of the transistor. That is to say, there is no difference in structure between the first electrode and the second electrode of the transistor in the embodiments of the present disclosure. For the P-type driving transistor Td, the second electrode thereof is referred to as the drain, and the first electrode thereof is referred to as the source. For the N-type driving transistor Td, the first electrode thereof is referred to as the drain, and a second electrode thereof is referred to as the source.

Some possible implementation manners are provided below to describe the pixel circuit 100 and a driving process thereof.

The driving process of the pixel circuit 100 in an image frame may be divided into an initialization phase, a data writing phase, and a light-emitting phase.

A first possible implementation manner is as follows.

As shown in FIG. 7, the first reset sub-circuit 20 includes the first transistor T1, the first sub-circuit 51 includes the third transistor T3, the second sub-circuit 52 includes the fourth transistor T4, the third sub-circuit 31 includes the fifth transistor T5, and the fourth sub-circuit 32 includes the sixth transistor T6. The first enable signal terminal EM1 and the second enable signal terminal EM2 are connected to a same enable signal terminal EM.

Figure 8:
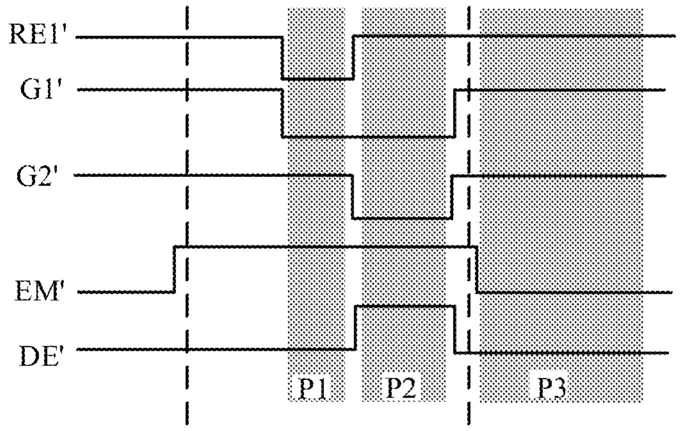
FIG. 8 is a timing diagram of the pixel circuit shown in FIG. 7.

As shown in FIG. 8, in the initialization phase P1, a voltage of the first reset signal RE1' transmitted by the first reset terminal RE1 and a voltage of the first scanning signal G1' transmitted by the first scanning terminal G1 are at low levels, and a voltage of an enable signal EM' transmitted by the enable signal terminal EM and a voltage of the second scanning signal G2' transmitted by the second scanning terminal G2 are at high levels.

As shown in FIG. 7, the first reset sub-circuit 20 transmits the initialization signal from the initialization signal terminal INI to the third node N3 under the control of the first reset signal. The fourth sub-circuit 32 transmits the initialization signal at the third node N3 to the first node N1 under the control of the first scan signal, so as to initialize the first node N1 through the initialization signal, thereby preventing an electrical signal remained at the first node N1 in a previous image frame from affecting a current image frame.

Figure 9A:
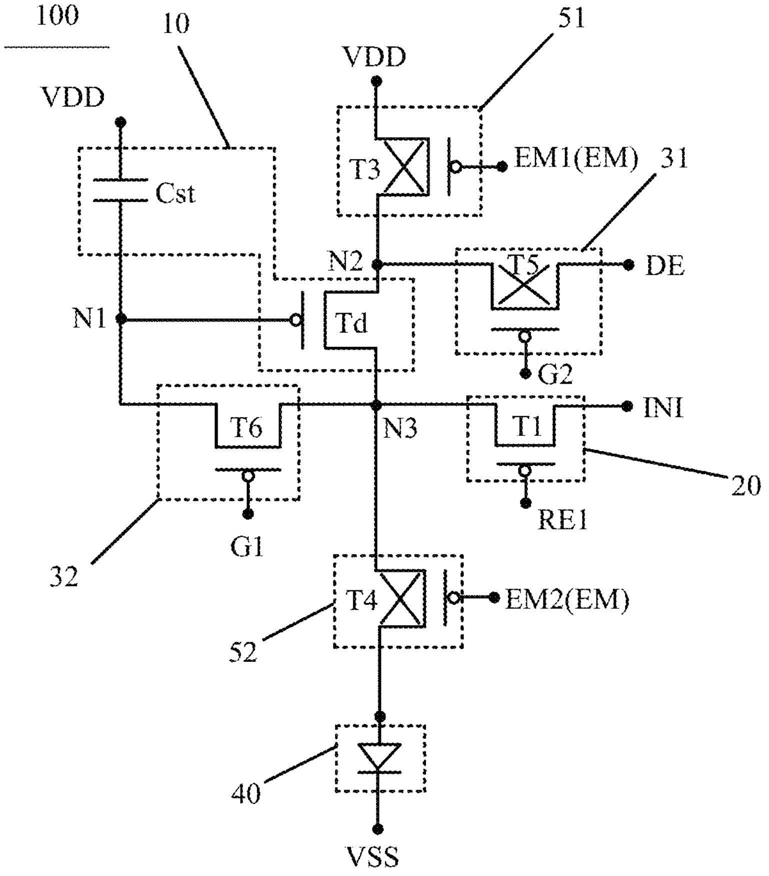
FIG. 9A is a schematic diagram of the pixel circuit shown in FIG. 7 in an initialization phase.

FIG. 9A is an equivalent circuit diagram of the pixel circuit 100 shown in FIG. 7 in the initialization phase P1. As shown in FIG. 9A, the first reset signal controls the first transistor T1 to be turned on, and the initialization signal transmitted by the initialization signal terminal INI is transmitted to the third node N3 through the first transistor T1. The first scanning signal controls the sixth transistor T6 to be turned on, and the initialization signal is transmitted to the first node N1 through the sixth transistor T6.

In addition, the first sub-circuit 51, the second sub-circuit 52 and the third sub-circuit 31 are all in an off state in the initialization phase P1. In this case, as shown in FIG. 9A, the third transistor T3, the fourth transistor T4, and the fifth transistor T5 are all turned off. As shown in FIG. 9A, the turned-off transistors are marked with a symbol "X".

At an end of the initialization phase P1, the voltage of the first node N1 is Vinit.

In the data writing phase P2, the voltage of the first scanning signal transmitted by the first scanning terminal G1 and the voltage of the second scanning signal is transmitted by the second scanning terminal G2 are at low levels, and the voltage of the first reset signal transmitted by the first reset signal terminal RE1 and the voltage of the enable signal transmitted by the enable signal terminal EM are at high levels.

As shown in FIG. 7, the third sub-circuit 31 transmits the data signal DE' from the data terminal DE to the second node N2 under the control of the second scanning signal. The fourth sub-circuit 32 short-circuits the second electrode of the driving transistor Td and the gate of the driving transistor Td to form a diode structure under the control of the first scan signal, writes the data signal at the second node N2 to the first node N1, and performs the threshold voltage compensation on the driving transistor Td.

Figure 9B:
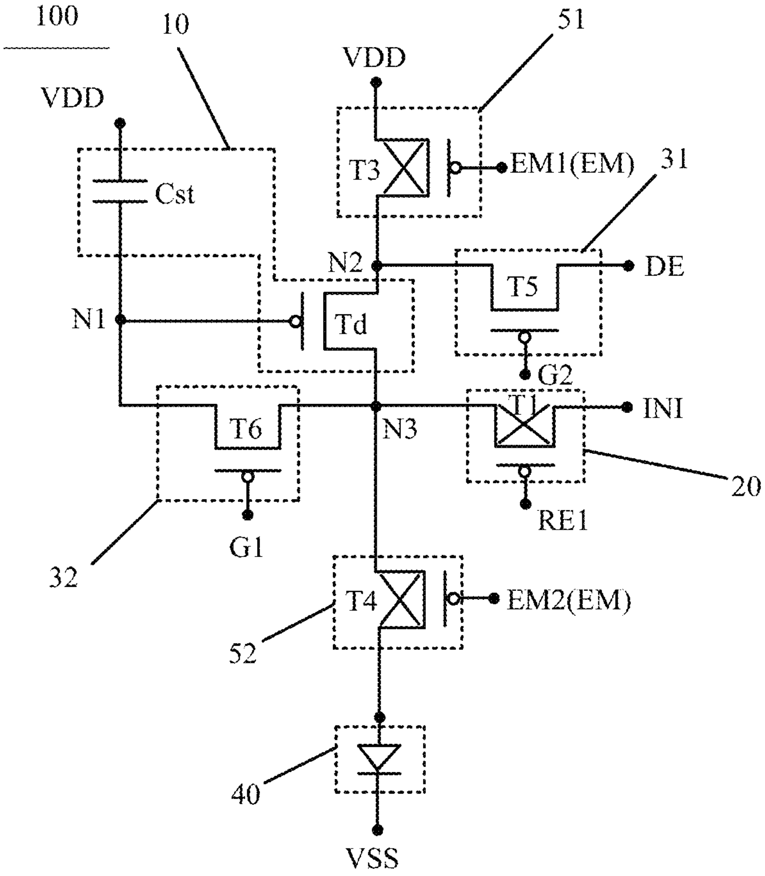
FIG. 9B is a schematic diagram of the pixel circuit shown in FIG. 7 in a data writing phase.

FIG. 9B is an equivalent circuit diagram of the pixel circuit 100 shown in FIG. 7 in the data writing phase P2. As shown in FIG. 9B, in the data writing phase P2, since the voltage of the first reset signal is at a high level, the first transistor T1 is turned off. Since the voltage of the second scanning signal is at a low level, the fifth transistor T5 is controlled to be turned on, and the data signal from the data terminal DE is transmitted to the second node N2 through the fifth transistor T5. Same as the initialization phase P1, the voltage of the first scanning signal in the data writing phase P2 is still at a low level, and the sixth transistor T6 remains turned on, so that the second electrode and the gate of the driving transistor Td are short-circuited to form the diode structure. The data signal at the second node N2 is transmitted to the first node N1 through the driving transistor Td and the sixth transistor T6. When a difference between the voltage of the first node N1 and a voltage of the second node N2 is reduced to the threshold voltage Vth of the driving transistor Td, the driving transistor Td is turned off.

At an end of the data writing phase P2, the voltage of the first node N1 is $V_{data}$+Vth, which is stored in the storage capacitor Cst. Here, $V_{data}$ is a voltage of the data signal.

In the light-emitting phase P3, the voltage of the enable signal transmitted by the enable signal terminal EM is at a low level, and the voltage of the first scanning signal transmitted by the first scanning terminal G1, the voltage of the second scanning signal transmitted by the second scanning terminal G2 and the voltage of the first reset signal transmitted by the first reset signal terminal RE1 are all at high levels.

As shown in FIG. 7, the first sub-circuit 51 transmits the voltage signal of the first voltage terminal VDD to the second node N2 under control of the enable signal. The is driving transistor Td generates a current under control of the voltage on the first node N1 and the voltage signal of the first voltage terminal VDD. The second sub-circuit 52 transmits the current output by the driving transistor Td to the light-emitting device 40 under the control of the enable signal.

Figure 9C:
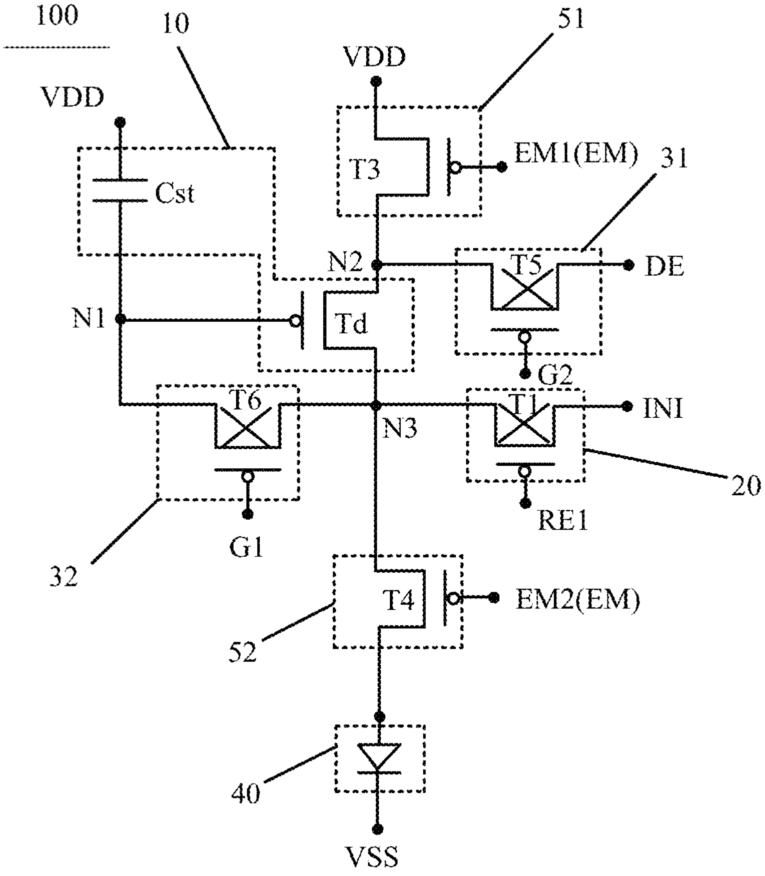
FIG. 9C is a schematic diagram of the pixel circuit shown in FIG. 7 in a light-emitting phase.

FIG. 9C is an equivalent circuit diagram of the pixel circuit 100 shown in FIG. 7 in the light-emitting phase P3. As shown in FIG. 9C, since the voltage of the first reset signal is at a high level, the first transistor T1 is turned off. Since the voltage of the first scanning signal is at a high level, the sixth transistor T6 is turned off. Since the voltage of the second scanning signal is at a high level, the fifth transistor T5 is turned off. Since the enable signal is at the low level, the third transistor T3 and the fourth transistor T4 are turned on. The voltage signal of the first voltage terminal VDD is transmitted to the second node N2 through the third transistor T3. The driving transistor Td generates the current under the control of the voltage on the first node N1 and the voltage signal of the first voltage terminal VDD. The current is transmitted to the light-emitting device 40 through the fourth transistor T4, so that the light-emitting device 40 emits light.

In the light-emitting phase P3, the voltage of the first node N1 is $V_{data}$+Vth, the voltage of the second node N2 is Vdd, and the gate-source voltage Vgs of the driving transistor Td is equal to Vg−Vs, and is equal to $V_{data}$+Vth−Vdd (i.e., Vgs=Vg−Vs=$V_{data}$+Vth−Vdd). Here, Vg is the voltage of the gate of the driving transistor Td, and Vs is a voltage of the source of the driving transistor Td.

After the driving transistor Td is turned on, when a difference between a gate-source voltage Vgs of the driving transistor Td and the threshold voltage Vth of the driving transistor Td is less than or equal to a drain-source voltage Vds of the driving transistor Td, that is, when Vgs−Vth≤Vds, the driving transistor Td may be in a saturation and on state. In this case, the currentIoutput by the driving transistor Td is obtained by a formula:

$$\begin{aligned} I &= \frac{1}{2}\mu C_{OX}\frac{W}{L}(Vgs - Vth)^2 \\ &= \frac{1}{2}\mu C_{OX}\frac{W}{L}(V_{data} + Vth - Vdd - Vth)^2 \\ &= \frac{1}{2}\mu C_{OX}\frac{W}{L}(V_{data} - Vdd)^2 \end{aligned} \quad (2)$$

Here, W/L is the width-to-length ratio of the driving transistor Td, Cox is a dielectric constant of a channel insulating layer of the driving transistor Td, and p is a channel carrier mobility of the driving transistor Td.

The current output by the driving transistor Td is only related to the structure of the driving transistor Td, the data signal transmitted by the data terminal DE and the is voltage signal transmitted by the first voltage terminal VDD, and are not related to the threshold voltage Vth of the driving transistor Td, which eliminates the effect of the threshold voltage Vth of the driving transistor Td on the brightness of the light-emitting device 40, and improves brightness uniformity of the display panel.

A second possible implementation manner is as follows.

Figure 10:
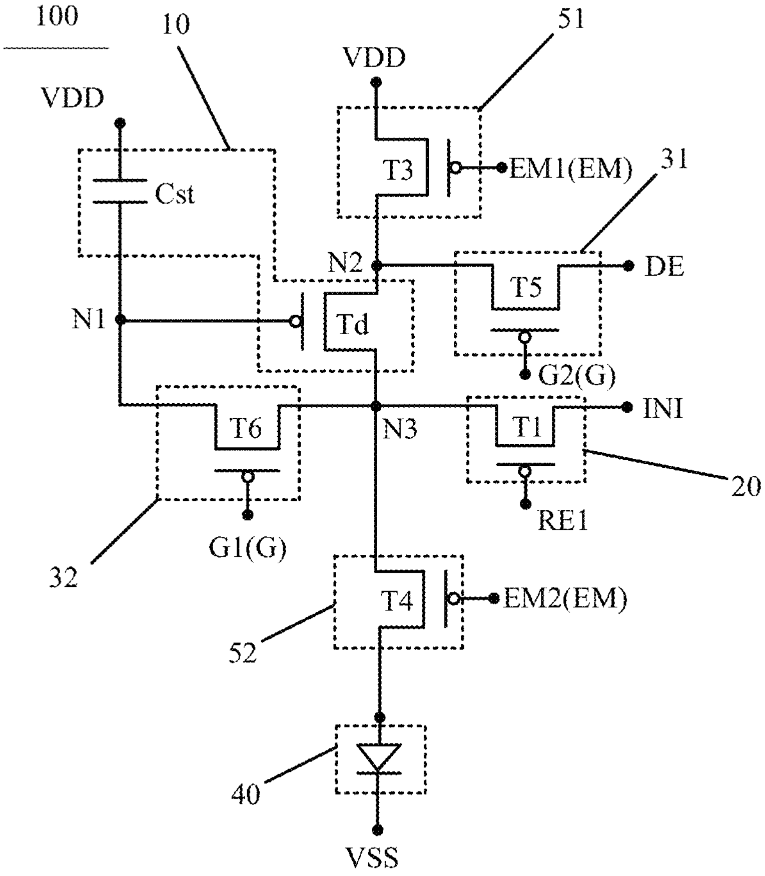
FIG. 10 is a diagram showing a structure of another pixel circuit provided in embodiments of the present disclosure.

As shown in FIG. 10, based on the first possible implementation manner, the first scanning terminal G1 and the second scanning terminal G2 are connected to a same scanning terminal G. Based on this, FIG. 11 shows a timing diagram of the pixel circuit 100 shown in FIG. 10.

Figure 11:
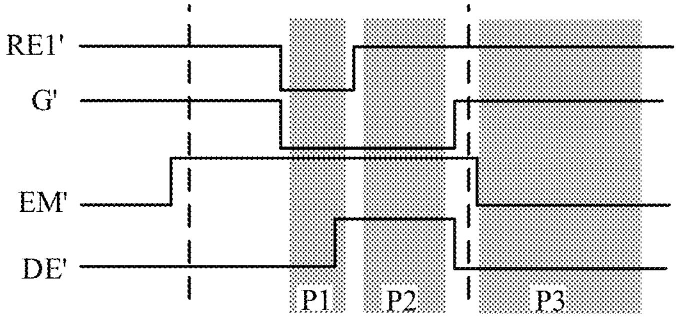
FIG. 11 is a timing diagram of the pixel circuit shown in FIG. 10.

As shown in FIG. 11, in the initialization phase P1, the voltage of the first reset signal RE1' transmitted by the first reset signal terminal RE1 and a voltage of a scanning signal G' transmitted by the scanning terminal G are at low levels, and the voltage of the enable signal EM' transmitted by the enable signal terminal EM is at a high level.

Figure 12A:
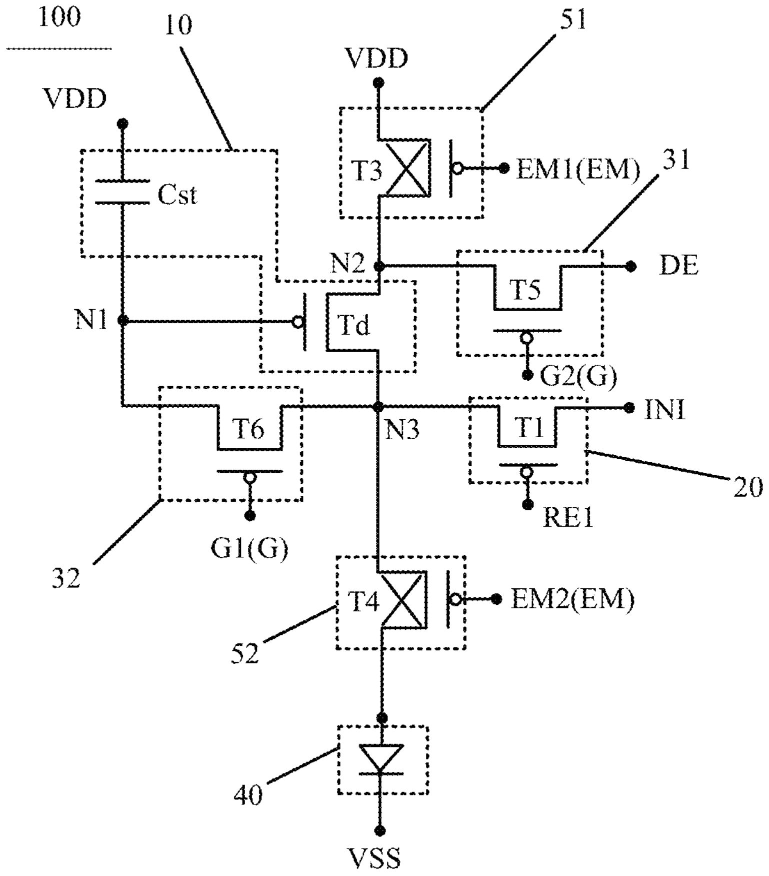
FIG. 12A is a schematic diagram of the pixel circuit shown in FIG. 10 in an initialization phase.

FIG. 12A is an equivalent circuit diagram of the pixel circuit 100 shown in FIG. 10 in the initialization phase P1. As shown in FIG. 12A, in the initialization phase P1, the voltage of the first reset signal is at a low level, and controls the first transistor T1 to be turned on, so that the initialization signal transmitted by the initialization signal terminal INI is transmitted to the third node N3 through the first transistor T1. Since the voltage of the scanning signal is at a low level, the sixth transistor T6 is turned on, and the initialization signal is transmitted to the first node N1 through the sixth transistor T6.

In addition, the voltage of the enable signal is at the high level in the initialization phase P1, so that the first sub-circuit 51 and the second sub-circuit 52 are in an off state. As shown in FIG. 12A, the third transistor T3 and the fourth transistor T4 are turned off.

As shown in FIG. 11, in the data writing phase P2, the voltage of the scanning signal transmitted by the scanning terminal G is at a low level, and the voltage of the first reset signal transmitted by the first reset signal terminal RE1 and the voltage of the enable signal transmitted by the enable signal terminal EM are at high levels.

Figure 12B:
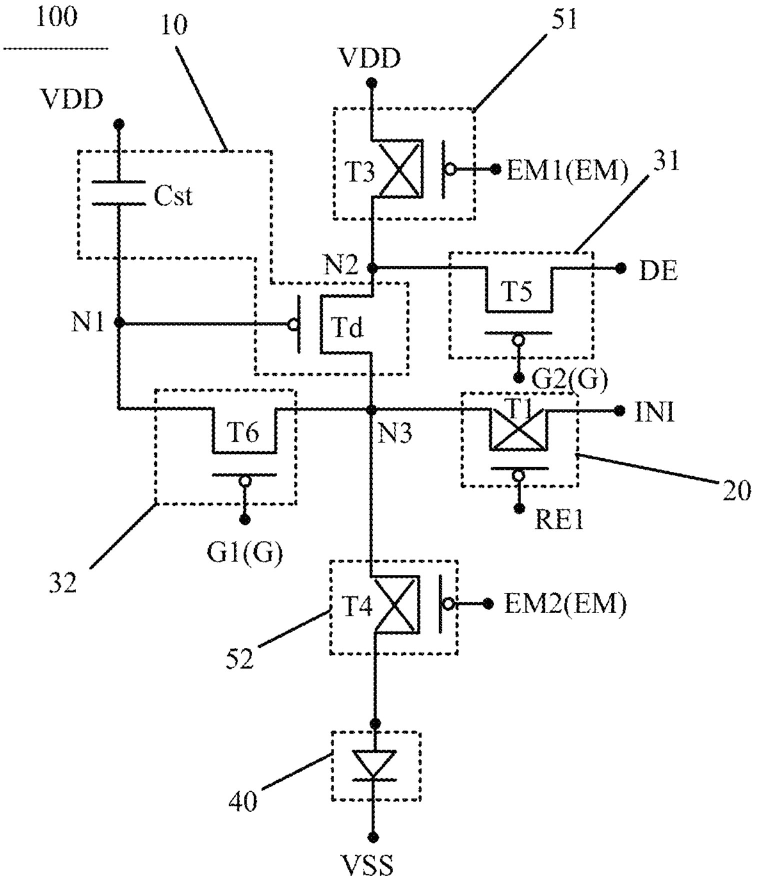
FIG. 12B is a schematic diagram of the pixel circuit shown in FIG. 10 in a data writing phase.

FIG. 12B is an equivalent circuit diagram of the pixel circuit 100 shown in FIG. 10 is in the data writing phase P2. As shown in FIG. 12B, in the data writing phase P2, since the voltage of the first reset signal is at a high level, the first transistor T1 is turned off. Since the voltage of the scanning signal is at the low level, the fifth transistor T5 and the sixth transistor T6 are controlled to be turned on, and the data signal from the data terminal DE is transmitted to the second node N2 through the fifth transistor T5. The sixth transistor T6 is turned on, and the second electrode and the gate of the driving transistor Td are short-circuited to form a diode structure, and the data signal at the second node N2 is transmitted to the first node N1 through the driving transistor Td and the sixth transistor T6. When a difference between the voltage of the first node N1 and a voltage of the second node N2 is reduced to the threshold voltage Vth of the driving transistor Td, the driving transistor Td is turned off.

An on state of each transistor and transmission processes of signals in the light-emitting phase P3 in the second possible implementation manner are the same as those in the light-emitting phase P3 in the first possible implementation manner, which will not be repeated here.

It will be noted that, in the second possible implementation manner, in the initialization phase P1, since the voltage of the scanning signal is at the low level, the fifth transistor T5 is in an on state, and the data terminal DE transmits the data signal. However, the a difference between a voltage of the data terminal DE and the voltage of the first node N1 is less than a difference between the voltage of the data terminal DE and a voltage of the initialization signal terminal INI, and the data signal of the data terminal DE is transmitted to the first node N1 through the fifth transistor T5, the driving transistor Td and the sixth transistor T6, so that the data signal has a small effect on the voltage N1' (e.g., as shown in FIG. 13) of the first node N1 in the initialization phase P1.

Figure 13:
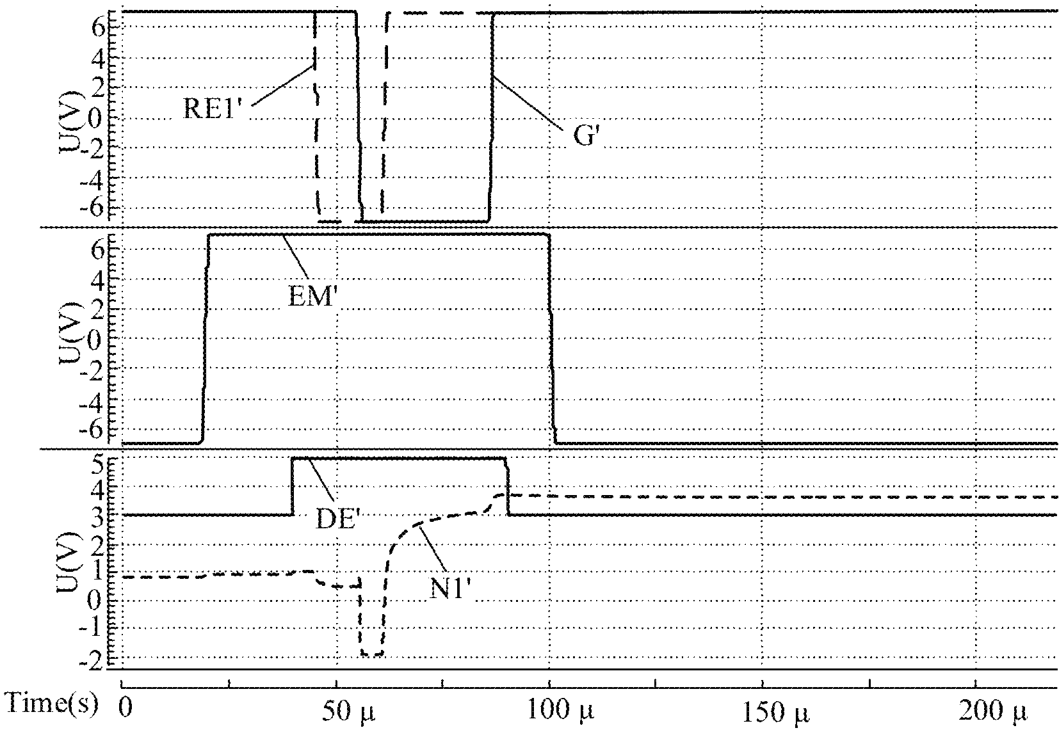
FIG. 13 is a diagram showing a simulation result of signals of a pixel circuit provided in embodiments of the present disclosure.

FIG. 13 shows a simulation result of signals in the driving process of the pixel circuit 100 in one image frame in the second possible implementation manner. It can be seen from FIG. 13 that normal initialization and writing of the data signal can be performed on the first node N1.

A third possible implementation manner is as follows.

Figure 14:
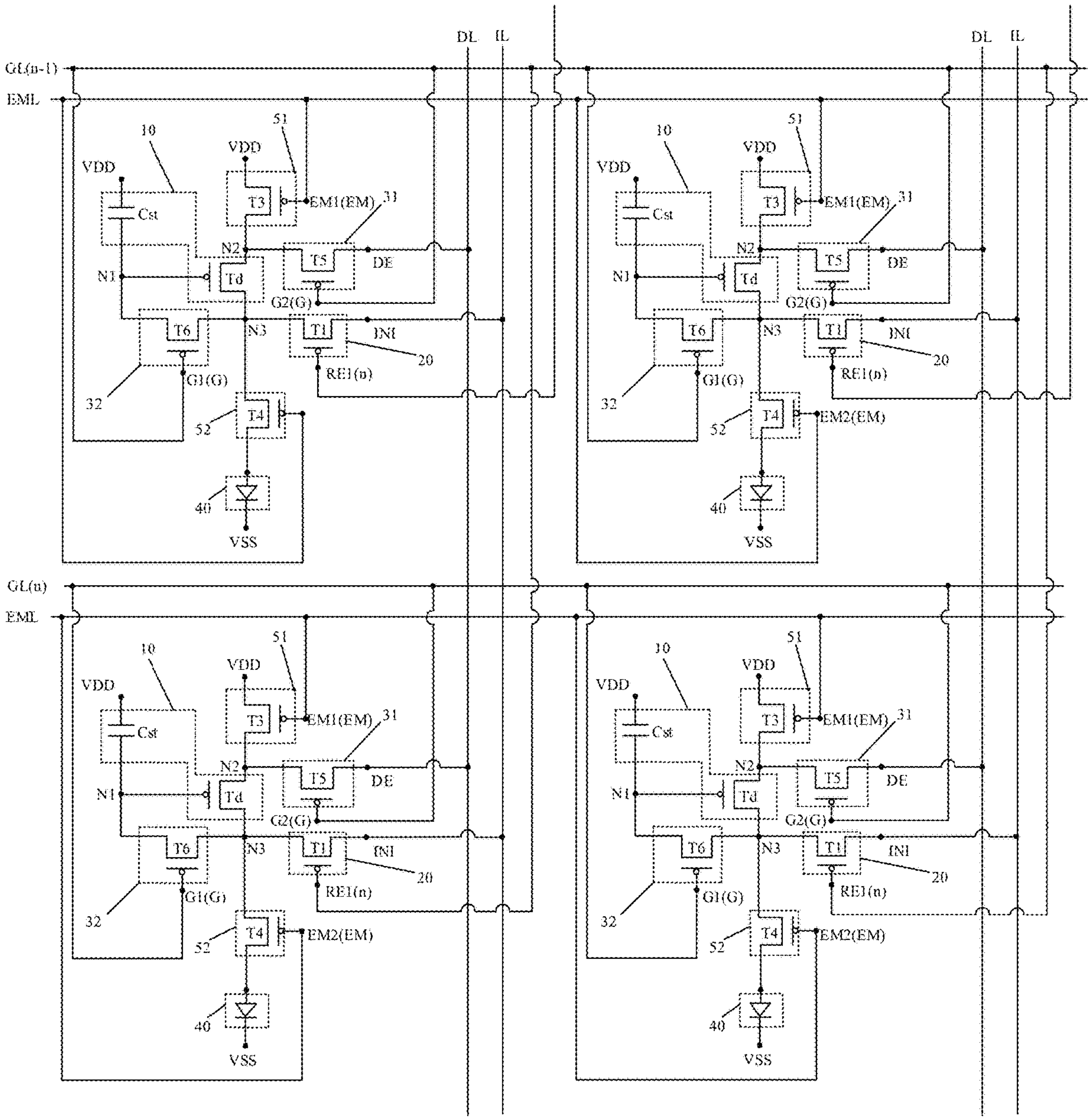
FIG. 14 is a diagram showing connections of circuits in yet another display panel provided in embodiments of the present disclosure.
Figure 15:
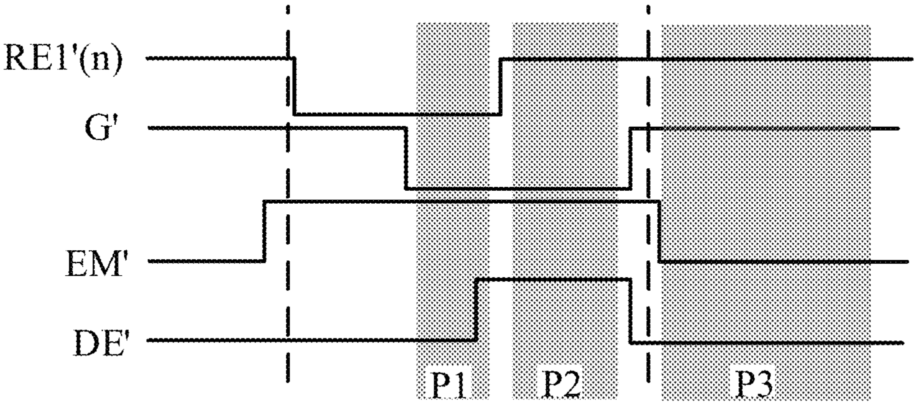
FIG. 15 is a timing diagram of a pixel circuit in the display panel shown in FIG. 14.

As shown in FIG. 14, first scanning terminals G1 and second scanning terminals G2 to which all pixel circuits located in a same row are connected are connected to a is scanning line GL, and first reset signal terminals RE1(*n*) to which all pixel circuits 100 located in an nth row are connected are connected to a scanning line GL(n−1) to which pixel circuits 100 located in an (n−1)th row are connected. In this case, a timing diagram corresponding to the pixel circuit 100 in FIG. 14 is shown in FIG. 15, and a driving process of the pixel circuit 100 in the third possible implementation manner is similar to that in the second possible implementation manner, which will not be repeated here. A difference is that, in the third possible implementation manner, in the initialization phase P1, a first reset signal RE1'(n) of the first reset signal terminals RE1(*n*) connected to the pixel circuits 100 located in the nth row is provided by the scanning line GL(n−1) that is connected to the pixel circuits 100 located in the (n−1)th row. Here, n is a positive integer greater than or equal to 2.

The first reset signal terminals RE1(*n*) to which all the pixel circuits 100 located in the nth row are connected are connected to the scanning line GL(n−1) corresponding to the pixel circuits 100 in the (n−1)th row, which may reduce the number of wirings in the display panel.

A fourth possible implementation manner is as follows.

Figure 16:
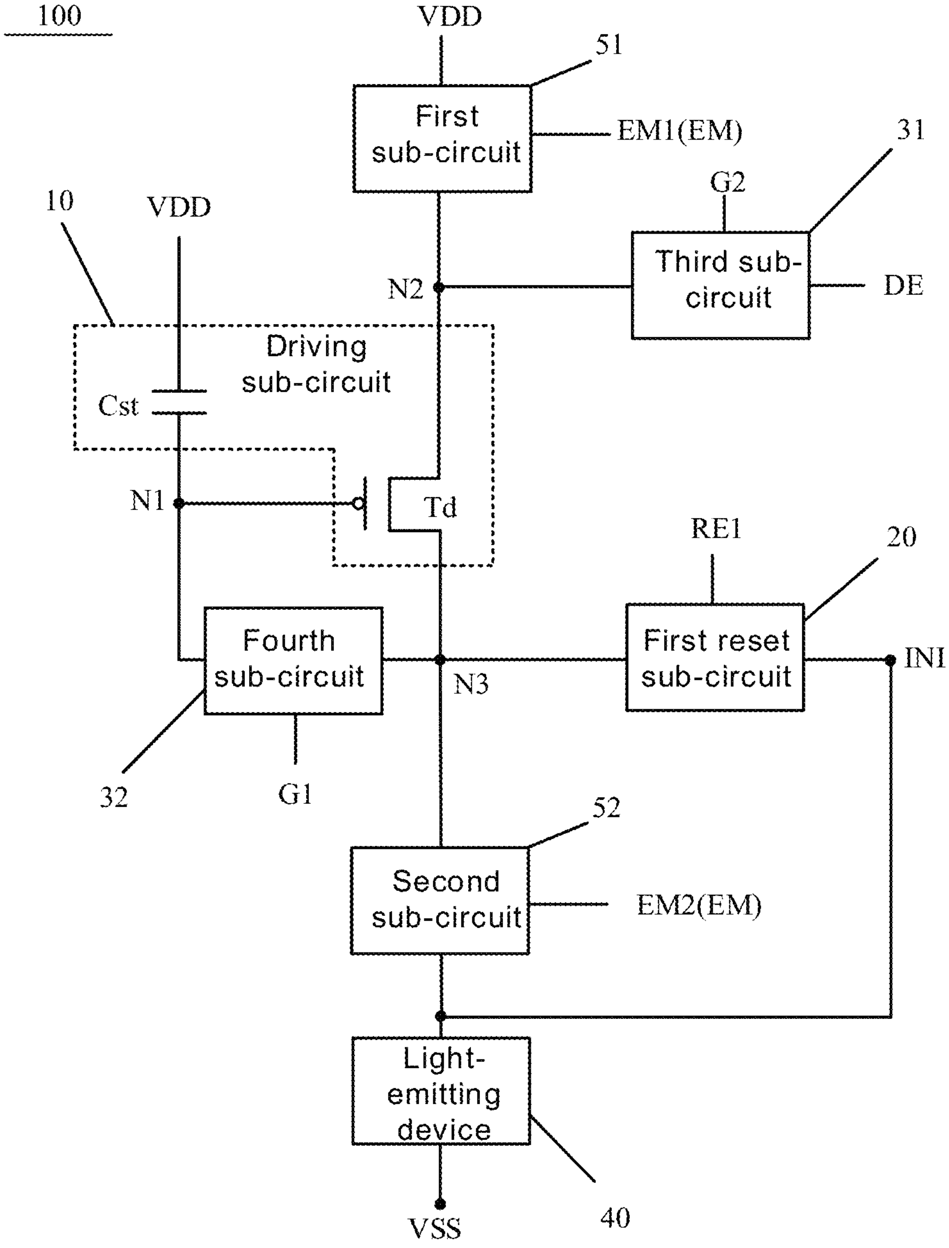
FIG. 16 is a structural diagram of yet another pixel circuit provided in embodiments of the present disclosure.

As shown in FIG. 16, the initialization signal terminal INI is connected to the anode of the light-emitting device 40. In this case, the first node N1 may be reset by a residual voltage of the anode of the light-emitting device 40, which may reduce the number of wirings in the display panel.

Figure 17:
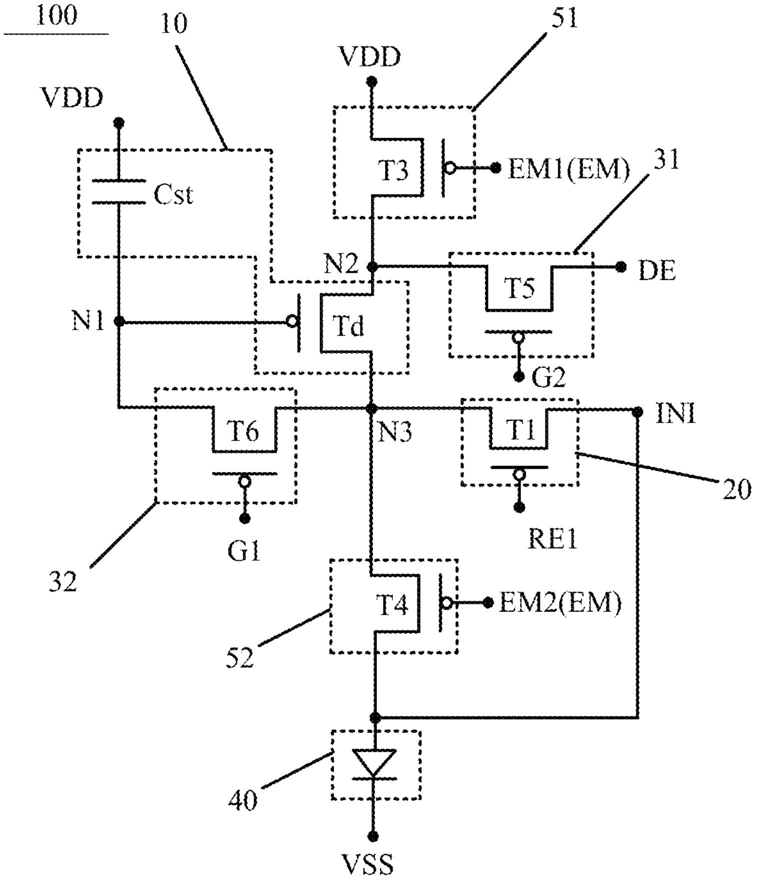
FIG. 17 is a diagram showing a structure of the pixel circuit shown in FIG. 16.
Figure 18:
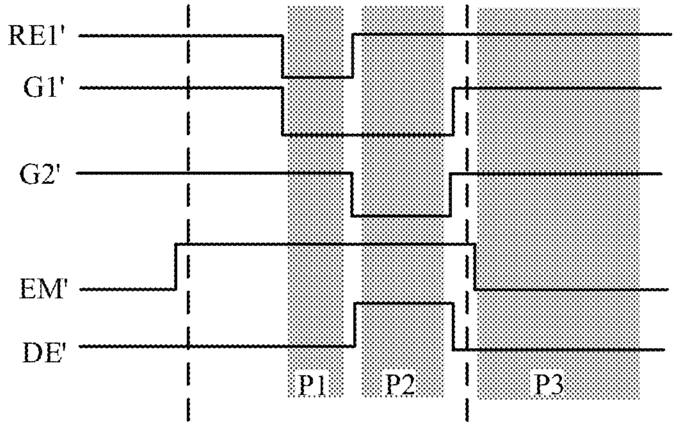
FIG. 18 is a timing diagram of the pixel circuit shown in FIG. 17.

For example, a structure of the pixel circuit 100 is shown in FIG. 17, and a timing diagram corresponding to the pixel circuit 100 in FIG. 17 is shown in FIG. 18. A driving process of the pixel circuit 100 in the fourth possible implementation manner is similar to the driving process of the pixel circuit 100 in the first possible implementation manner. A difference is that, in the fourth possible implementation manner, in the initialization phase P1, the first node N1 is reset by the residual voltage of the anode of the light-emitting device 40.

Figure 19:
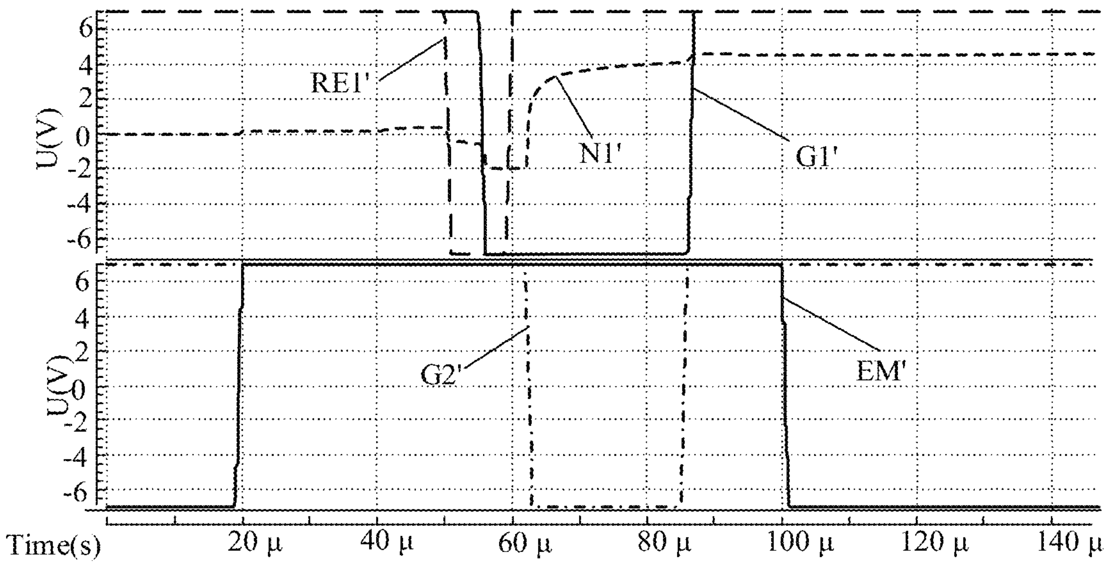
FIG. 19 is a diagram showing a simulation result of signals of another pixel circuit provided in embodiments of the present disclosure.

FIG. 19 shows a simulation result of signals in the driving process of the pixel circuit 100 in one image frame in the fourth possible implementation manner. It can be seen from FIG. 19 that normal initialization and writing of the data signal can be performed on the first node N1.

A fifth possible implementation manner is as follows.

Figure 20:
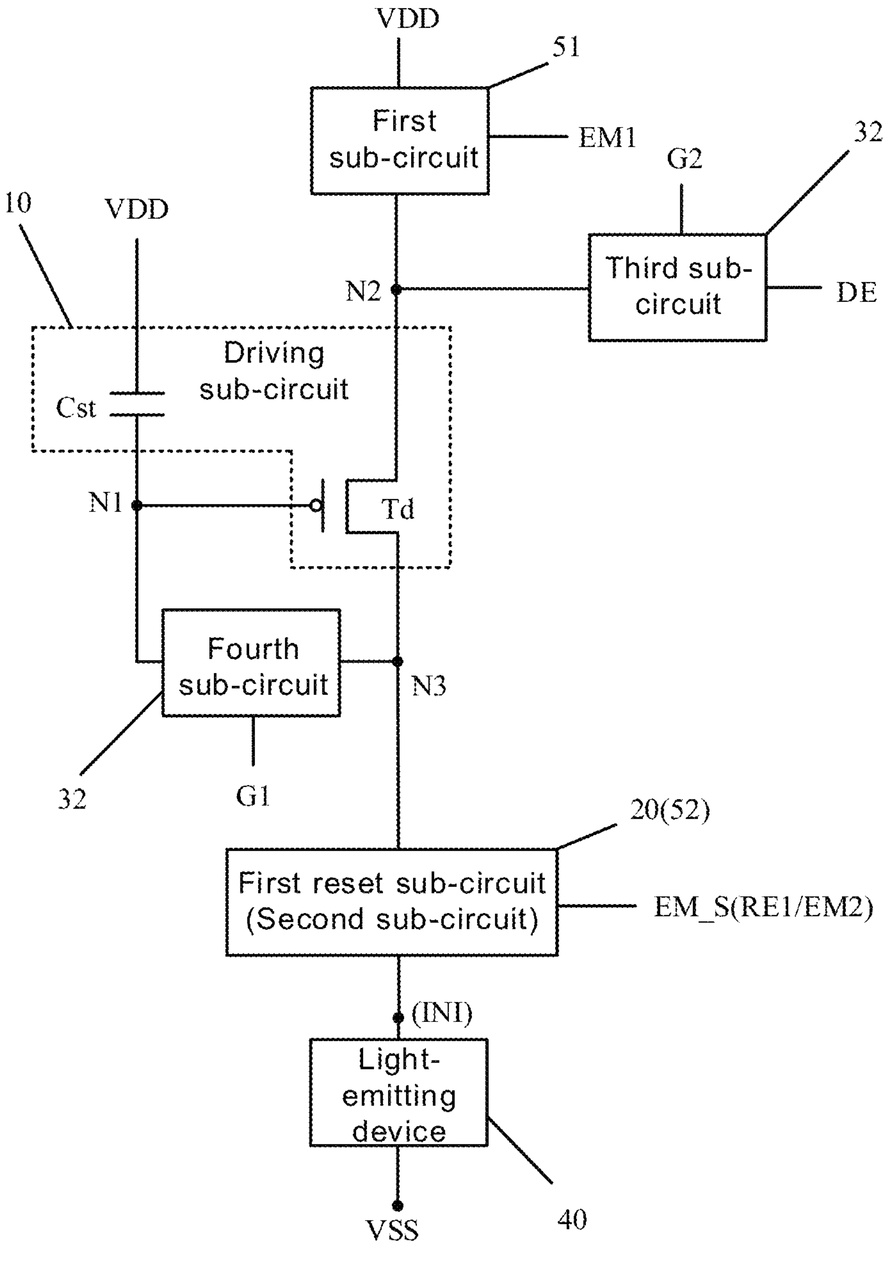
FIG. 20 is a structural diagram of yet another pixel circuit provided in embodiments of the present disclosure.

As shown in FIG. 20, the first reset sub-circuit 20 is used as the second sub-circuit 52, the initialization signal terminal INI is connected to the anode of the light-emitting device 40, and the first reset signal terminal RE1 and the second enable signal terminal EM2 are connected to a same signal terminal EM_S.

The signal terminal EM_S is configured to transmit the first reset signal in the initialization phase P1, and transmit the second enable signal in the light-emitting phase P3.

Figure 21:
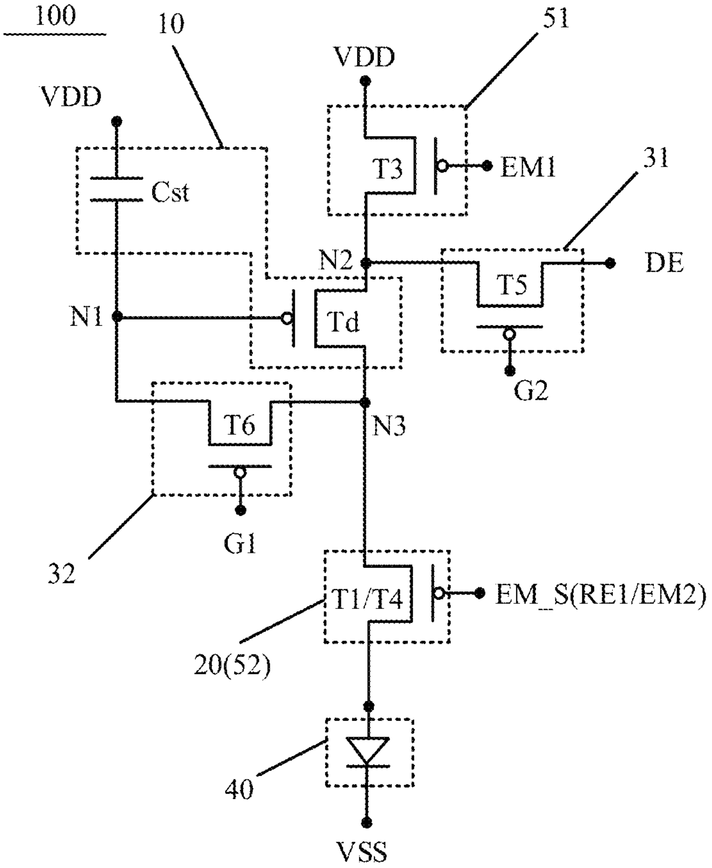
FIG. 21 is a diagram showing a structure of the pixel circuit shown in FIG. 20.
Figure 22:
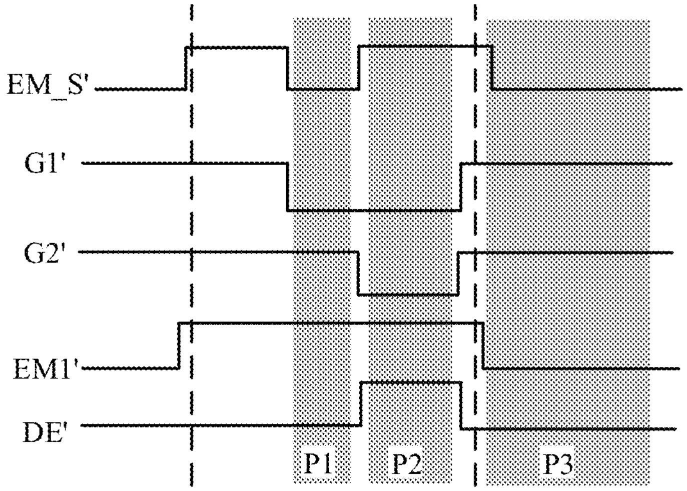
FIG. 22 is a timing diagram of the pixel circuit shown in FIG. 21.

For example, a structure of the pixel circuit 100 is shown in FIG. 21, and a timing diagram corresponding to the pixel circuit 100 in FIG. 21 is shown in FIG. 22. A driving process of the pixel circuit 100 is as follows.

As shown in FIG. 22, the signal terminal EM_S transmits a control signal EM_S', and the control signal includes the first reset signal or the second enable signal. The first scanning terminal G1 transmits the first scanning signal G1, and the second scanning terminal G2 transmits the second scanning signal G2'. The first enable signal terminal EM1 transmits the first enable signal EM1'.

In the initialization phase P1, the voltage of the first reset signal is at a low level; the first scanning signal is at a low level; and the voltage of first enable signal and the voltage of the second scanning signal are at high levels.

Figure 23A:
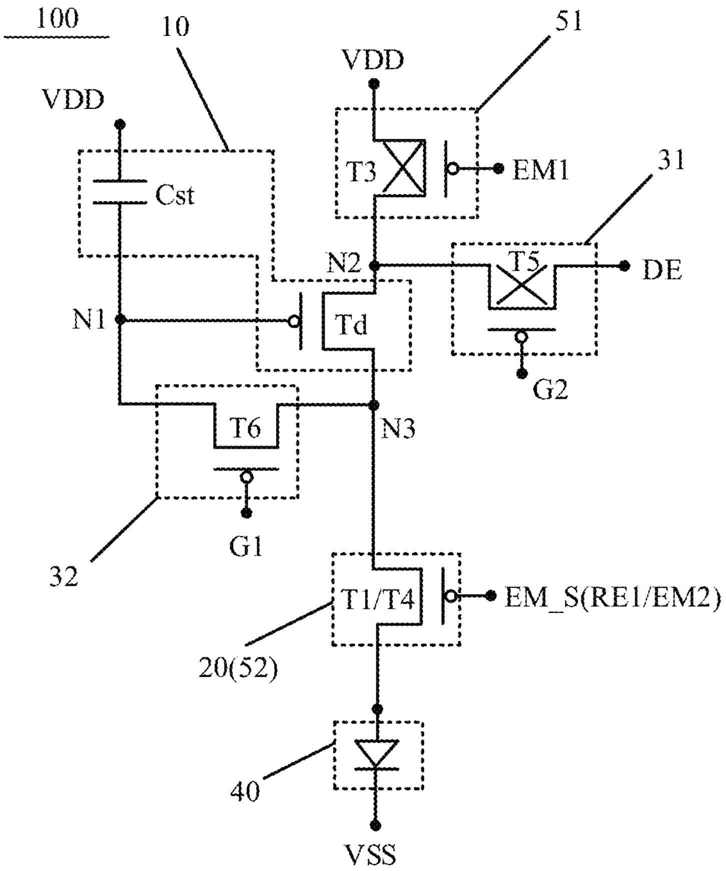
FIG. 23A is a schematic diagram of the pixel circuit shown in FIG. 21 in an is initialization phase.

FIG. 23A is an equivalent circuit diagram of the pixel circuit 100 shown in FIG. 21 in the initialization phase P1. As shown in FIG. 23A, in the initialization phase P1, since the voltage of the first reset signal is at a low level, the fourth transistor T4 is controlled to be turned on, and the voltage of the anode of the light-emitting device 40 is transmitted to the third node N3 through the fourth transistor T4. The voltage of the first scanning signal is at the low level, the sixth transistor T6 is turned on, and the voltage of the third node N3 is transmitted to the first node N1 through the sixth transistor T6, so as to reset the first node N1.

The first sub-circuit 51 and the third sub-circuit 31 are in an off state in the initialization phase P1. In this case, as shown in FIG. 23A, the third transistor T3 and the fifth transistor T5 are turned off.

In the data writing phase P2, the voltage of the first scanning signal and the is voltage of the second scanning signal are at low levels; the voltage of the control signal is at a high level; and the voltage of the first enable signal is at a high level.

Figure 23B:
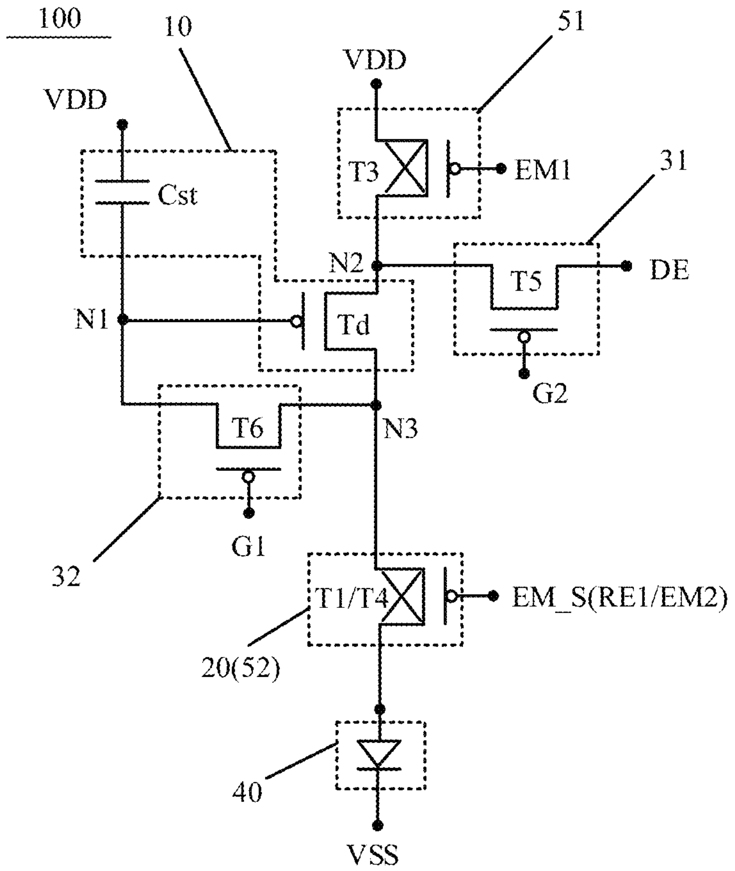
FIG. 23B is a schematic diagram of the pixel circuit shown in FIG. 21 in a data writing phase.

FIG. 23B is an equivalent circuit diagram of the pixel circuit 100 shown in FIG. 21 in the data writing phase P2. As shown in FIG. 23B, in the data writing phase P2, since the voltage of the control signal is at the high level, the fourth transistor T4 is turned off. The voltage of the second scanning signal is at a low level, the fifth transistor T5 is controlled to be turned on, and the data signal from the data terminal DE is transmitted to the second node N2 through the fifth transistor T5. Same as the initialization phase P1, the voltage of the first scanning signal is still at the low level in the data writing phase P2, the sixth transistor T6 remains turned on, and the second electrode and the gate of the driving transistor Td are short-circuited to form a diode structure. The data signal at the second node N2 is transmitted to the first node N1 through the driving transistor Td and the sixth transistor T6. When a difference between the voltage of the first node N1 and a voltage of the second node N2 is reduced to the threshold voltage Vth of the driving transistor Td, the driving transistor Td is turned off.

In the light-emitting phase P3, the voltage of the first enable signal is at a low level; the voltage of the second enable signal is at a low level; and the first scanning signal and the second scanning signal are at high levels.

Figure 23C:
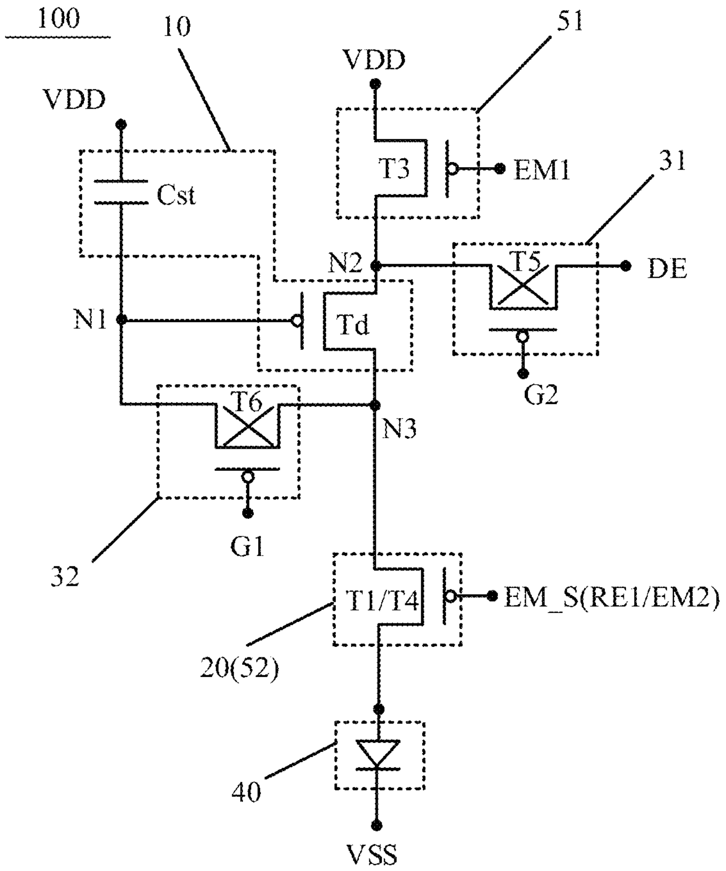
FIG. 23C is a schematic diagram of the pixel circuit shown in FIG. 21 in a light-emitting phase.

FIG. 23C is an equivalent circuit diagram of the pixel circuit 100 shown in FIG. 21 in the light-emitting phase P3. As shown in FIG. 23C, in the light-emitting phase P3, since the voltage of the first scanning signal is at a high level, the sixth transistor T6 is turned off. Since the voltage of the second scanning signal is at a high level, the fifth transistor T5 is turned off. Since the voltage of the first enable signal and the voltage of the second enable signal are at low levels, the third transistor T3 and the fourth transistor T4 are turned on. The voltage signal of the first voltage terminal VDD is transmitted to the second node N2 through the third transistor T3. The driving transistor Td generates a current under control of the voltage of the first node N1 and the voltage signal of the first voltage terminal VDD. The current is transmitted to the light-emitting device 40 through the fourth transistor T4, so that the light-emitting device 40 emits light.

The first reset sub-circuit 20 is used as second sub-circuit 52, which may reduce at least one transistor, thereby simplifying the structure of the pixel circuit 100.

Figure 24:
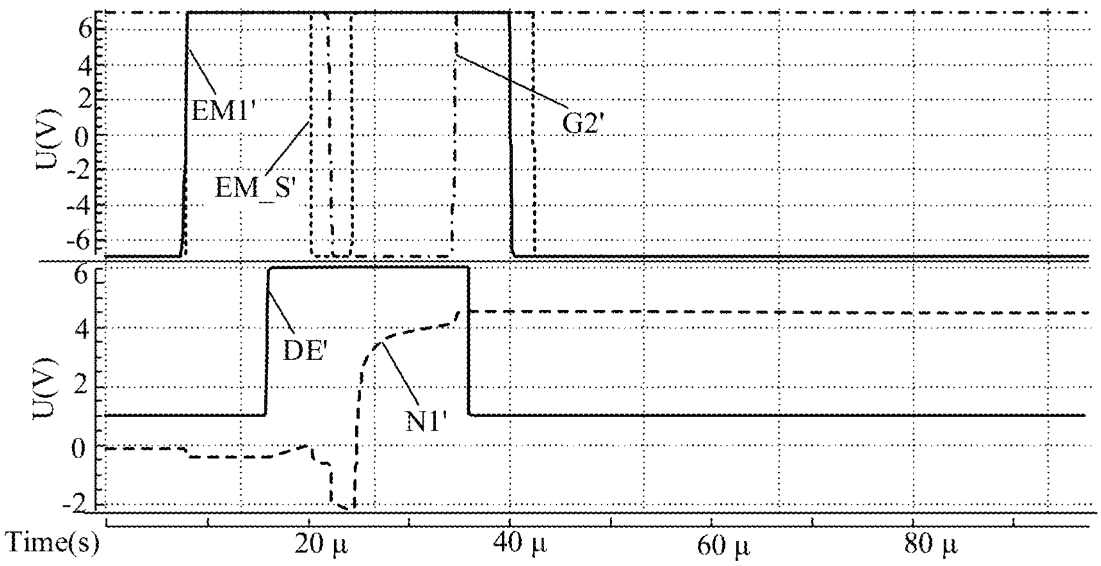
FIG. 24 is a diagram showing a simulation result of signals of another pixel circuit provided in embodiments of the present disclosure.

FIG. 24 shows a simulation result of signals in the driving process of the pixel circuit 100 in one image frame in the fifth possible implementation manner. It can be seen from FIG. 24 that normal initialization and writing of the data signal can be performed on the first node N1.

A sixth possible implementation manner is as follows.

Figure 25:
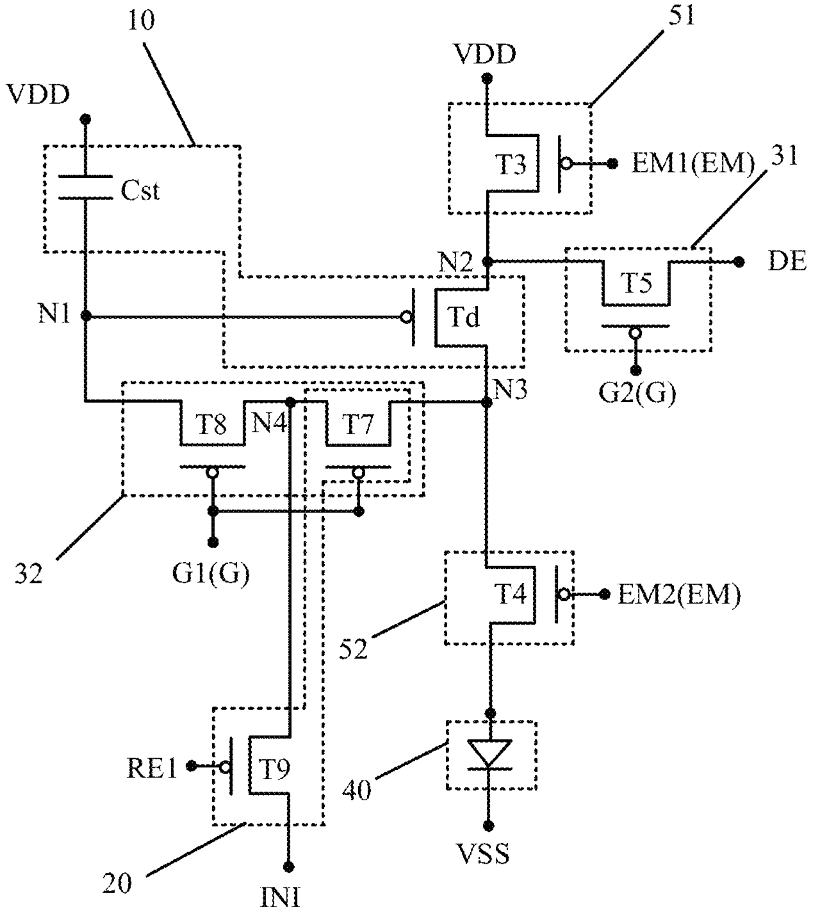
FIG. 25 is a diagram showing a structure of yet another pixel circuit provided in embodiments of the present disclosure.

As shown in FIG. 25, the fourth sub-circuit 32 includes a seventh transistor T7 and an eighth transistor T8.

A gate of the seventh transistor T7 is connected to the first scanning terminal G1, a first electrode of the seventh transistor T7 is connected to the third node N3, and a second electrode of the seventh transistor T7 is connected to the fourth node N4. A gate of the eighth transistor T8 is connected to the first scanning terminal G1, a first electrode of the eighth transistor T8 is connected to the fourth node N4, and a second electrode of the eighth transistor T8 is connected to the first node N1.

On this basis, as shown in FIG. 25, the first reset sub-circuit 20 includes a ninth transistor T9 and the seventh transistor T7.

A gate of the ninth transistor T9 is connected to the first reset signal terminal RE1, a first electrode of the ninth transistor T9 is connected to the initialization signal terminal INI, and a second electrode of the ninth transistor T9 is connected to the fourth node N4.

For structures of the first sub-circuit 51, the second sub-circuit 52, and the third sub-circuit 31, reference can be made to structures of the first sub-circuit 51, the second sub-circuit 52, and the third sub-circuit 31 in the first possible implementation manner, which will not be repeated here.

The first scanning terminal G1 and the second scanning terminal G2 are connected to a same scanning terminal G. The first enable signal terminal EM1 and the second enable signal terminal EM2 are connected to a same enable signal terminal EM.

Figure 26:
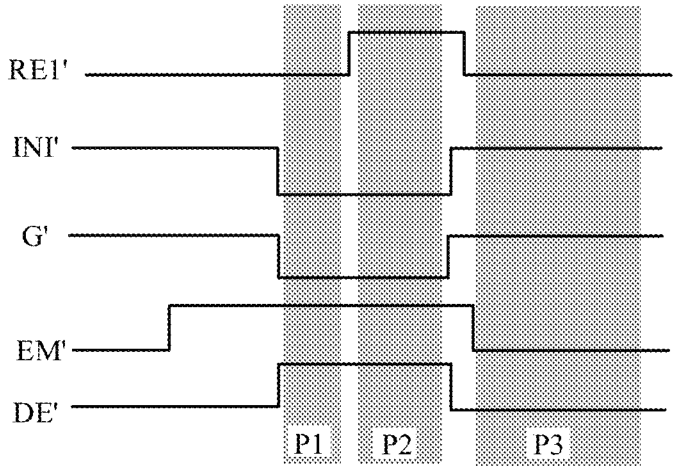
FIG. 26 is a timing diagram of the pixel circuit shown in FIG. 25.

A timing diagram corresponding to the pixel circuit 100 in FIG. 25 is shown in FIG. 26. The first reset signal terminal RE1 transmits the first reset signal RE1', the scanning terminal G transmits a scanning signal G', the enable signal terminal EM transmits an enable signal EM', and the initialization signal terminal INI transmits the initialization signal INI'.

In the initialization phase P1, the voltage of the first reset signal and a voltage of is the scanning signal are at low levels, and a voltage of the enable signal is at a high level.

Figure 27A:
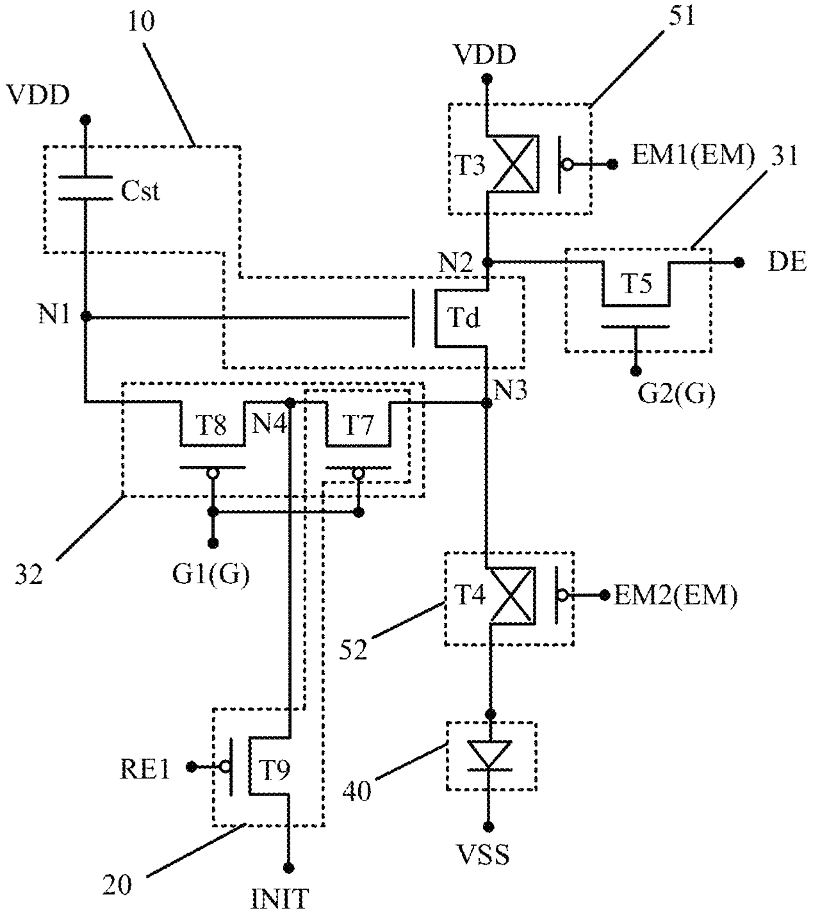
FIG. 27A is a schematic diagram of the pixel circuit shown in FIG. 25 in an initialization phase.

FIG. 27A is an equivalent circuit diagram of the pixel circuit 100 shown in FIG. 25 in the initialization phase P1. As shown in FIG. 27A, in the initialization phase P1, since the voltage of the first reset signal is at a low level, the ninth transistor T9 is controlled to be turned on, and the initialization signal transmitted by the initialization signal terminal INI is transmitted to the fourth node N4 through the ninth transistor T9. For example, in the initialization phase P1, the voltage of the initialization signal is at a first level, which is, for example, −2.5 V. Since the voltage of the scanning signal is at a low level, the seventh transistor T7 and the eighth transistor T8 are turned on, and the initialization signal which is at the first level is transmitted to the first node N1 and the third node N3 through the seventh transistor T7 and the eighth transistor T8, respectively.

In the initialization phase P1, since the voltage of the enable signal is at the high level, the third transistor T3 and the fourth transistor T4 are turned off.

For example, in the initialization phase P1, the data terminal DE may also transmit the data signal for precharging, which is conducive to writing the data signal.

In the data writing phase P2, the voltage of the scanning signal is at a low level, and the voltage of the first reset signal and the voltage of the enable signal are at high levels.

Figure 27B:
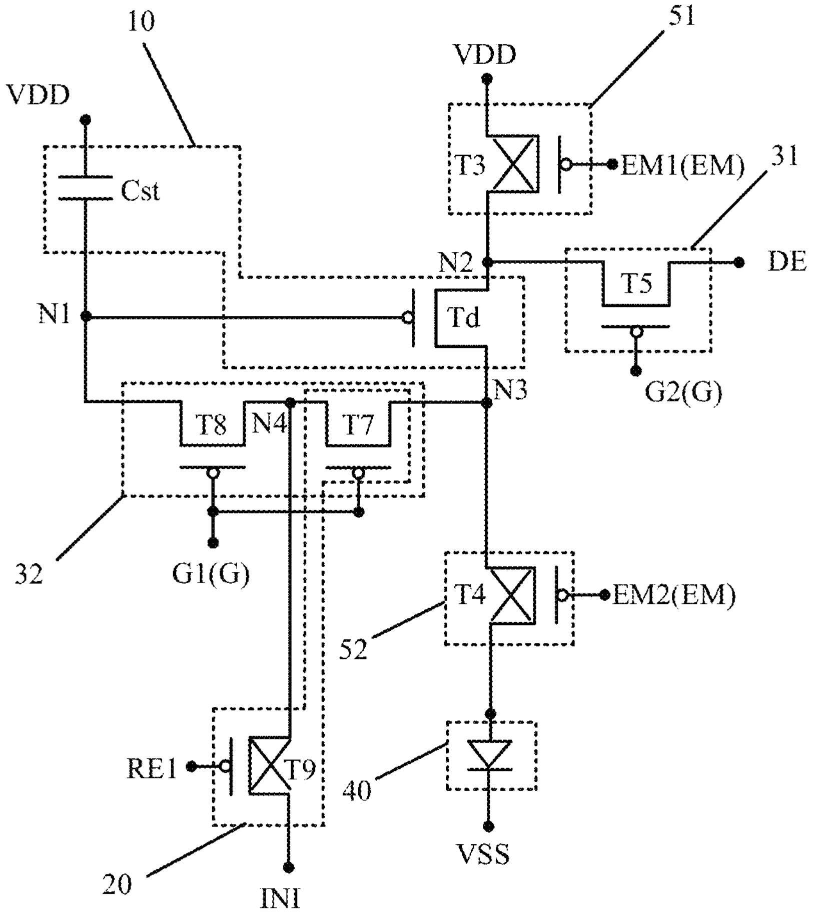
FIG. 27B is a schematic diagram of the pixel circuit shown in FIG. 25 in a data writing phase.

FIG. 27B is an equivalent circuit diagram of the pixel circuit 100 shown in FIG. 25 in the data writing phase P2. As shown in FIG. 27B, in the data writing phase P2, since the voltage of the first reset signal is at a high level, the ninth transistor T9 is turned off. The voltage of the scanning signal is at the low level, the fifth transistor T5 is turned on, and the data signal from the data terminal DE is transmitted to the second node N2 through the fifth transistor T5. The seventh transistor T7 and the eighth transistor T8 are turned on, so that the second electrode and the gate of the driving transistor Td are short-circuited to form a diode structure, and the data signal at the second node N2 is transmitted to the first node N1 through the driving transistor Td, the seventh transistor T7 and the eighth transistor T8. When a difference between the voltage of the first node N1 and a voltage of the second node N2 is reduced to the threshold voltage Vth of the driving transistor Td, the driving transistor Td is turned off.

In the light-emitting phase P3, the voltage of the first reset signal and the voltage is of the enable signal are at low levels, and the voltage of the scanning signal is at a high level.

Figure 27C:
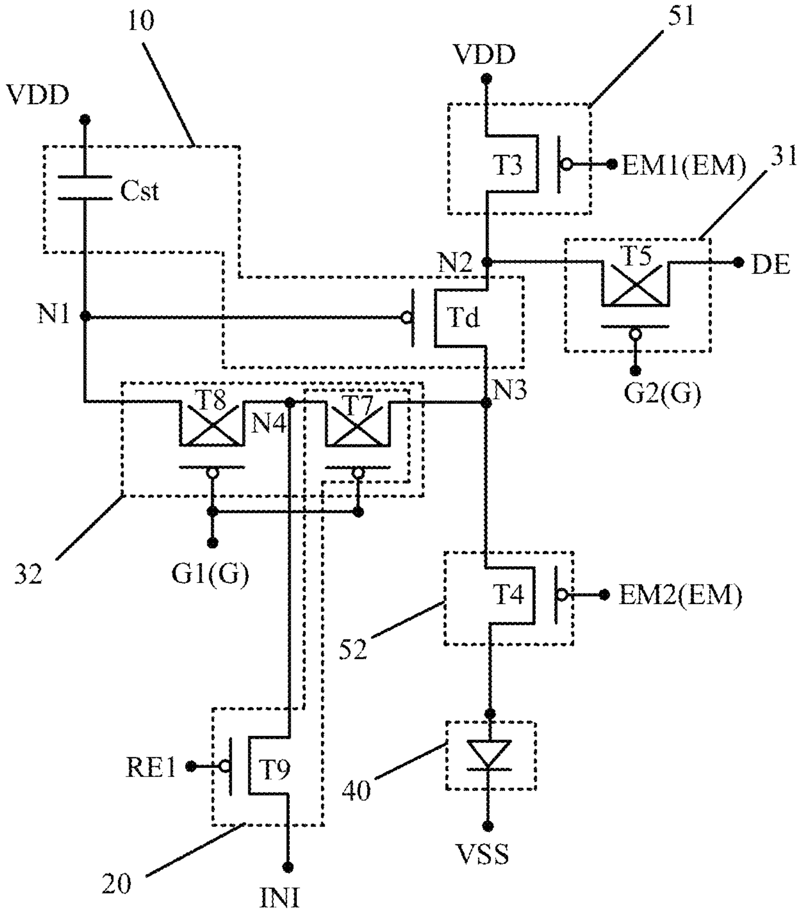
FIG. 27C is a schematic diagram of the pixel circuit shown in FIG. 25 in a light-emitting phase.

FIG. 27C is an equivalent circuit diagram of the pixel circuit 100 shown in FIG. 25 in the light-emitting phase P3. As shown in FIG. 27C, in the light-emitting phase P3, since the voltage of the first reset signal is at a low level, the ninth transistor T9 is controlled to be turned on. The voltage of the initialization signal is at a second level, and the initialization signal which is at the second level is transmitted to the fourth node N4 through the ninth transistor T9. For example, in the light-emitting phase P3, the second level is 4.5 V.

Since the voltage of the scanning signal is at the high level, the fifth transistor T5, the seventh transistor T7 and the eighth transistor T8 are turned off.

Since the voltage of the enable signal is at a low level, the third transistor T3 and the fourth transistor T4 are turned on. The voltage signal of the first voltage terminal VDD is transmitted to the second node N2 through the third transistor T3. The driving transistor Td generates a current under control of the voltage on the first node N1 and the voltage signal of the first voltage terminal VDD. The current is transmitted to the light-emitting device 40 through the fourth transistor T4, so that the light-emitting device 40 emits light.

In the pixel circuit, in the light-emitting phase P3, the initialization signal at the second level is transmitted to the fourth node N4 through the ninth transistor T9, and the second level is at a high level, so that a voltage difference between the first node N1 and the fourth node N4 is reduced. As a result, a leakage current from the first node N1 to the fourth node N4 is reduced, and the voltage of the first node N1 in the image frame may be better maintained, which further reduces the probability of the flicker phenomenon.

Figure 28:
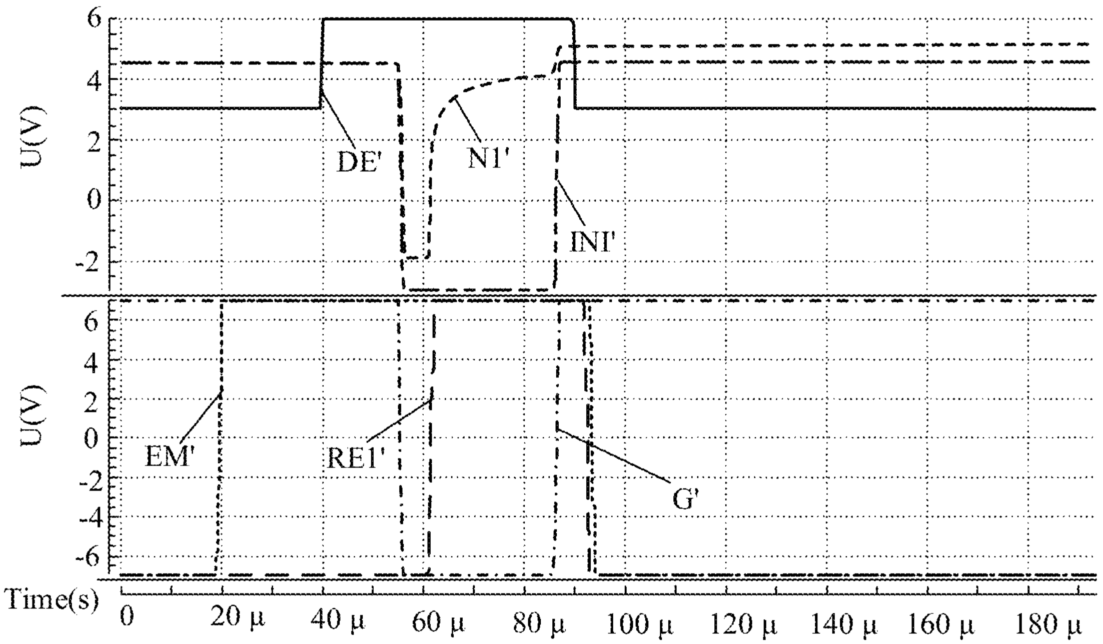
FIG. 28 is a diagram showing a simulation result of signals of yet another pixel circuit provided in embodiments of the present disclosure.

FIG. 28 shows a simulation result of signals in the driving process of the pixel circuit 100 in one image frame in the sixth possible implementation manner. It can be seen from FIG. 28 that normal initialization and writing of the data signal can be performed on the first node N1.

Figure 29:
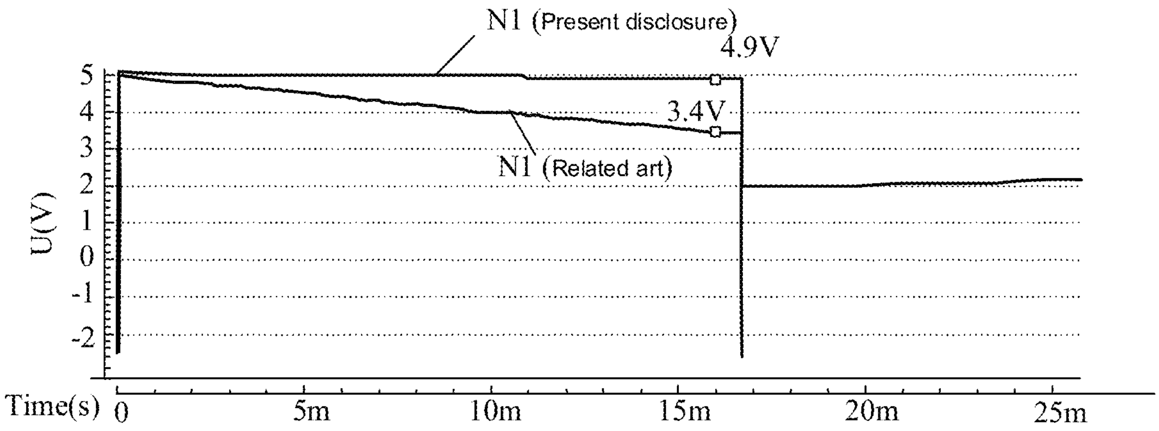
FIG. 29 is a diagram showing a simulation result of voltages of a gate of a driving transistor in another pixel circuit provided in embodiments of the present disclosure and a gate of a driving transistor in a driving circuit provided in the related art.

FIG. 29 is a diagram showing a simulation result, in one image frame, of the voltages of the gate of the driving transistor Td in the pixel circuit 100 provided in the sixth possible implementation manner of the present disclosure and the gate of the driving transistor Td' the driving circuit 100' provided in the related art. In the image frame, the is voltage of the gate of the driving transistor Td' in the driving circuit 100' provided in the related art changes from 5 V to 3.4 V, and the change amount ΔV of the voltage thereof reaches 1.6 V. The voltage of the gate of the driving transistor Td in the pixel circuit 100 provided in the sixth possible implementation manner of the present disclosure changes from 5 V to 4.9 V, and the change amount ΔV of the voltage thereof is 0.1 V. The pixel circuit 100 provided in the embodiments of the present disclosure can effectively maintain the voltage of the gate of the driving transistor Td, which is conducive to improving the flicker phenomenon, and thus the pixel circuit may be used in the display panel with an ultra-low frequency (e.g., 1 Hz).

A seventh possible implementation manner is as follows.

Figure 30A:
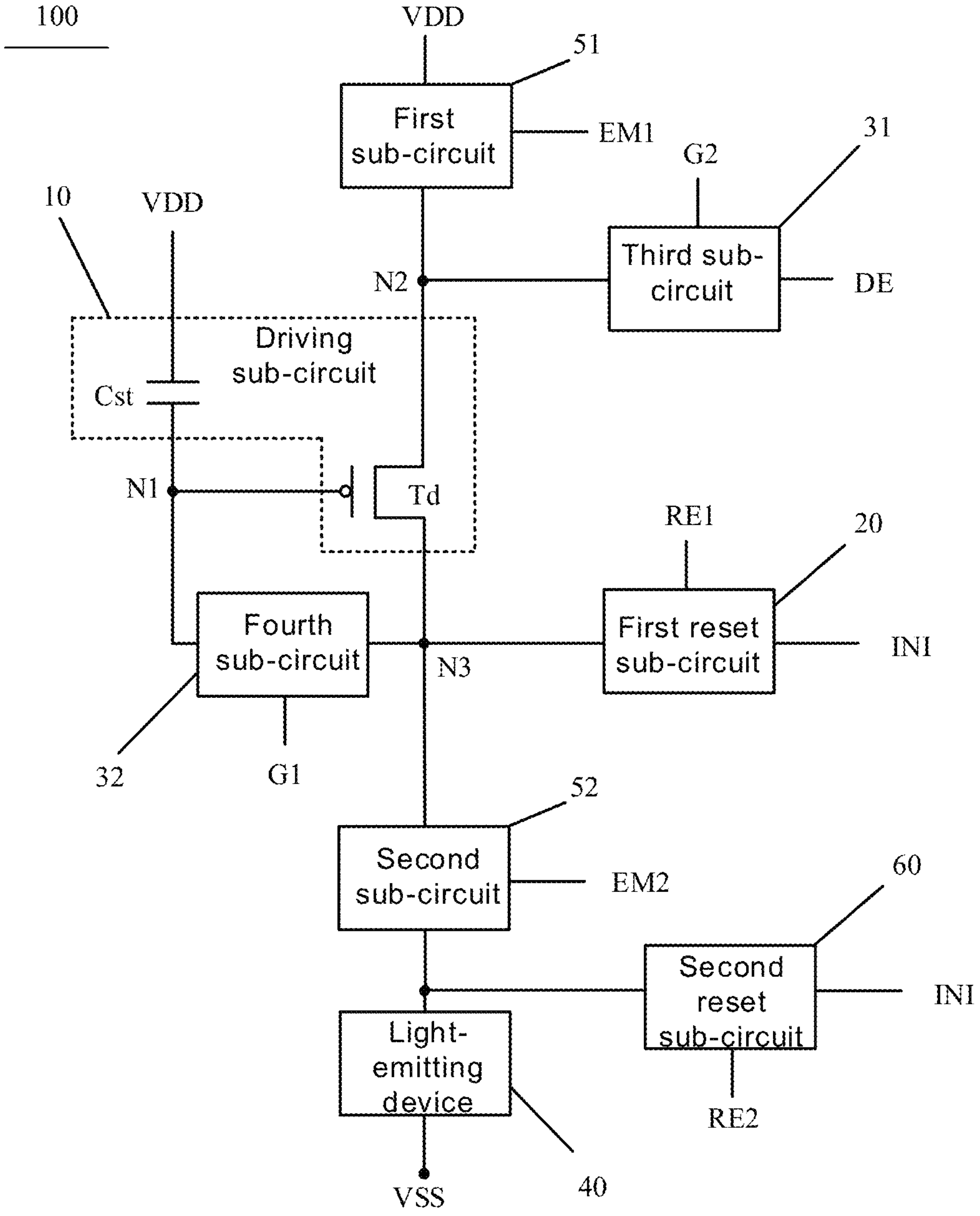
FIG. 30A is a structural diagram of yet another pixel circuit provided in embodiments of the present disclosure.

On the basis of the first possible implementation manner, the second possible implementation manner, the third possible implementation manner, and the sixth possible implementation manner, as shown in FIG. 30A, the pixel circuit 100 further includes a second reset sub-circuit 60, and the second reset sub-circuit 60 is connected to the anode of the light-emitting device 40, a second reset signal terminal RE2 and the initialization signal terminal INI. The second reset signal terminal RE2 is configured to receive a second reset signal and transmit the second reset signal to the second reset sub-circuit 60. The initialization signal terminal INI is further configured to transmit the initialization signal to the second reset sub-circuit 60.

The second reset sub-circuit 60 is configured to, in the initialization phase P1 or the data writing phase P2, transmit the initialization signal from the initialization signal terminal INI to the light-emitting device under control of the second reset signal received at the second reset signal terminal RE2, so as to reset the anode of the light-emitting device 40.

The second reset sub-circuit 60 may reset the anode of the light-emitting device 40 to avoid effect of the residual voltage of the anode of the light-emitting device 40 on a next image frame when an image frame ends.

In some embodiments, the second reset signal terminal RE2 and the first reset signal terminal RE1 are connected to a same reset signal terminal. In this way, the structure of the pixel circuit 100 may be simplified.

It will be noted that, in the case where the first reset signal terminal RE1 and the second reset signal terminal RE2 are connected to the same reset signal terminal, the first reset signal and the second reset signal are a same reset signal. In this case, the second reset sub-circuit 60 is configured to, in the initialization phase P1, transmit the initialization signal from the initialization signal terminal INI to the anode of the light-emitting device 40, so as to reset the anode of the light-emitting device 40.

Figure 30B:
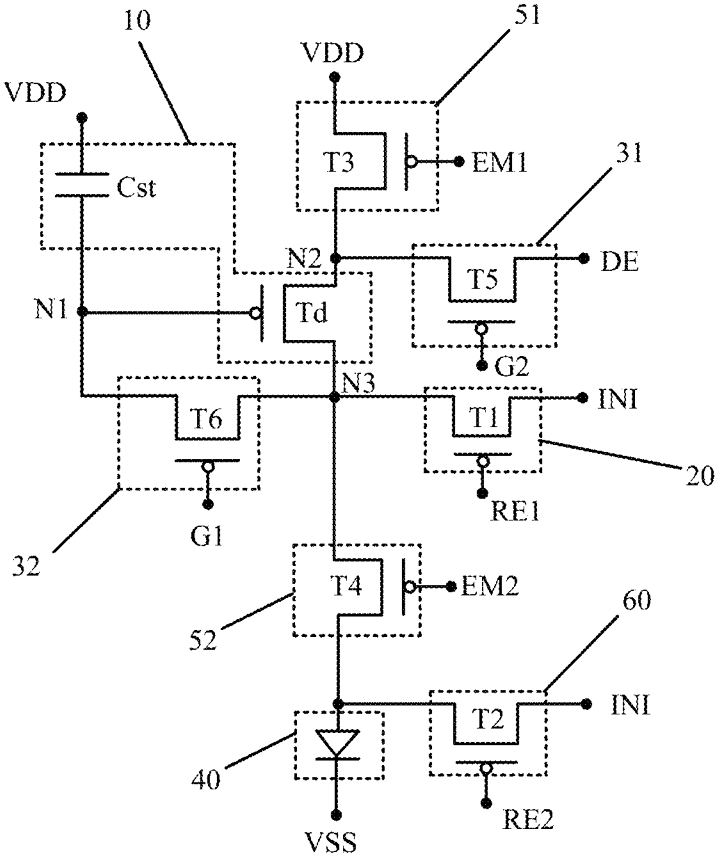
FIG. 30B is a diagram showing a structure of the pixel circuit shown in FIG. 30A.

In some examples, as shown in FIG. 30B, the second reset sub-circuit 60 includes a second transistor T2. A gate of the second transistor T2 is connected to the second reset signal terminal RE2, a first electrode of the second transistor T2 is connected to the initialization signal terminal INI, and a second electrode of the second transistor T2 is connected to the anode of the light-emitting device 40.

In some other examples, the second reset sub-circuit 60 includes a plurality of second transistors T2 connected in parallel or in series. In a case where the second reset sub-circuit 60 includes the plurality of second transistors T2 connected in parallel, gates of the plurality of second transistors T2 are connected to the second reset signal terminal RE2, first electrodes of the plurality of second transistors T2 are connected to the initialization signal terminal INI, and second electrodes of the plurality of second transistors T2 are connected to the anode of the light-emitting device 40. In a case where the second reset sub-circuit 60 includes the plurality of second transistors T2 connected in series, the plurality of second transistors T2 are connected in sequence. A second electrode of a first second transistor T2 is connected to a first electrode of a second second transistor T2, and so on. The gates of the plurality of second transistors T2 are connected to the second reset signal terminal RE2, a first electrode of the first second transistor T2 in the plurality of second transistors T2 is connected to the initialization signal terminal INI, and a second electrode of a last second transistor T2 in the plurality of second transistors T2 is connected to the anode of the light-emitting device 40. The above descriptions are merely examples of the second reset sub-circuit 60, and other structures with the same function as the second reset sub-circuit 60 will not be repeated here, but shall all be included in the protection scope of the present disclosure.

Figure 31A:
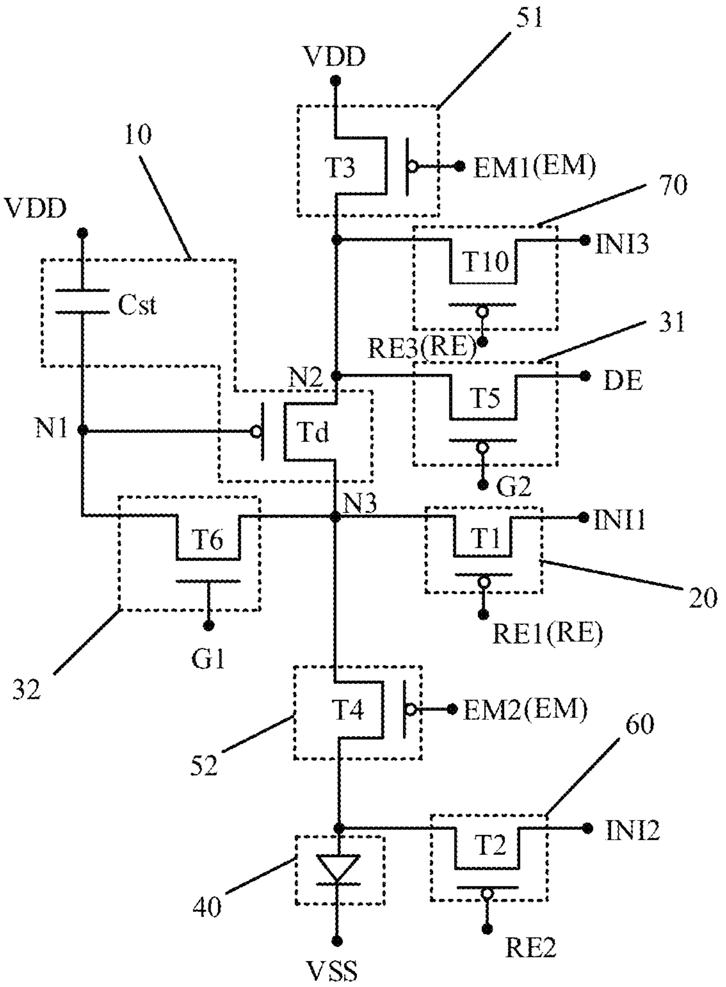
FIG. 31A is a diagram showing a structure of yet another pixel circuit provided in embodiments of the present disclosure.

In some embodiments, for the seventh possible implementation manner, referring to FIG. 31A, an initialization signal terminal to which the first reset sub-circuit 20 is connected is a first initialization signal terminal INI1, and the first initialization signal is terminal INI1 is configured to receive a first initialization signal and transmit the first initialization signal to the first reset sub-circuit 20. An initialization signal terminal to which the second reset sub-circuit 60 is connected is a second initialization signal terminal INI2, and the second initialization signal terminal INI2 is configured to receive a second initialization signal and transmit the second initialization signal to the second reset sub-circuit 60. For circuit configurations of the first reset sub-circuit 20 and the second reset sub-circuit 60, reference may be made to the description above, which will not be repeated here.

An eighth possible implementation manner is as follows.

On the basis of the first possible implementation manner to the seventh possible implementation manner, as shown in FIG. 31A, the pixel circuit 100 further includes a third reset sub-circuit 70, and the third reset sub-circuit 70 is connected to the second node N2, a third reset signal terminal RE3 and a third initialization signal terminal INI3. The third reset signal terminal RE3 is configured to receive a third reset signal and transmit the third reset signal to the third reset sub-circuit 70. The third initialization signal terminal INI3 is configured to receive a third initialization signal and transmit the third initialization signal to the third reset sub-circuit 70.

The third reset sub-circuit 70 is configured to: in the initialization phase P1, under control of the third reset signal received at the third reset signal terminal RE3, transmit the third initialization signal from the third initialization signal terminal INI3 to the second node N2, so as to reset the second node N2.

The third reset sub-circuit 70 may reset the second node N2, and enable the driving transistor Td to have a stable bias voltage, so as to reduce the hysteresis effect caused by the voltage change of the data signal at the gate of the driving transistor when different image frames are switched. As a result, the short-term residual image and the flicker phenomenon may be ameliorated.

In some examples, as shown in FIG. 31A, the third reset sub-circuit 70 includes a tenth transistor T10. A gate of the tenth transistor T10 is connected to the third reset signal terminal RE3, a first electrode of the tenth transistor T10 is connected to the third initialization signal terminal INI3, and a second electrode of the tenth transistor T10 is connected to the second node N2.

In some other examples, the third reset sub-circuit 70 includes a plurality of tenth transistors T10 connected in parallel or in series. In a case where the third reset sub-circuit 70 includes the plurality of tenth transistors T10 connected in parallel, gates of the plurality of tenth transistors T10 are connected to the third reset signal terminal RE3, first electrodes of the plurality of tenth transistors T10 are connected to the third initialization signal terminal INI3, and second electrodes of the plurality of tenth transistors T10 are connected to the second node N2. In a case where the third reset sub-circuit 70 includes the plurality of tenth transistors T10 connected in series, the plurality of tenth transistors T10 are connected in sequence. A second electrode of a first tenth transistor T10 is connected to a first electrode of a second tenth transistor T10, and so on. The gates of the plurality of tenth transistors T10 are connected to the third reset signal terminal RE3, and a first electrode of the first tenth transistor T10 in the plurality of tenth transistors T10 is connected to the third initialization signal terminal INI3, a second electrode of a last tenth transistor T10 in the plurality of tenth transistors T10 is connected to the second node N2. The above descriptions are merely examples of the third reset sub-circuit 70, and other structures with the same function as the third reset sub-circuit 70 will not be repeated here, but shall all be included in the protection scope of the present disclosure.

In some embodiments, the sixth transistor T6 included in the fourth sub-circuit 32 is an oxide thin film transistor. By setting the sixth transistor T6 as the oxide thin film transistor, it may be possible to help reduce the leakage at the gate of the driving transistor Td, thereby ensuring the stability of the potential at the gate of the driving transistor Td.

In some examples, the sixth transistor T6 is an N-type transistor, and other transistors in the pixel circuit 100 are all P-type transistors.

Figure 31B:
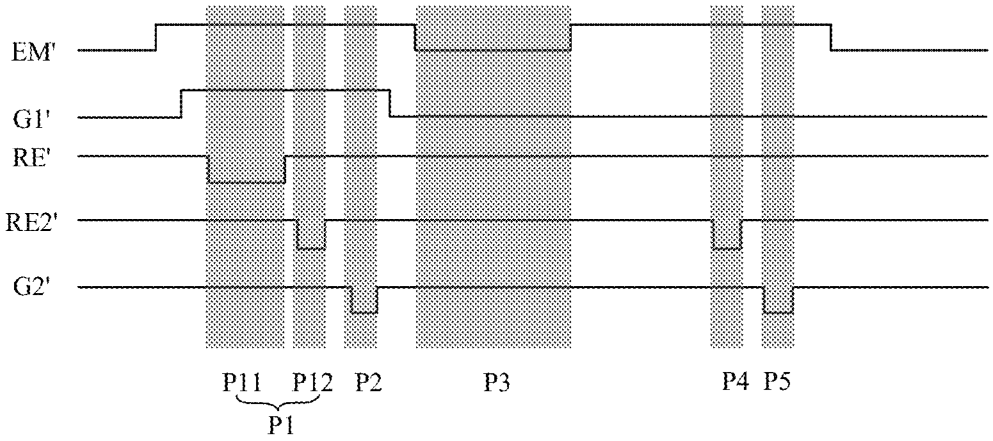
FIG. 31B is a diagram of the pixel circuit shown in FIG. 31A.

In some embodiments, as shown in FIG. 31B, in addition to the initialization phase P1, the data writing phase P2 and the light-emitting phase P3, the driving process of the pixel circuit 100 in the image frame further includes a second initialization phase P4 and a black insertion phase P5, and the second initialization phase P4 and the black insertion phase P5 are after the light-emitting phase. In this case, the initialization phase P1 before the light-emitting phase is referred to as a first initialization phase.

For the eighth possible implementation manner, as shown in FIG. 31A, the first enable signal terminal EM1 and the second enable signal terminal EM2 are connected to the same enable signal terminal EM. The first reset signal terminal RE1 and the third reset signal terminal RE3 are connected to the same reset signal terminal RE.

On this basis, as shown in FIG. 31B, the first initialization phase P1 includes a first node reset phase P11 and an anode reset phase P12.

In the first node reset phase P11, the reset signal RE' transmitted by the reset signal terminal RE is at a low level, and the enable signal EM' transmitted by the enable signal terminal EM, the first scanning signal G1' transmitted by the first scanning terminal G1, the second reset signal RE2' transmitted by the second reset signal terminal RE2, and the second scanning signal G2' transmitted by the second scanning terminal G2 are each at a high level. At this time, the reset signal RE' controls the first transistor T1 and the tenth transistor T10 to be turned on, so that the first initialization signal is transmitted to the third node N3, and the third initialization signal is transmitted to the second node N2. At the same time, the first scanning signal G1' controls the sixth transistor T6 to be turned on, so that the first initialization signal at the third node N3 is transmitted to the first node N1. The gate-source voltage Vgs of the driving transistor Td is equal to a voltage difference between the first initialization signal and the third initialization signal, so that the driving transistor Td can have the stable bias voltage, which resets the driving transistor Td. As a result, it may be possible to reduce the hysteresis effect caused by the voltage change of the data signal at the gate of the driving transistor when different image frames are switched, thereby ameliorating the short-term residual image and the flicker phenomenon.

In the anode reset phase P12, the second reset signal RE2' transmitted by the second reset signal terminal RE2 is at a low level, and the enable signal EM' transmitted by the enable signal terminal EM, the first scanning signal G1' transmitted by the first scanning terminal G1, the reset signal RE' transmitted by is the reset signal terminal RE and the second scanning signal G2' transmitted by the second scanning terminal G2 are each at a high level. At this time, the second reset signal RE2' controls the second transistor T2 to be turned on, so that the second initialization signal is transmitted to the anode of the light-emitting device 40 to reset the anode of the light-emitting device 40.

For specific driving processes of the pixel circuit 100 in the data writing phase P2 and the light-emitting phase P3, reference may be made to the descriptions of the embodiments above, which will not be repeated here.

In the second initialization phase P4, the second reset signal RE2' transmitted by the second reset signal terminal RE2 and the first scanning signal G1' transmitted by the first scanning terminal G1 are each at a low level, and the enable signal EM' transmitted by the enable signal terminal EM, the reset signal RE' transmitted by the reset signal terminal RE and the second scanning signal G2' transmitted by the second scanning terminal G2 are each at a high level. At this time, the second reset signal RE2' controls the second transistor T2 to be turned on, so that the second initialization signal is transmitted to the anode of the light-emitting device 40 to reset the anode of the light-emitting device 40.

In the black insertion phase P5, the first scanning signal G1' transmitted by the first scanning terminal G1 and the second scanning signal G2' transmitted by the second scanning terminal G2 are each at a low level, and the enable signal EM' transmitted by the enable signal terminal EM, the reset signal RE' transmitted by the reset signal terminal RE, and the second reset signal RE2' transmitted by the second reset signal terminal RE2 are each at a high level. At this time, the second scanning signal G2' controls the fifth transistor T5 to be turned on, so that a black insertion data signal from the data terminal DE is transmitted to the second node N2. For example, the black insertion data signal transmitted by the data terminal DE at the black insertion phase P5 has a different size from the data signal transmitted by the data terminal DE at the data writing phase P2. In this way, the driving transistor Td can have the stable bias voltage, which resets the driving transistor Td. As a result, it may be possible to reduce the hysteresis effect caused by the voltage change of the data signal at the gate of the driving transistor when is different image frames are switched, thereby ameliorating the short-term residual image and the flicker phenomenon.

A ninth possible implementation manner is as follows.

Figure 31C:
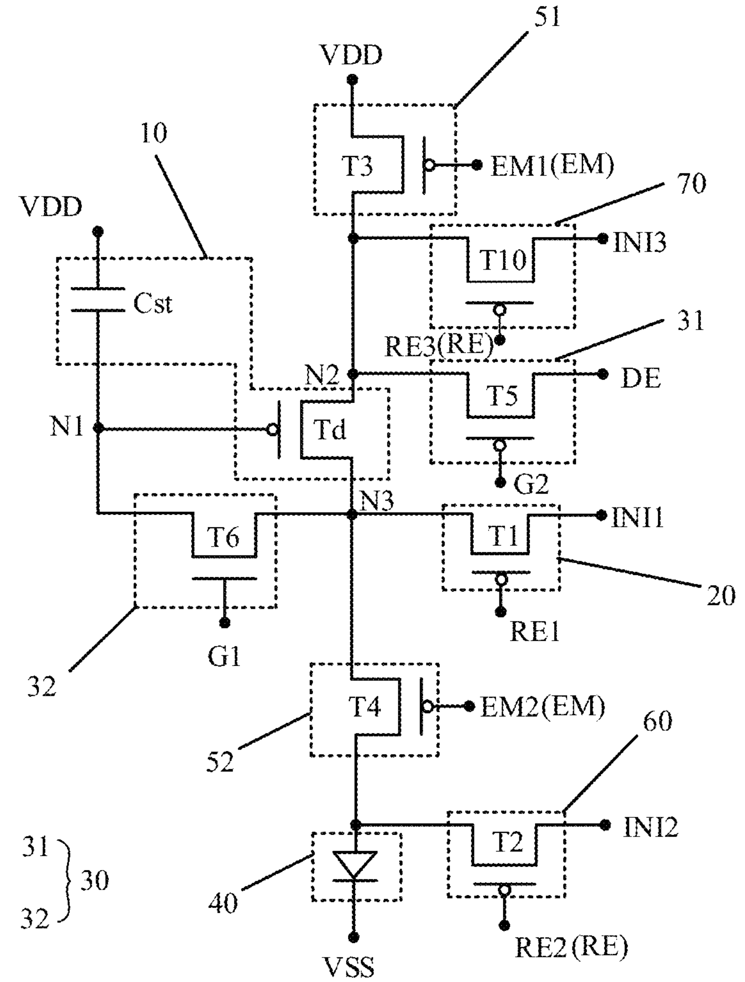
FIG. 31C is a diagram showing a structure of yet another pixel circuit provided in embodiments of the present disclosure.

As shown in FIG. 31C, the pixel circuit 100 provided in the ninth possible implementation manner differs from the pixel circuit 100 provided in the eighth possible implementation manner in that, for the pixel circuit 100 provided in the ninth possible implementation manner, the first reset signal terminal RE1 is not connected to the third reset signal terminal RE3, and the second reset signal terminal RE2 and the third reset signal terminal RE3 are connected to a same reset signal terminal RE.

In this case, the second node N2 and the anode of the light-emitting device 40 may be reset at the same time with using the same reset signal terminal RE, which helps reduce the number of reset signal lines connected to the reset signal terminal RE. In addition, the reset signal terminal RE resets the anode of the light-emitting device 40, which can avoid the effect of the residual voltage of the anode of the light-emitting device 40 on the next image frame when the image frame ends.

Figure 32:
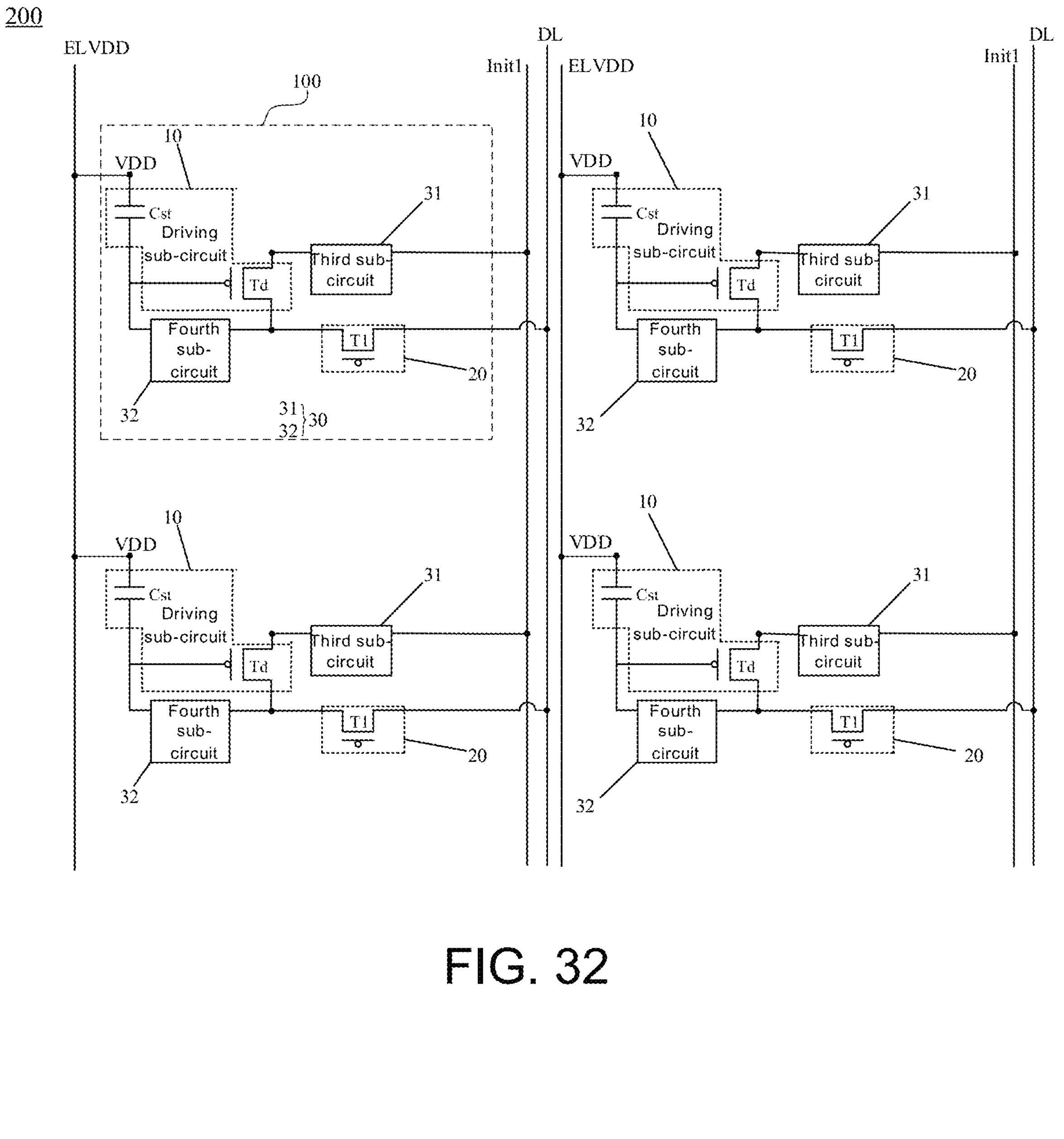
FIG. 32 is a diagram showing connections of circuits in yet another display panel provided in embodiments of the present disclosure.

Some embodiments of the present disclosure also provide a display panel 200. As shown in FIG. 32, the display panel 200 includes a plurality of pixel circuits 100, the pixel circuit 100 includes a driving sub-circuit 10, a writing sub-circuit 30 and a first reset sub-circuit 20. The driving sub-circuit 10 includes a driving transistor Td and a storage capacitor Cst. For a circuit configuration of each sub-circuit of the pixel circuit 100, reference may be made to the above descriptions.

Figure 33:
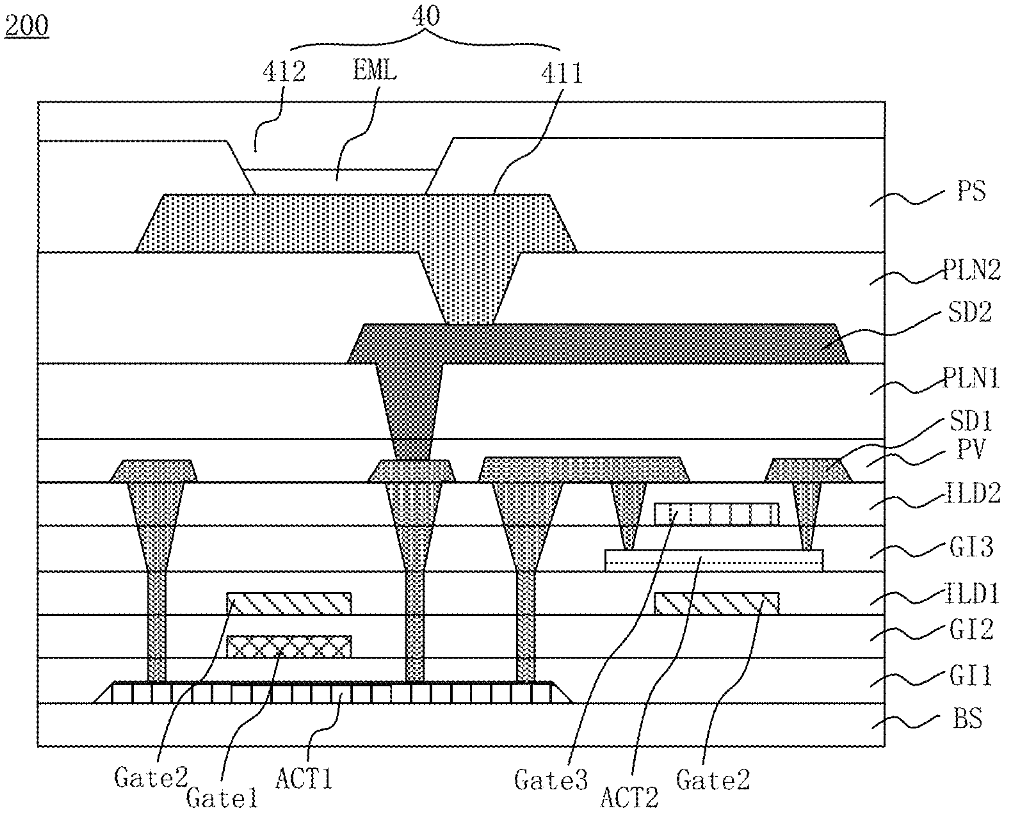
FIG. 33 is a sectional view of yet another display panel provided in embodiments of the present disclosure.

As shown in FIG. 33, the display panel 200 includes a substrate BS, and a first active layer ACT1, a first gate conductive layer Gate1, a second gate conductive layer Gate2, a first connection layer SD1 and a second connection layer SD2 that are sequentially arranged on the substrate BS in a thickness direction of the display panel 200. In the first active layer ACT1, the first gate conductive layer Gate1, the second gate conductive layer Gate2, the first connection layer SD1 and the second connection layer SD2, any two adjacent layers are provided at least one insulating layer therebetween.

In some examples, a second active layer ACT2 and a connection line layer Gate3 may be sequentially arranged in a direction away from the substrate BS and between the second gate conductive layer Gate2 and the first connection layer SD1; and in the second gate conductive layer Gate2, the second active layer ACT2, the connection line layer Gate3 and the first connection layer SD1, any two adjacent layers are provided at least one insulating layer therebetween.

In this case, the first active layer ACT1, the first gate conductive layer Gate1, the second gate conductive layer Gate2, the second active layer ACT2, the connection line layer Gate3, the first connection layer SD1 and the second connection layer SD2 are sequentially arranged on the substrate BS. For example, a first insulating layer GI1 is provided between the first active layer ACT1 and the first gate conductive layer Gate1; a second insulating layer GI2 is provided between the first gate conductive layer Gate1 and the second gate conductive layer Gate2; a first interlayer insulating layer ILD1 is provided between the second gate conductive layer Gate2 and the second active layer ACT2; a third insulating layer GI3 is provided between the second active layer ACT2 and the connection line layer Gate3; a second interlayer insulating layer ILD2 is provided between the connection line layer Gate3 and the first connection layer SD1; and a passivation layer PV and a first planarization layer PLN1 are provided between the first connection layer SD1 and the second connection layer SD2.

As shown in FIG. 33, a portion in the first connection layer SD1 and a portion in the first active layer ACT1 may be connected through a via hole provided in an insulating layer that is between the first connection layer SD1 and the first active layer ACT1; and a portion in the second connection layer SD2 and a portion in the first connection layer SD1 may be connected through a via hole provided in an insulating layer that is between the second connection layer SD2 and the first connection layer SD1.

In some examples, the display panel 200 includes a plurality of light-emitting devices 40. Each light-emitting device 40 includes an anode 411, a light-emitting layer EML and a cathode 412 that are sequentially stacked in the direction away from the substrate BS. A second planarization layer PLN2 is provided between the anode 411 and the second connection layer SD2. The anode 411 may is be connected to a corresponding portion in the second connection layer SD2 through a via hole provided in the second planarization layer PLN2.

The display panel 200 further includes a pixel defining layer PS. The pixel defining layer PS has openings therein, and the light-emitting layer EML is arranged in the opening.

Different voltages are applied to the anode 411 and the cathode 412, so as to drive the light-emitting layer EML to emit light. As a result, the light-emitting device 40 emits light.

Figure 34:
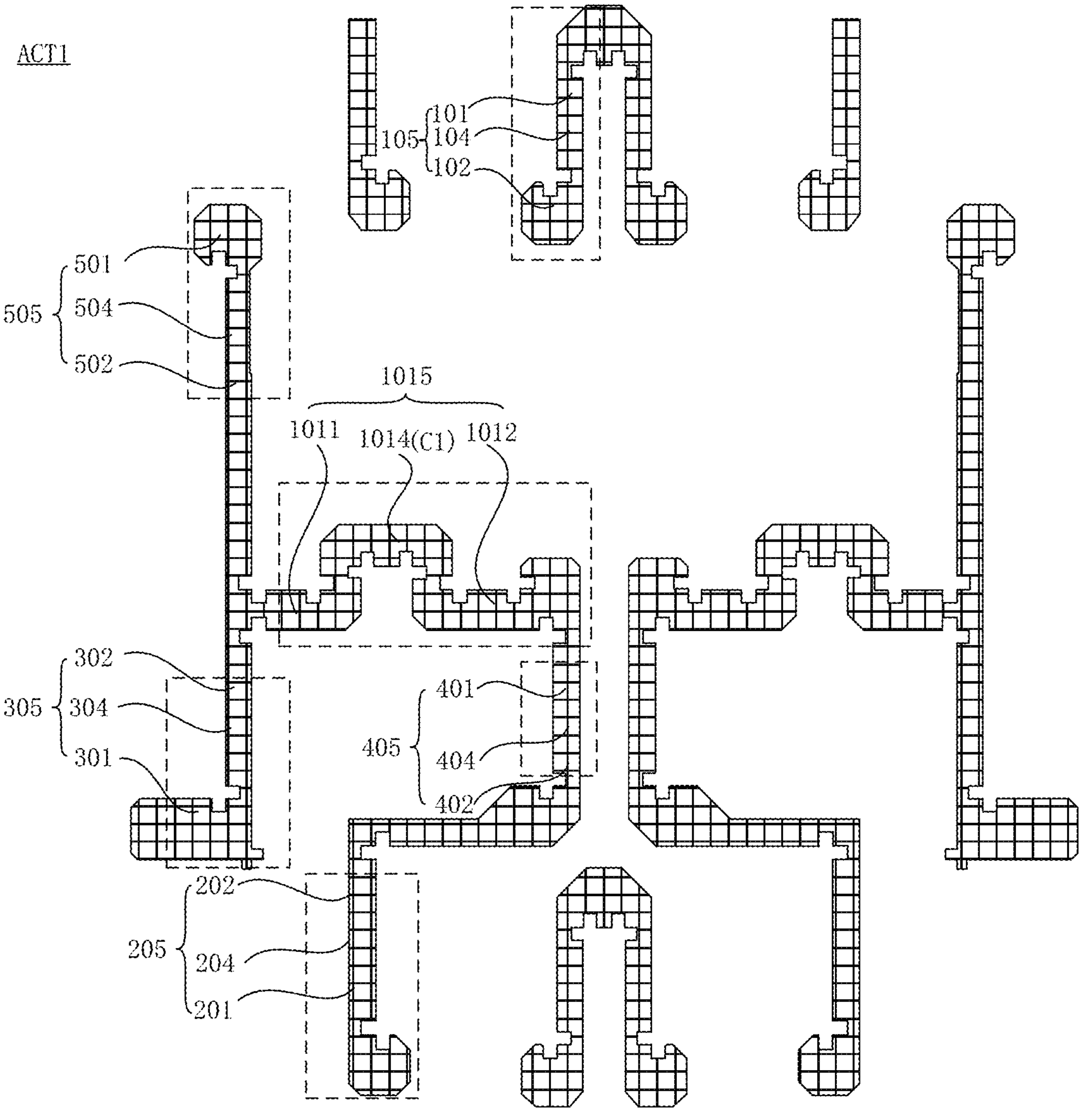
FIG. 34 is a top view of a first active layer provided in embodiments of the present disclosure.
Figure 35:
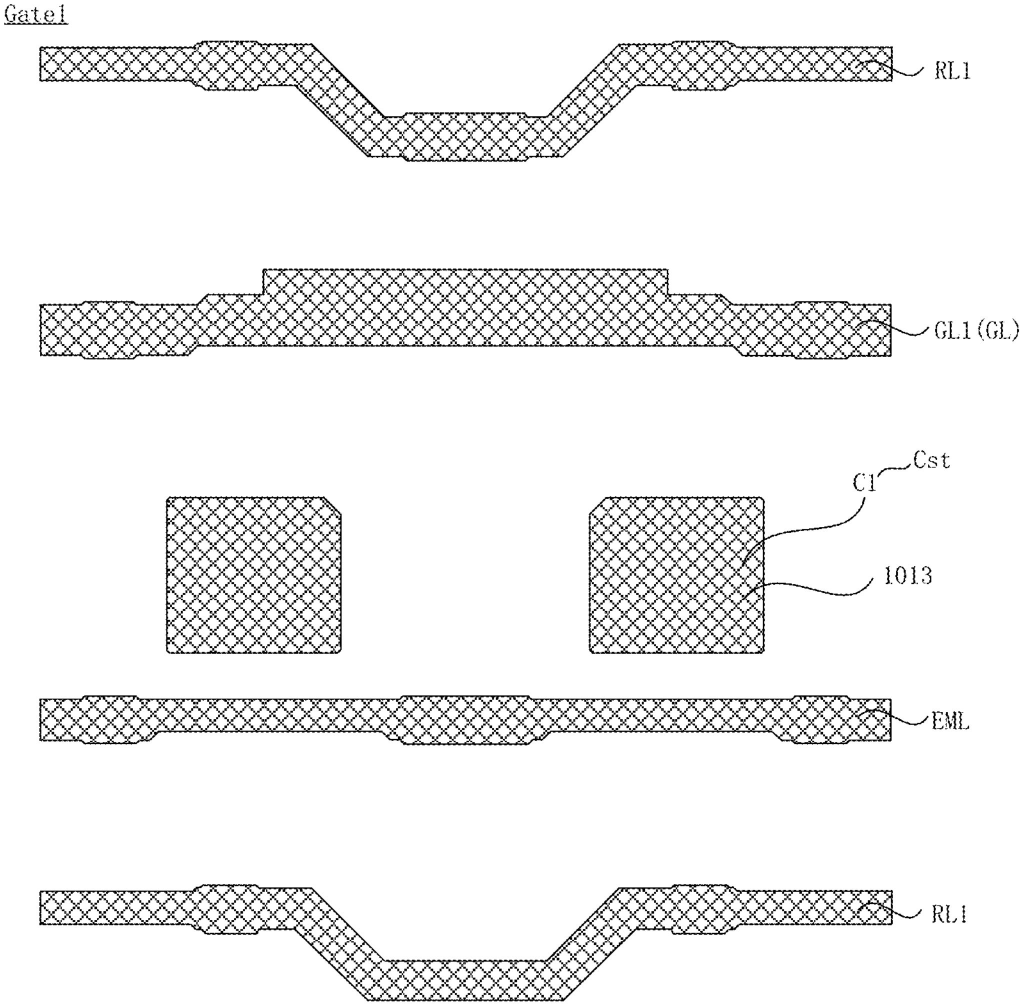
FIG. 35 is a top view of a first gate conductive layer provided in embodiments of the present disclosure.
Figure 36:
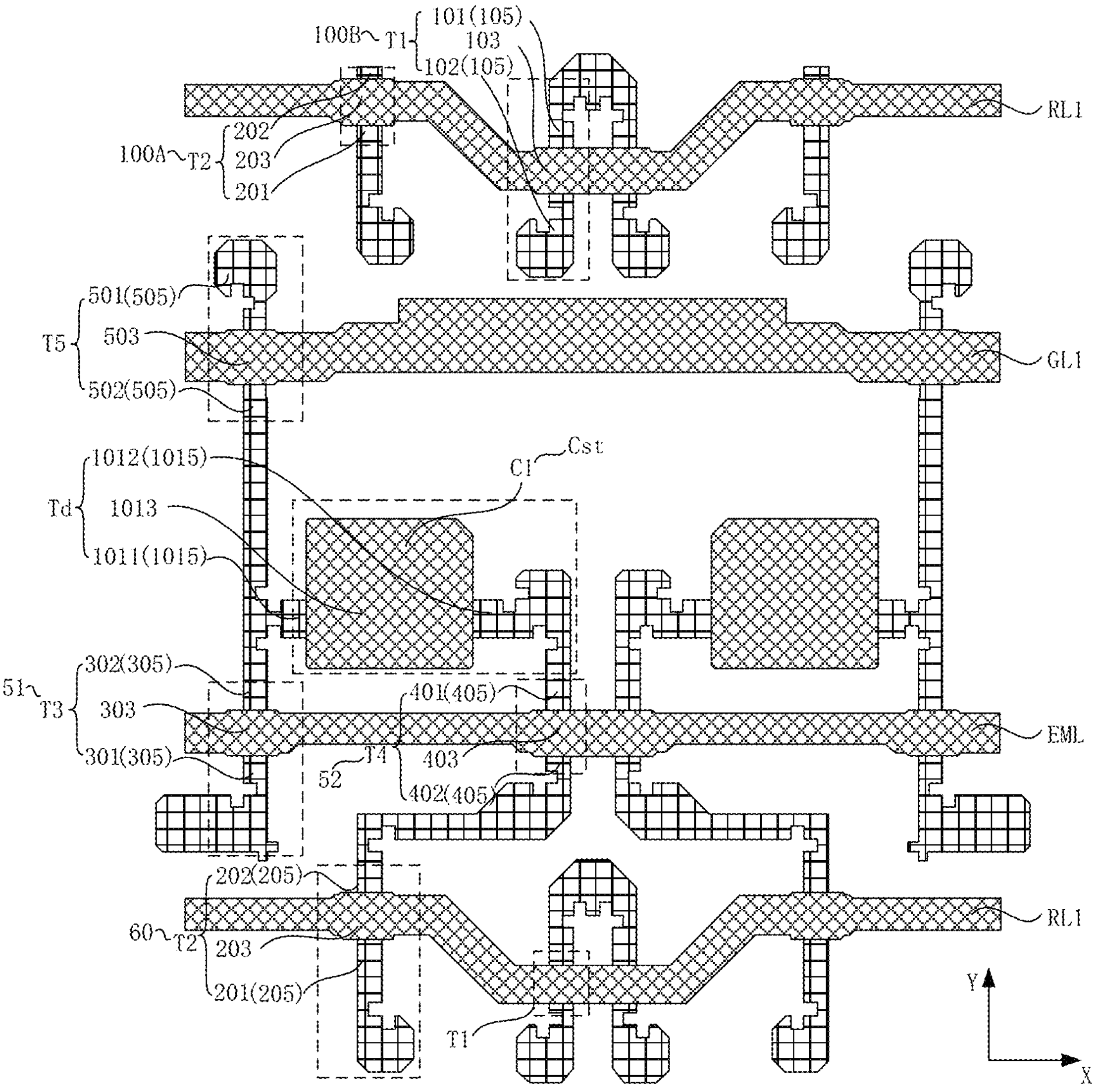
FIG. 36 is a top view of some film layers provided in embodiments of the present disclosure.

As shown in FIGS. 34 to 36, the driving transistor Td includes a gate 1013 and an active pattern 1015. The active pattern 1015 includes a source portion 1011 and a drain portion 1012. The source portion may serve as the first electrode of the driving transistor Td, and the drain portion may serve as the second electrode of the driving transistor Td. In addition, the active pattern 1015 further includes a channel portion 1014. The channel portion 1014 is located between the source portion 1011 and the drain portion 1012, and the channel portion 1014 overlaps with the gate 1013 in the thickness direction of the display panel 200.

In some examples, as shown in FIGS. 34 and 35, the active pattern 1015 is located in the first active layer ACT1, and the gate 1013 is located in the first gate conductive layer Gate1.

Figure 37A:
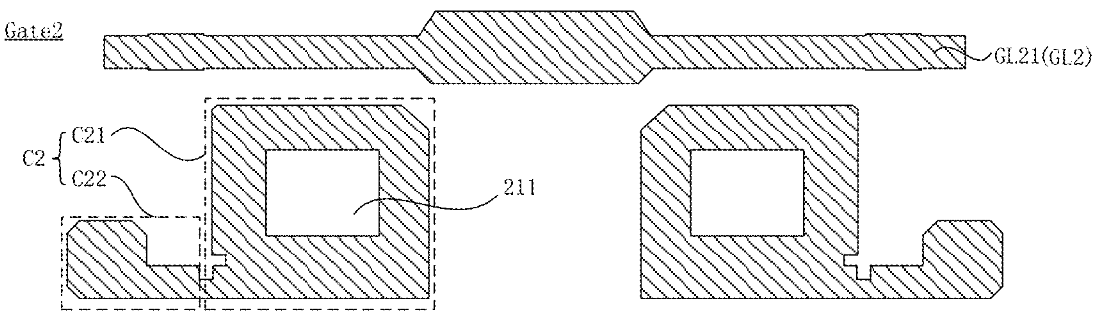
FIG. 37A is a top view of a second gate conductive layer provided in embodiments of the present disclosure.
Figure 37B:
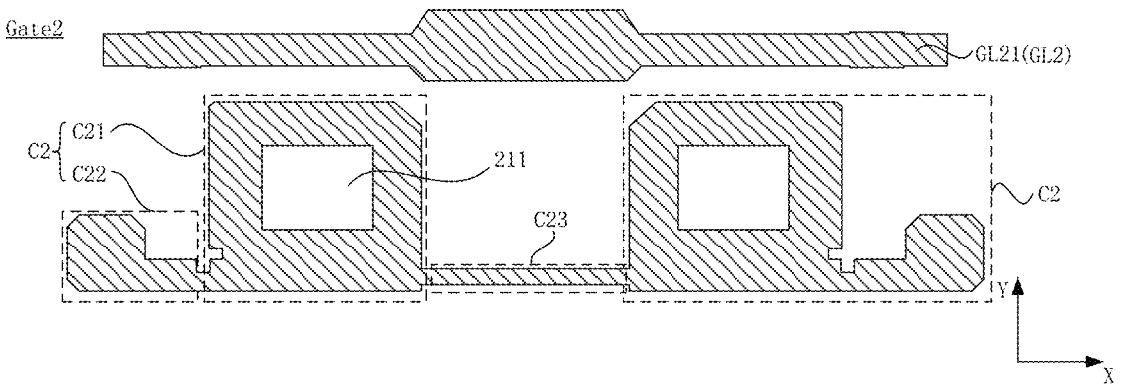
FIG. 37B is a top view of another second gate conductive layer provided in embodiments of the present disclosure.
Figure 38:
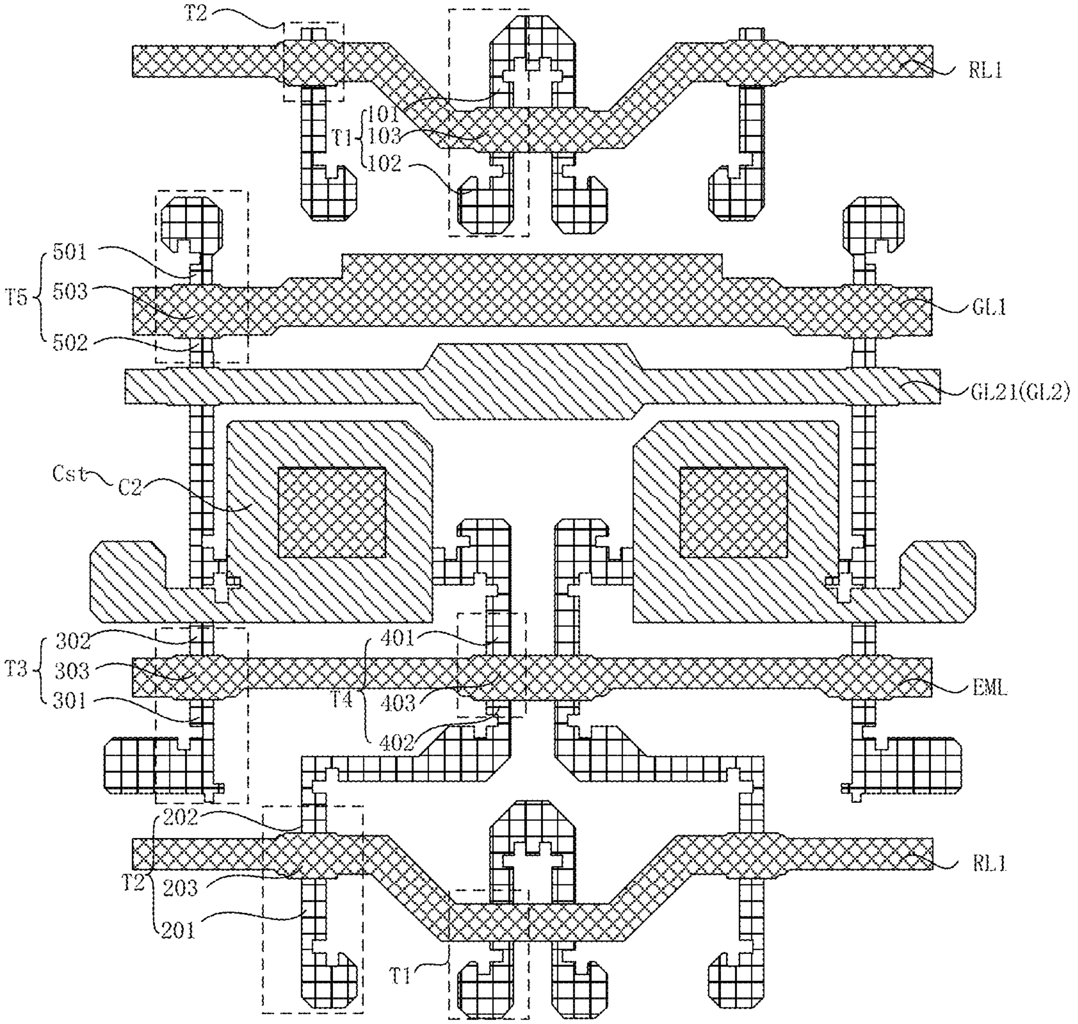
FIG. 38 is a top view of some other film layers provided in embodiments of the present disclosure.

As shown in FIGS. 35 to 38, the storage capacitor Cst includes a first storage electrode C1 and a second storage electrode C2, and the first storage electrode C1 and the gate 1013 share a same electrode. That is, the electrode may serve as both the first storage electrode C1 and the gate 1013. Referring to FIGS. 32 and 38, the second storage electrode C2 is used to be connected to a first voltage signal line ELVDD, and a portion of the second storage electrode C2 connected to the first voltage signal line ELVDD serves as the first voltage terminal VDD.

In some examples, as shown in FIGS. 37A and 37B, the second storage electrode C2 is located at the second gate conductive layer Gate2.

Referring to FIG. 32, the writing sub-circuit 30 includes a fourth sub-circuit 32.

The fourth sub-circuit 32 is configured such that the drain portion 1012 and the gate 1013 are connected when the fourth sub-circuit 32 is turned on. In this way, a signal at the drain portion 1012 may be transmitted to the gate 1013.

As shown in FIGS. 32 and 36, the first reset sub-circuit 20 is connected to the drain portion 1012 (i.e., the second electrode of the driving transistor Td), and the first reset sub-circuit 20 is configured to reset the gate 1013 when the first reset sub-circuit 20 is turned on. In this case, on the leakage path of the driving transistor Td, only the fourth sub-circuit 32 is directly connected to the gate 1013 of the driving transistor Td. In this way, the influence on the voltage of the gate of the driving transistor Td is small, and in the light-emitting phase, the change amount ΔV of the voltage of the gate of the driving transistor Td is reduced, so that the influence on the light-emitting performance of the light-emitting device connected to the pixel circuit 100 can be reduced. As a result, the light-emitting performance of the display panel 200 may be improved, and the probability of the flicker phenomenon is reduced.

For example, as shown in FIGS. 31C, 32 and 36, the first reset sub-circuit 20 includes a first transistor T1, and the first transistor T1 includes a first active pattern 105 and a gate 103. The first active pattern 105 is arranged in the same layer as the active pattern 1015. The first active pattern 105 includes a first source portion 101 and a first drain portion 102. The first source portion 101 may serve as the first electrode of the first transistor T1, and the first drain portion 102 may serve as the second electrode of the first transistor T1. The first source portion 101 is used to be connected to the first initialization signal line Init1, and the first drain portion 102 is connected to the drain portion 1012.

In addition, the first active pattern 105 further includes a first channel portion 104. The first channel portion 104 is located between the first source portion 101 and the first drain portion 102, and the first channel portion 104 overlaps with the gate 103 of the first transistor T1 in the thickness direction of the display panel 200.

Figure 39:
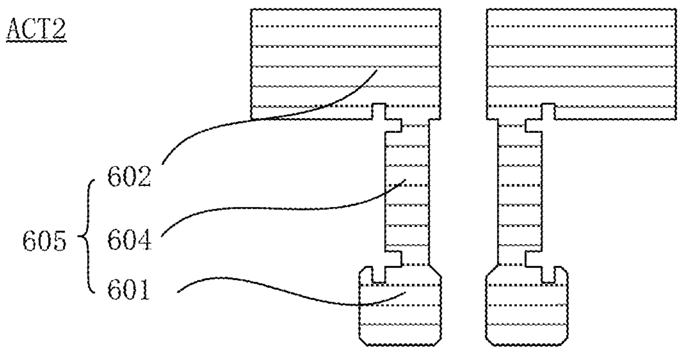
FIG. 39 is a top view of a second active layer provided in embodiments of the present disclosure.

In some embodiments, as shown in FIGS. 31C and 39, the fourth sub-circuit 32 includes a sixth transistor T6, and the sixth transistor T6 includes a sixth active pattern 605. The sixth active pattern 605 and the active pattern 1015 are located in different layers.

In some examples, as shown in FIGS. 34 and 39, both the active pattern 1015 and the fifth active pattern 505 are located in the first active layer ACT1, and the sixth is active pattern 605 is located in the second active layer ACT2.

A material of the sixth active pattern 605 includes an oxide semiconductor material. That is, the sixth transistor T6 is an oxide thin film transistor. With such an arrangement, the sixth transistor T6 can effectively reduce the leakage at the gate of the driving transistor Td, thereby ensuring the stability of the potential at the gate of the driving transistor Td.

In some embodiments, as shown in FIGS. 31C, 34 and 36, the third sub-circuit 31 includes a fifth transistor T5, and the fifth transistor T5 includes a fifth active pattern 505 and a fifth gate 503. The fifth active pattern 505 includes a fifth source portion 501 and a fifth drain portion 502. The fifth source portion 501 may serve as the first electrode of the fifth transistor T5, and the fifth drain portion 502 may serve as the second electrode of the fifth transistor T5. The fifth drain portion 502 and the source portion 1011 are connected to be a one-piece structure. That is, the fifth active pattern 505 and the active pattern 1015 are located in a same layer. The fifth source portion 501 is used to be connected to a data line DL (as shown in FIG. 32), and a portion of the fifth source portion 501 connected to the data line DL serves as the data terminal DE.

In addition, the fifth active pattern 505 further includes a fifth channel portion 504. The fifth channel portion 504 is located between the fifth source portion 501 and the fifth drain portion 502, and the fifth channel portion 504 overlaps with the fifth gate 503 in the thickness direction of the display panel 200.

In some examples, as shown in FIG. 34, the fifth active pattern 505 is located in the first active layer ACT1, and the fifth gate 503 is located in the first gate conductive layer Gate1.

Figure 40:
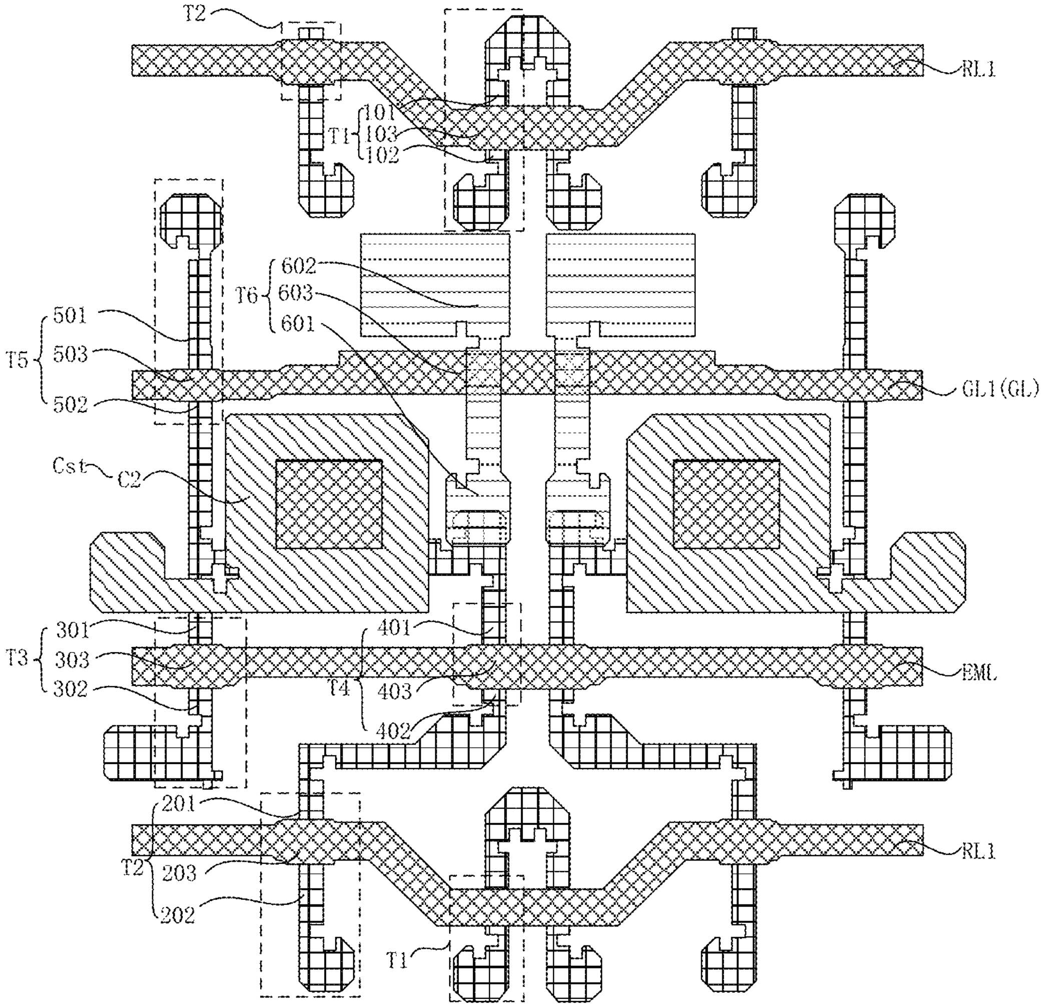
FIG. 40 is a top view of yet other film layers provided in embodiments of the present disclosure.
Figure 41:
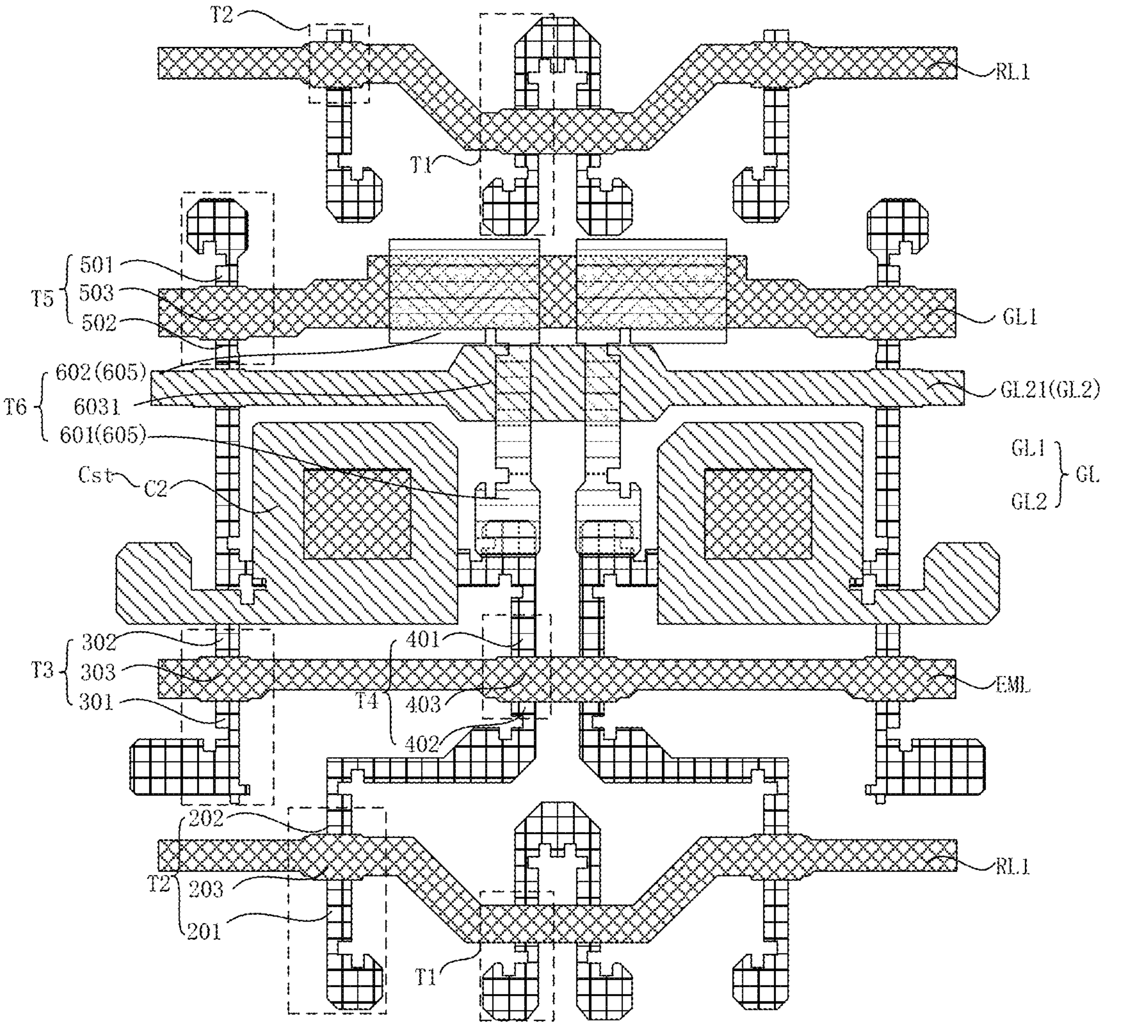
FIG. 41 is a top view of yet other film layers provided in embodiments of the present disclosure.
Figure 43:
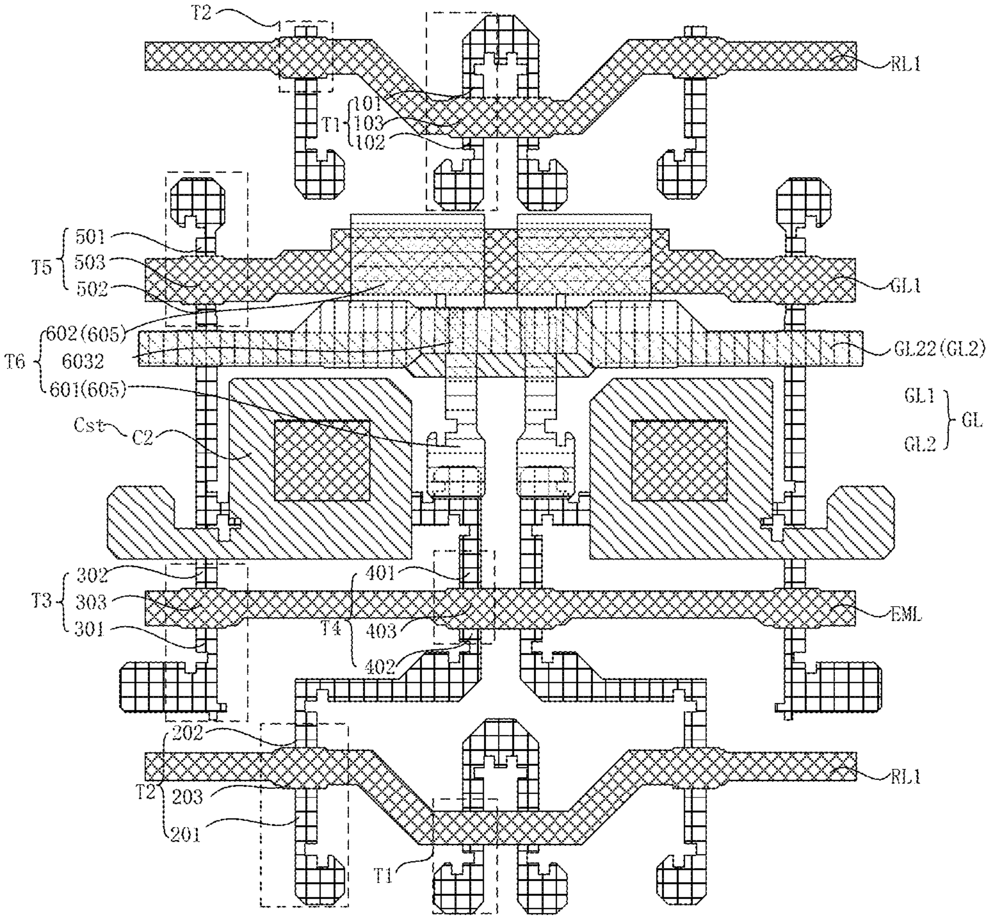
FIG. 43 is a top view of yet other film layers provided in embodiments of the present disclosure.

In some embodiments, as shown in FIGS. 40, 41 and 43, the sixth transistor T6 further includes a sixth gate 603.

In some examples, as shown in FIG. 40, two portions of a same scanning line GL (e.g., the first scanning line GL1) serve as the fifth gate 503 and the sixth gate 603, respectively. That is, a portion of the scanning line GL serves as the fifth gate 503, and another portion of the scanning line GL serves as the sixth gate 603.

For example, as shown in FIG. 35, the scanning line GL (e.g., the first scanning is line GL1) and the gate 1013 are both located in the first gate conductive layer Gate1. In this way, the scanning line GL may be fabricated together with the gate 1013, so that the manufacturing efficiency of the display panel 200 may be improved.

In some other examples, as shown in FIGS. 41 and 43, portions of two different scanning lines GL (e.g., the first scanning line GL1 and the second scanning line GL2) serve as the fifth gate 503 and the sixth gate 603, respectively. That is, in the two different scanning lines GL, a portion of a scanning line GL (e.g., the first scanning line GL1) serves as the fifth gate 503, and a portion of another scanning line GL (e.g., the second scanning line GL2) serves as the sixth gate 603.

In the two different scanning lines GL, a scanning line (e.g., the first scanning line GL1), a portion of which serves as the fifth gate 503, is arranged in the same layer as the gate 1013, and another scanning line (e.g., the second scanning line GL2), a portion of which serves as the sixth gate 603, is located in a different layer from the gate 1013. In this way, the fifth transistor T5 and the sixth transistor T6 may be separately controlled through different scanning lines GL, thereby improving the flexible control of the pixel circuit 100.

For example, referring to FIGS. 35, 37A, 37B and 42, both the first scanning line GL1 and the gate 1013 are located in the first gate conductive layer Gate1, and the second scanning line GL2 is located in the second gate conductive layer Gate2 or the connection line layer Gate3.

Figure 42:
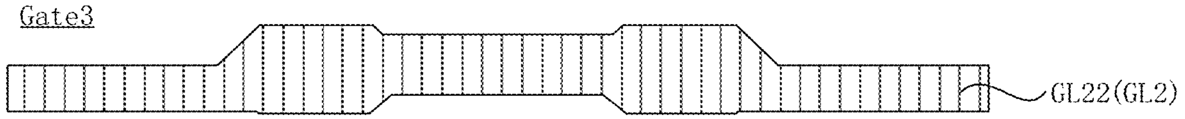
FIG. 42 is a top view of a connection line layer provided in embodiments of the present disclosure.

In some other embodiments, as shown in FIGS. 41 to 43, the sixth transistor T6 further includes a sixth bottom gate 6031 and a sixth top gate 6032. Portions of two scanning lines GL (e.g., a first scanning sub-line GL21 and a second scanning sub-line GL22) serve as the sixth bottom gate 6031 and the sixth top gate 6032, respectively. That is, in the two scanning lines GL (the first scanning sub-line GL21 and the second scanning sub-line GL22), a portion of a scanning line GL (e.g., the first scanning sub-line GL21) serves as the sixth bottom gate 6031, and a portion of another scanning line GL (e.g., the second scanning sub-line GL22) serves as the sixth top gate 6032. Thus, the sixth transistor T6 is of a double-gate structure, and the sixth transistor T6 may be controlled by the first scanning sub-line GL21 and the second scanning sub-line GL22, so that the flexible control of the pixel circuit 100 may be improved.

The two scanning lines GL are located in different layers. For example, as shown in FIGS. 37A and 37B, the first scanning sub-line GL21 is located in the second gate conductive layer Gate2; as shown in FIG. 42, the second scanning sub-line GL22 is located in the connection line layer Gate3.

A portion of another scanning line GL (e.g., the first scanning line GL1) serves as the fifth gate 503, and the another scanning line GL (the first scanning line GL1) is arranged in the same layer as the gate 1013 (for example, as shown in FIG. 35, the first scanning line GL1 and the gate 1013 are located in the first gate conductive layer Gate1), and the another scanning line GL is arranged in a different layer from the two scanning lines GL (the first scanning sub-line GL21 and the second scanning sub-line GL1).

Figure 44:
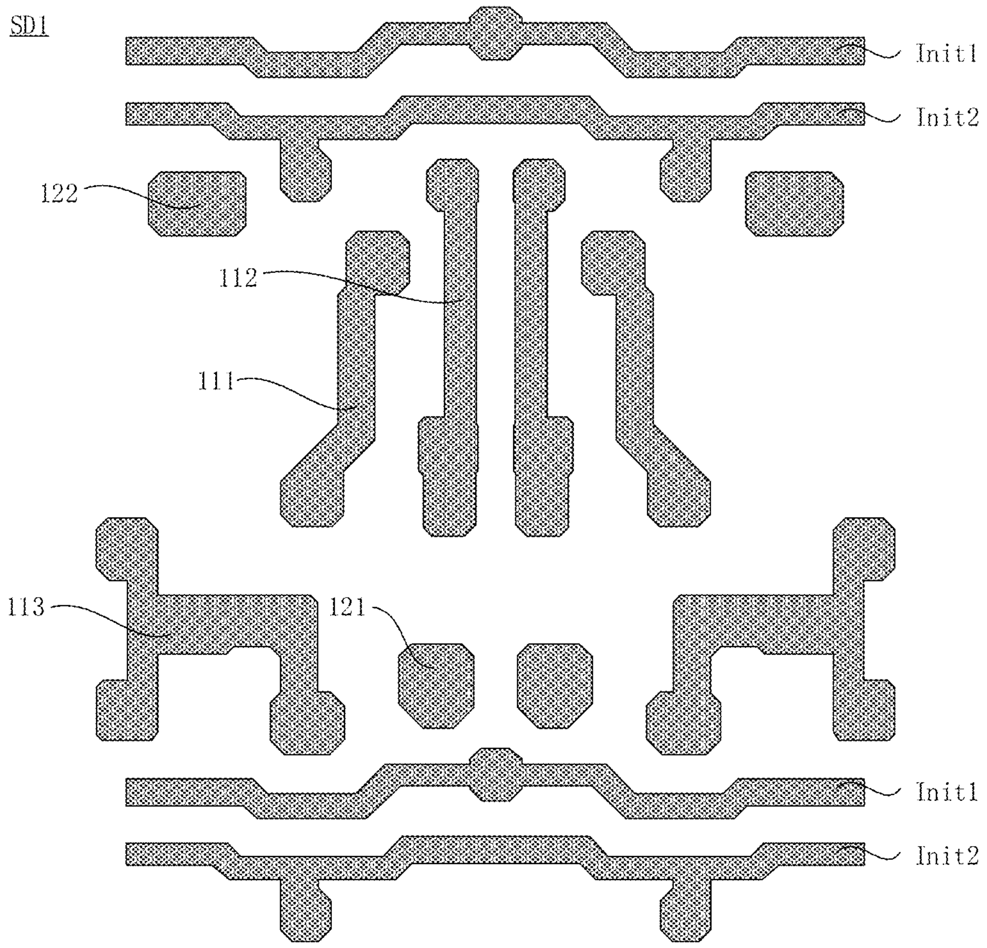
FIG. 44 is a top view of a first connection layer provided in embodiments of the present disclosure.

In some embodiments, as shown in FIG. 44, the first connection layer SD1 includes a first connection electrode 111.

As shown in FIGS. 39 and 43, the sixth active pattern 605 includes a sixth source portion 601 and a sixth drain portion 602. The sixth source portion 601 may serve as the first electrode of the sixth transistor T6, and the sixth drain portion 602 may serve as the second electrode of the sixth transistor T6. In addition, the sixth active pattern 605 further includes a sixth channel portion 604. The sixth channel portion 604 is located between the sixth source portion 601 and the sixth drain portion 602, and the sixth channel portion 604 overlaps with the sixth gate 603 in the thickness direction of the display panel 200.

Figure 45A:
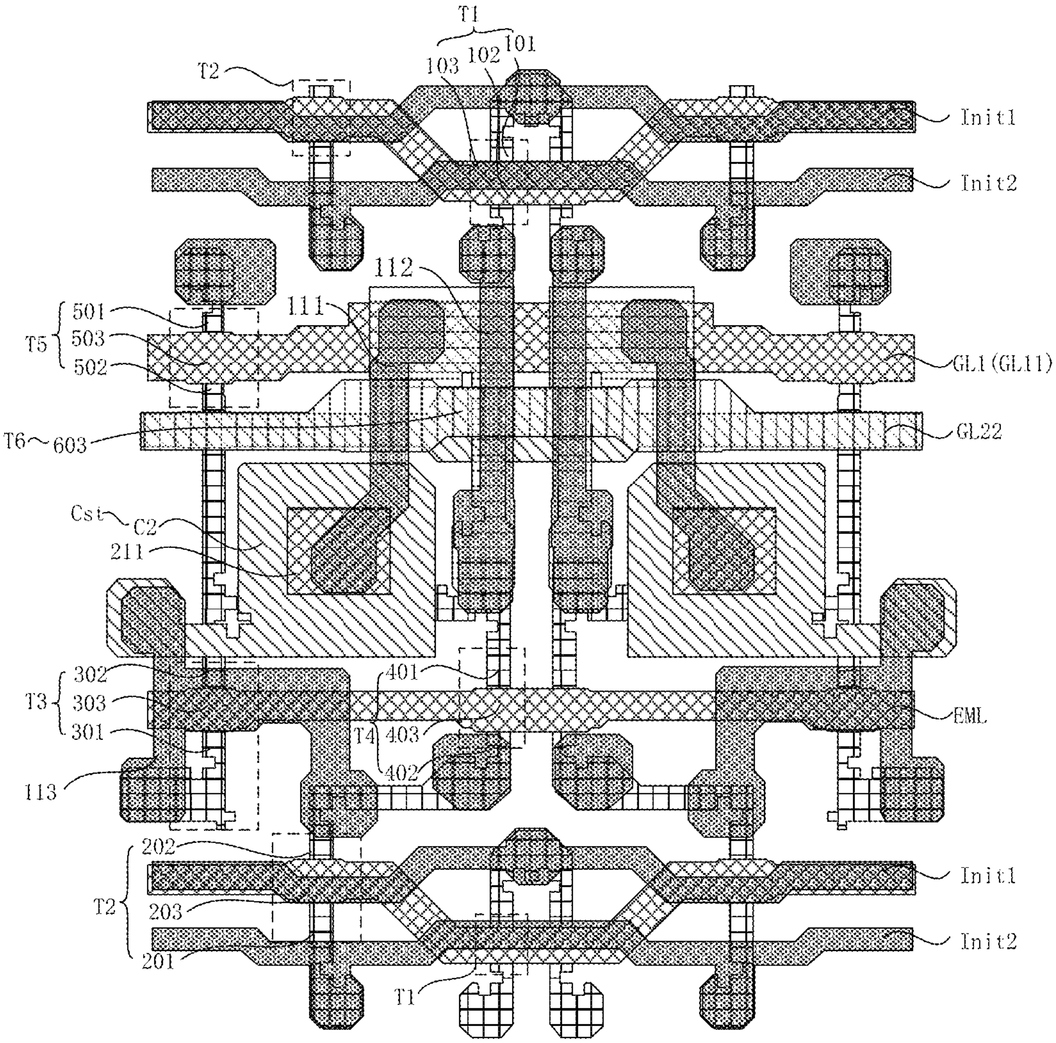
FIG. 45A is a top view of yet other film layers provided in embodiments of the present disclosure.

As shown in FIG. 45A, the sixth drain portion 602 is electrically connected to the gate 1013 through the first connection electrode 111, and the sixth source portion 601 is electrically connected to the drain portion 1012.

In this way, the electrical connection between the sixth drain portion 602 and the gate 1013 may be realized by using the first connection electrode 111.

In some examples, as shown in FIG. 45A, the sixth drain portion 602 does not overlap with the gate 1013 in the thickness direction of the display panel 200. In this case, a first end of the first connection electrode 111 overlaps with the sixth drain portion 602 in the thickness direction of the display panel 200, and a second end of the first connection electrode 111 overlaps with the gate 1013 in the thickness direction of the display panel 200. In this way, the first end of the first connection electrode 111 and the sixth drain portion 602 may be electrically connected through a first via hole in an insulating layer is located therebetween; and the second end of the first connection electrode 111 and the gate 1013 may be electrically connected through a second via hole in an insulating layer located therebetween. As a result, the electrical connection between the sixth drain portion 602 and the gate 1013 can be realized.

In some examples, as shown in FIG. 45A, the sixth source portion 601 overlaps with the drain portion 1012 in the thickness direction of the display panel 200, so that the sixth source portion 601 and the drain portion 1012 may be electrically connected through a third via hole in an insulating layer located therebetween. Of course, the sixth source portion 601 may not overlap with the drain portion 1012 in the thickness direction of the display panel 200. In this case, a corresponding connection electrode may be provided in the first connection layer SD1, and the sixth source portion 601 and the drain portion 1012 are electrically connected through the corresponding connection electrode.

In some embodiments, as shown in FIG. 33, the second gate conductive layer Gate2 is located between the first active layer ACT1 and the first connection layer SD1. Thus, the second storage electrode C2 is located between the gate 1013 and the first connection electrode 111 in the thickness direction of the display panel 200.

As shown in FIG. 45A, the second storage electrode C2 includes an opening 211, and the opening 211 overlaps with a portion, connected to the gate 1013 (e.g., the second end of the first connection electrode 111) in the thickness direction of the display panel 200, of the first connection electrode 111. With such an arrangement, it may be possible to ensure that the sixth drain portion 602 is well electrically connected to the gate 1013.

In some examples, as shown in FIGS. 37A and 37B, the second storage electrode C2 further includes an electrode portion C21 and a connection portion C22 connected to the electrode portion C21. The opening 211 is located in a middle region of the electrode portion C21. For example, the electrode portion C21 is substantially rectangular, and a center of the opening 211 coincides with a center of the electrode portion C21. With such an arrangement, an overall structure of the pixel circuit 100 may be more regular, which is beneficial to a layout design of the pixel circuit 100.

In some embodiments, as shown in FIG. 37B, two second storage electrodes C2 in two pixel circuits 100 that are adjacent in a row direction X (a direction parallel to a row of pixel circuits 100) are connected by a connection trace C23. Since the second storage electrodes C2 in the two pixel circuits 100 that are adjacent in the row direction X are connected by the connection trace C23, second storage electrodes C2 in pixel circuits 100 in the row direction X may have a consistent voltage. As a result, the display effect of the display panel 200 is more uniform.

In some examples, the connection trace C23 and the two second storage electrodes C2 are of a one-piece structure, which is easy to be fabricated. In addition, the connection trace C23 has a relatively small size, which helps reduce a space occupied by the two second storage electrodes C2, thereby improving the light transmittance. As a result, the display effect of the display panel 200 is improved.

In some embodiments, as shown in FIGS. 44 and 45A, the first connection layer SD1 includes a second connection electrode 112, and the first drain portion 102 and the drain portion 1012 are electrically connected through the second connection electrode 112. In this way, the electrical connection between the first drain portion 102 and the drain portion 1012 may be realized by using the second connection electrode 112.

In some examples, as shown in FIG. 45A, the first drain portion 102 does not overlap with the drain portion 1012 in the thickness direction of the display panel 200. In this case, a first end of the second connection electrode 112 overlaps with the first drain portion 102 in the thickness direction of the display panel 200, and a second end of the second connection electrode 112 overlaps with the drain portion 1012 in the thickness direction of the display panel 200. In this way, the first end of the second connection electrode 112 and the first drain portion 102 may be electrically connected through a fourth via hole in an insulating layer located therebetween; and the second end of the second connection electrode 112 and the drain portion 1012 may be electrically connected through a fifth via hole in an insulating layer located therebetween. As a result, the electrical connection between the first drain portion 102 and the drain portion 1012 can be realized.

Figure 45B:
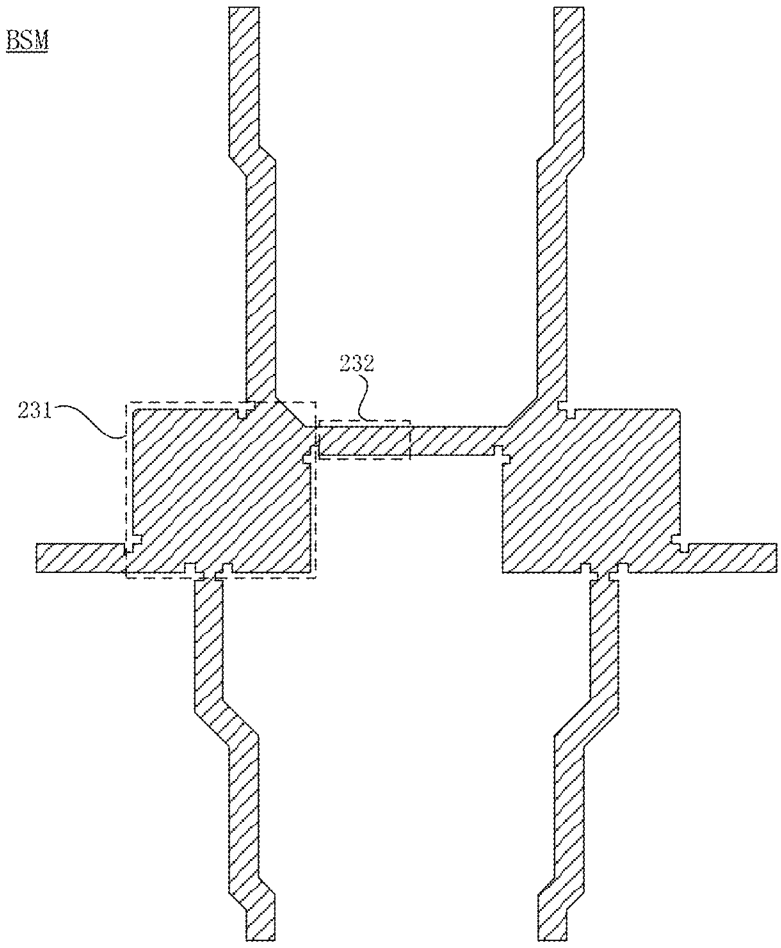
FIG. 45B is a top view of a shielding layer provided in embodiments of the present disclosure.
Figure 45C:
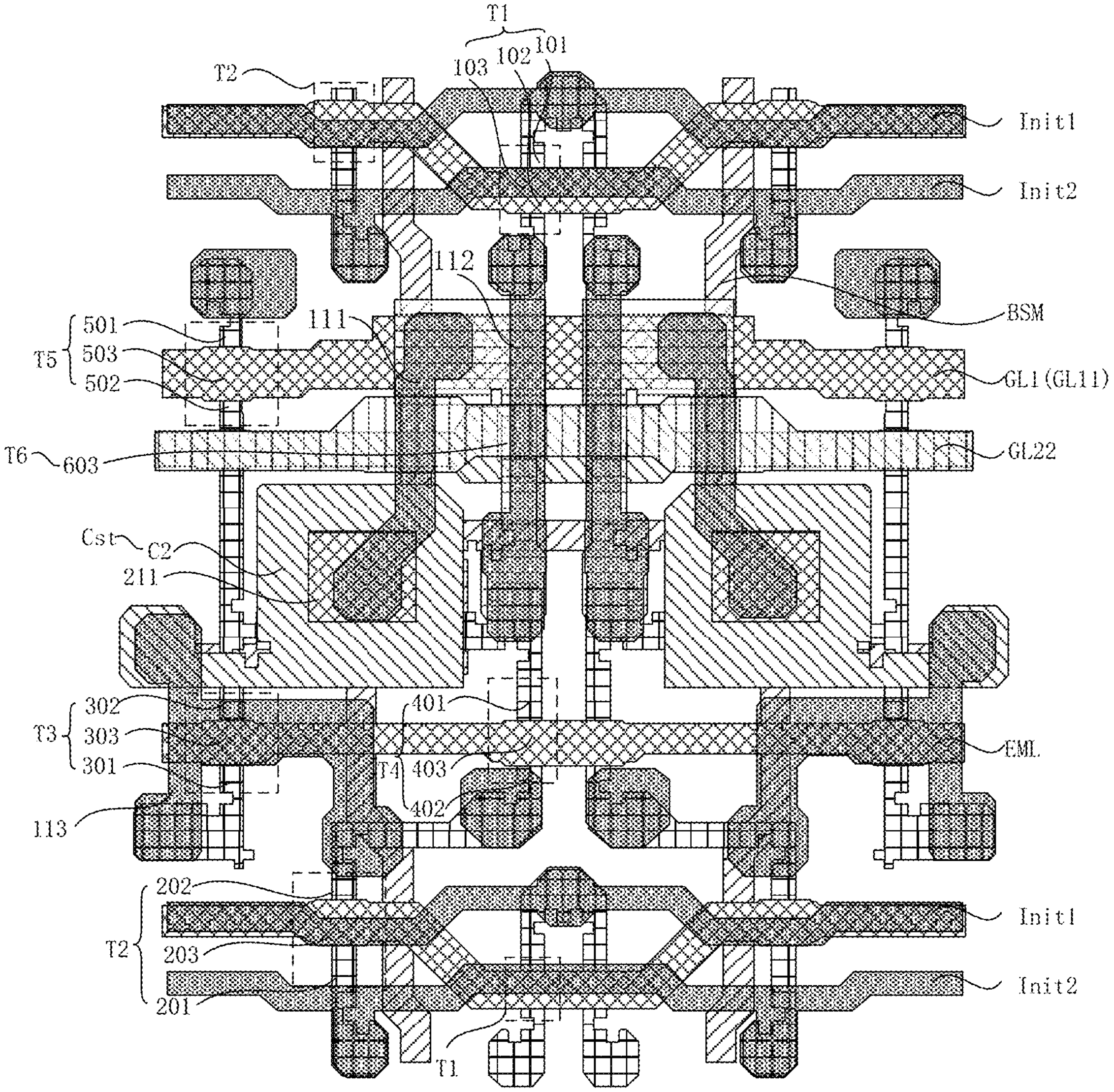
FIG. 45C is a top view of yet other film layers provided in embodiments of the is present disclosure.
Figure 45D:
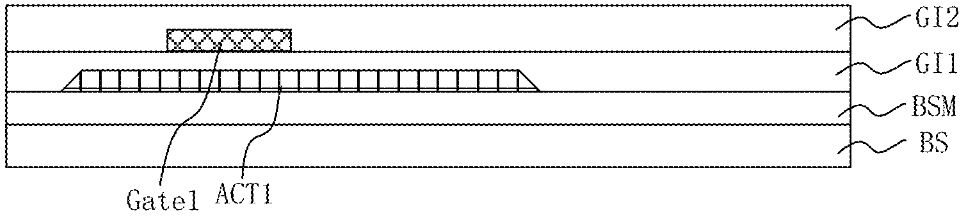
FIG. 45D is a diagram showing a relative positional relationship between a shielding layer, a first active layer and a first gate conductive layer provided in embodiments of the present disclosure.

In some embodiments, as shown in FIGS. 45B and 45C, the display panel further includes a shielding layer BSM. The shielding layer BSM is located on a side of the first storage electrode C1 away from the second storage electrode C2. That is, as shown in FIG. 45D, the shielding layer BSM is located between the substrate BS and the first gate conductive layer Gate1. The shielding layer BSM includes a first shielding portion 231 is and a second shielding portion 232.

As shown in FIGS. 36, 45B and 45C, the first shielding portion 231 overlaps with the gate 1013 in the thickness direction of the display panel 200. In this way, the first shielding portion 231 can shield the channel portion 1014 of the driving transistor Td, thereby avoiding an influence of impurity ions on characteristics of the channel portion of the driving transistor Td.

In some examples, the first shielding portion 231 overlaps with the second storage electrode C2 in the thickness direction of the display panel 200. Since the second storage electrode C2 needs to completely cover the gate 1013, the second storage electrode C2 may be provided with a relatively large area. By arranging the first shielding portion 231 to overlap with the second storage electrode C2 in the thickness direction of the display panel 200, the channel portion 1014 of the driving transistor Td may be shielded more effectively. As a result, the influence of the impurity ions on the characteristics of the channel portion of the driving transistor Td may be further avoided.

As shown in FIGS. 45B and 45C, the second shielding portion 232 overlaps with a portion, electrically connected to the drain portion 1012 (e.g., the second end of the second connection electrode 112) in the thickness direction of the display panel 200, of the second connection electrode 112. In this way, it may be possible to prevent the second shielding portion 232 from being located in another region, thereby avoiding an influence on an aperture ratio of a sub-pixel region where the pixel circuit 100 is located.

In some embodiments, as shown in FIG. 44, the first initialization signal line Init1 is located in the first connection layer SD1. The first initialization signal line Init1 located in the first connection layer SD1 may be made of aluminum, which has a small resistance and can make the first initialization signal line Init1 have a good uniformity.

In some examples, as shown in FIGS. 35 and 36, a portion of a first reset signal line RL1 serves as the first gate 103 of the first transistor T1. In this way, it may be possible to reduce the use of materials and reduce the manufacturing cost of the pixel circuit 100. The first reset signal line RL is arranged in the same layer as the gate 1013. That is, both the first reset signal line RL1 and the gate 1013 are located in the first gate conductive layer Gate1. Thus, the first reset signal line RL1 and the gate 1013 may be fabricated simultaneously in a step, which improves the manufacturing efficiency of the pixel circuit 100. Extending directions of the first reset signal line RL1 and the first initialization signal line Init1 are approximately the same, which is beneficial to the arrangement of signal lines in the display panel 200.

In some examples, as shown in FIGS. 43 and 45A, the first reset signal line RL1 partially overlaps with the first initialization signal line Init1 in the thickness direction of the display panel 200, which may reduce the shielding of the signal lines to light emitted by the light-emitting devices, thereby improving the light transmittance. As a result, the display effect of the display panel 200 is improved.

In some embodiments, as shown in FIGS. 31C, 34 and 36, the pixel circuit 100 further includes a second sub-circuit 52, and the second sub-circuit 52 includes a fourth transistor T4. The fourth transistor T4 includes a fourth active pattern 405 and a fourth gate 403. The fourth active pattern 405 includes a fourth source portion 401 and a fourth drain portion 402. The fourth source portion 401 may serve as the first electrode of the fourth transistor T4, and the fourth drain portion 402 may serve as the second electrode of the fourth transistor T4. The fourth source portion 401 and the drain portion 1012 are connected to be a one-piece structure. That is, the fourth source portion 401 and the drain portion 1012 are located in a same layer and electrically connected. The fourth drain portion 402 is used to be connected to the light-emitting device 40. In addition, the fourth active pattern 405 further includes a fourth channel portion 404. The fourth channel portion 404 is located between the fourth source portion 401 and the fourth drain portion 402, and the fourth channel portion 404 overlaps with the fourth gate 403 of the fourth transistor T4 in the thickness direction of the display panel 200.

In some embodiments, as shown in FIGS. 31C, 34 and 36, the pixel circuit 100 further includes a first sub-circuit 51, and the first sub-circuit 51 includes a third transistor T3. The third transistor T3 includes a third active pattern 305 and a third gate 303. The third active pattern 305 includes a third source portion 301 and a third drain portion 302. The third source portion 301 may serve as the first electrode of the third transistor T3, and the third drain portion 302 may serve as the second electrode of the third transistor T3. The third drain portion 302 and the source portion 1011 are connected to be a one-piece structure. That is, the third drain portion 302 and the source portion 1011 are located in a same layer and electrically connected. In addition, the third active pattern 305 further is includes a third channel portion 304. The third channel portion 304 is located between the third source portion 301 and the third drain portion 302, and the third channel portion 304 overlaps with the third gate 303 of the third source portion 301 in the thickness direction of the display panel 200.

As shown in FIGS. 44 and 45A, the first connection layer SD1 further includes a third connection electrode 113, and the third source portion 301 and the second storage electrode C2 are electrically connected through the third connection electrode 113. In this way, the third source portion 301 of the third transistor T3 and the second storage electrode C2 may be electrically connected through the third connection electrode 113.

In some examples, as shown in FIG. 45A, the third source portion 301 does not overlap with the second storage electrode C2 in the thickness direction of the display panel 200. In this case, a first end of the third connection electrode 113 overlaps with the third source portion 301 in the thickness direction of the display panel 200, and a second end of the third connection electrode 113 overlaps with the connection portion C22 of the second storage electrode C2 in the thickness direction of the display panel 200. In this way, the first end of the third connection electrode 113 and the third source portion 301 may be electrically connected through a sixth via hole in an insulating layer located therebetween; and the second end of the third connection electrode 113 and the connection portion C22 of the second storage electrode C2 may be electrically connected through a seventh via hole in an insulating layer located therebetween. As a result, the electrical connection between the third source portion 301 and the second storage electrode C2 can be realized.

Figure 46:
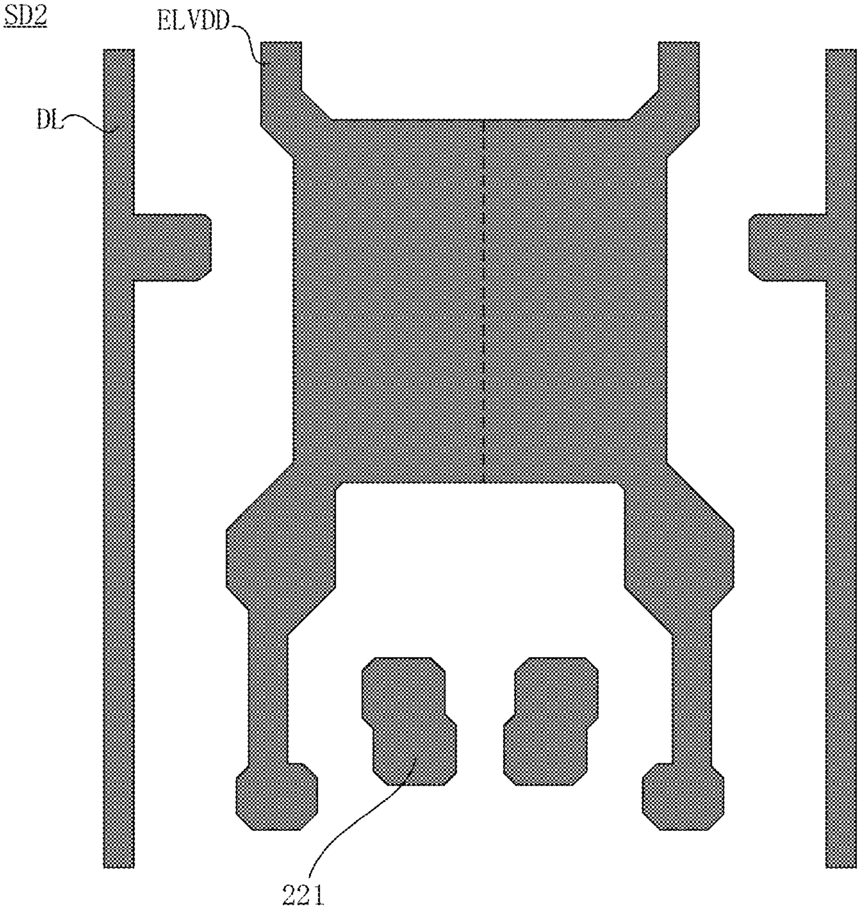
FIG. 46 is a top view of a second connection layer provided in embodiments of the present disclosure.

In some embodiments, as shown in FIG. 46, the display panel 200 further includes the second connection layer SD2. Both the first voltage signal line ELVDD and the data line DL are located in the second connection layer SD2.

Figure 47:
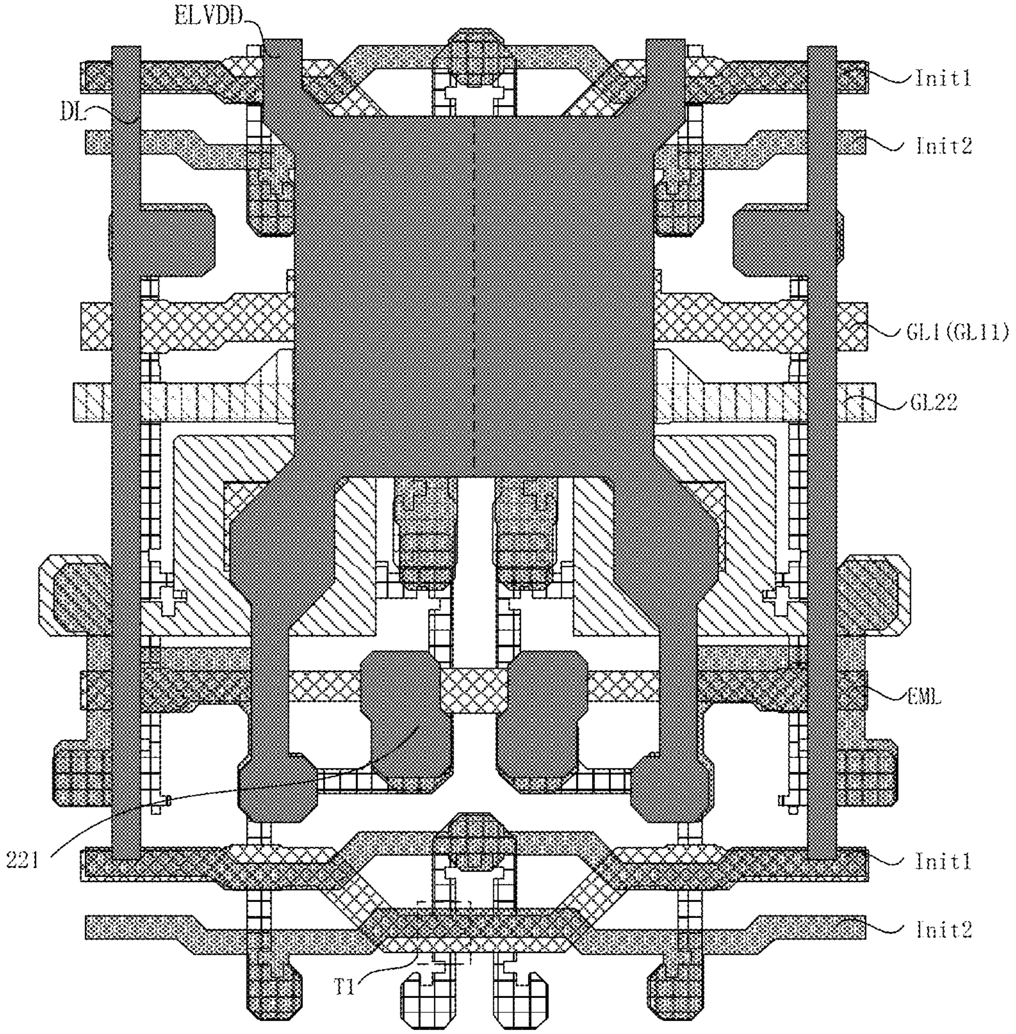
FIG. 47 is a top view of yet other film layers provided in embodiments of the present disclosure.

As shown in FIGS. 45A and 47, the first voltage signal line ELVDD covers the first connection electrode 111 in the thickness direction of the display panel 200. In this way, it may be possible to shield the crosstalk of another signal to the signal at the gate 1013 of the driving transistor Td.

Figure 48:
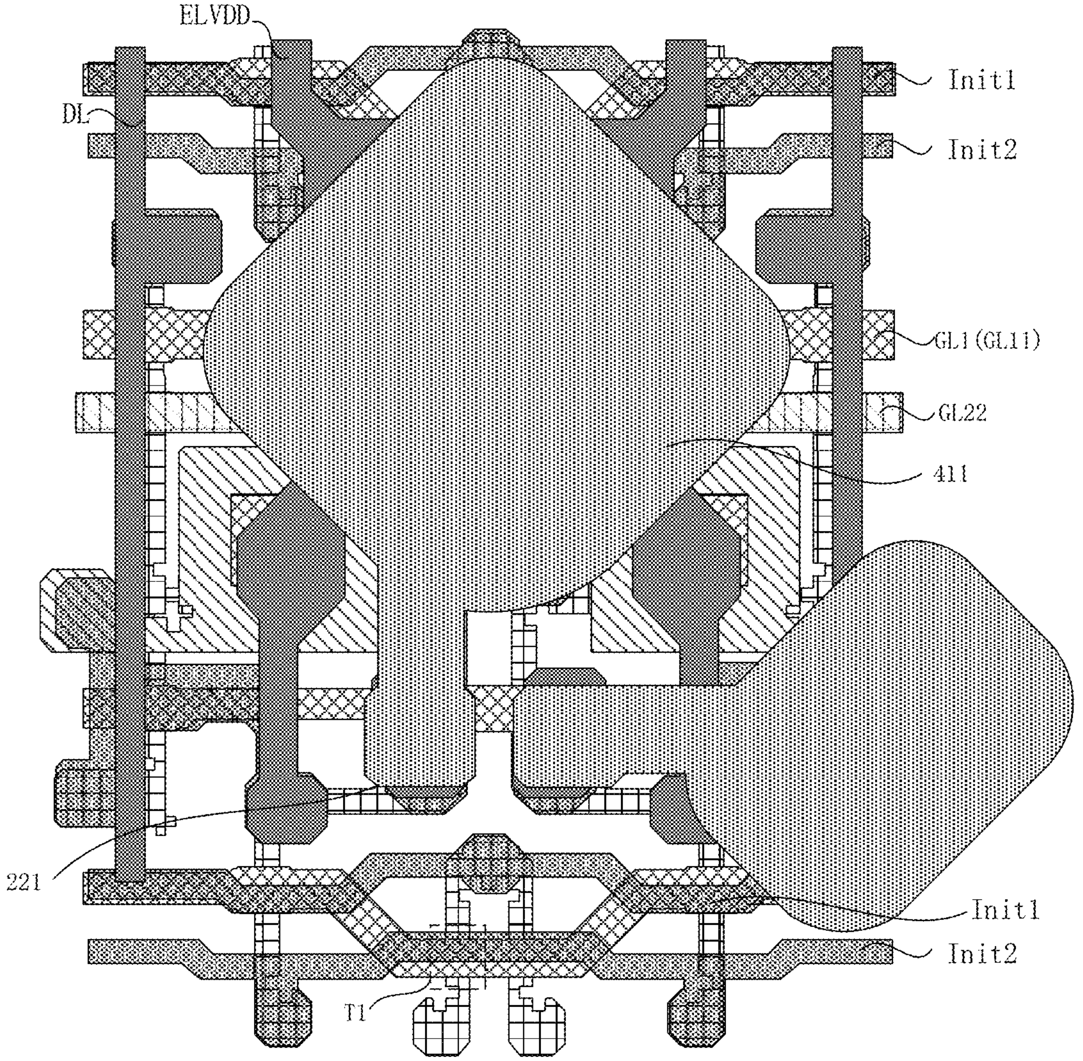
FIG. 48 is a top view of yet other film layers provided in embodiments of the present disclosure.

In some embodiments, as shown in FIGS. 46 to 48, the second connection layer SD2 further includes a switching structure 221, and the switching structure 221 is used to is make the fourth drain portion 402 and the anode 411 of the light-emitting device 40 to be electrically connected, so that the electrical connection between the fourth transistor T4 and the anode 411 of the light-emitting device 40 is realized.

In some examples, as shown in FIGS. 45A, 47 and 48, in the thickness direction of the display panel 200, the switching structure 221, the fourth drain portion 402 and the anode 411 overlap with each other, and the switching structure 221 is located between the fourth drain portion 402 and the anode 411. The switching structure 221 is electrically connected to the anode 411 and the fourth drain portion 402.

For example, the switching structure 221 and the anode 411 may be electrically connected through a ninth via hole in an insulating layer therebetween.

For example, as shown in FIGS. 44 and 47, the first connection layer SD1 further includes a first transition electrode 121, and the first transition electrode 121 is used to make the fourth drain portion 402 and the switching structure 221 to be electrically connected.

For example, the first transition electrode 121 overlaps with the fourth drain portion 402 in the thickness direction of the display panel 200, so that the first transition electrode 121 and the fourth drain portion 402 may be electrically connected through a tenth via hole in an insulating layer therebetween. The first transition electrode 121 overlaps with the switching structure 221 in the thickness direction of the display panel 200, so that the first transition electrode 121 and the switching structure 221 may be electrically connected through an eleventh via hole in an insulating layer therebetween. In this way, the first transition electrode 121 is used to be a transition for the electrical connection between the switching structure 221 and the fourth drain portion 402, which helps improve the stability of the electrical connection between the switching structure 221 and the fourth drain portion 402.

In some embodiments, as shown in FIGS. 44, 45A, 45C, 47 and 48, the first connection layer SD1 further includes a second transition electrode 122, and the second transition electrode 122 is used to make the fifth source portion 501 and the data line DL to be electrically connected.

For example, the second transition electrode 122 overlaps with the fifth source portion 501 in the thickness direction of the display panel 200, so that the second is transition electrode 122 and the fifth source portion 501 may be electrically connected through a twelfth via hole in an insulating layer therebetween. The second transition electrode 122 overlaps with the data line DL in the thickness direction of the display panel 200, so that the second transition electrode 122 and the data line DL may be electrically connected through a thirteenth via hole in an insulating layer therebetween. In this way, the second transition electrode 122 is used to be a transition for the electrical connection between the fifth source portion 501 and the data line DL, which helps improve the stability of the electrical connection between the fifth source portion 501 and the data line DL.

In some embodiments, as shown in FIG. 36, two portions of a same enable signal line EML serve as the third gate 303 and the fourth gate 403, respectively. That is, a portion of the enable signal line EML serves as the third gate 303, and another portion of the enable signal line EML serves as the fourth gate 403.

As shown in FIG. 35, the enable signal line EML is arranged in the same layer as the gate 1013. That is, the enable signal line EML is located in the first gate conductive layer Gate1. In this way, it may be possible to simplify the manufacturing process and improve the manufacturing efficiency of the pixel circuit 100. In addition, two portions of the same enable signal line EML serve as the third gate 303 and the fourth gate 403, respectively, and thus the enable signal line EML may control both the third transistor T3 and the fourth transistor T4 to be turned on or off. As a result, the number of wirings in the display panel 200 can be reduced.

In some embodiments, as shown in FIG. 36, the pixel circuit 100 further includes a second reset sub-circuit 60, and the second reset sub-circuit includes a second transistor T2.

As shown in FIGS. 34 and 36, the second transistor T2 includes a second active pattern 205 and a second gate 203. The second active pattern 205 includes a second source portion 201 and a second drain portion 202. The second source portion 201 may serve as the first electrode of the second transistor T2, and the second drain portion 202 may serve as the second electrode of the second transistor T2. The second drain portion 202 and the fourth drain portion 402 are connected to be a one-piece structure. In addition, the second active pattern 205 further includes a second channel portion 204. The second channel portion 204 is located between the second source portion 201 and the second drain portion 202, and the second channel portion 204 overlaps with the second gate 203 of the second transistor T2 in the thickness direction of the display panel 200.

In some examples, as shown in FIGS. 44 and 45A, the first connection layer SD1 further includes a second initialization signal line Init2, and the second initialization signal line Init2 is electrically connected to the second source portion 201.

For example, the second initialization signal line Init2 overlaps with the second source portion 201 in the thickness direction of the display panel 200, so that the second initialization signal line Init2 and the second source portion 201 may be electrically connected through an eighth via hole in an insulating layer located therebetween.

In some examples, the first reset signal line RL1 partially overlaps with the second initialization signal line Init2 in the thickness direction of the display panel 200, which may reduce the shielding of the signal lines to the light emitted by the light-emitting devices, thereby improving the overall light transmittance. As a result, the display effect of the display panel 200 is improved.

In some embodiments, as shown in FIG. 36, in two pixel circuits 100 (e.g., a first pixel circuit 100A and a second pixel circuit 100B) that are adjacent in a column direction Y (a direction parallel to the column of pixel circuits 100), a second gate 203 of a second transistor T2 in a former pixel circuit 100 (e.g., the first pixel circuit 100A) and a first gate of a first transistor T1 in a latter pixel circuit 100 (e.g., the second pixel circuit 100B) are connected to a same reset signal line (i.e., the first reset signal line RL1). By arranging the two pixel circuits 100 that are adjacent in the column direction to share the reset signal line, it is possible to reduce the number of reset signal lines arranged in the display panel 200.

In some embodiments, referring to FIGS. 49 to 59, in addition to the driving sub-circuit 10, the third sub-circuit 31, the fourth sub-circuit 32, the first reset sub-circuit 20, the first sub-circuit 51 and the second sub-circuit 52, the pixel circuit 100 further includes a second reset sub-circuit 60 and a third reset sub-circuit 70. The circuit diagram of the pixel circuit 100 may refer to FIG. 31C. Compared with the pixel circuit 100 shown in the embodiments above, the driving transistor Td and the storage capacitor Cst included in the driving sub-circuit 10, the fifth transistor T5 included in the third sub-circuit 31, the is sixth transistor T6 included in the fourth sub-circuit 32, the first transistor T1 included in the first reset sub-circuit 20, the third transistor T3 included in the first sub-circuit 51 and the fourth transistor T4 included in the second sub-circuit 52 are arranged in the same way as those in the embodiments above. What is different from the pixel circuit 100 shown in the embodiments above is that, positions of signal lines connected to some transistors (e.g., the first initialization signal line Init1 connected to the first transistor t1) are changed, which will be described in detail below.

Figure 49:
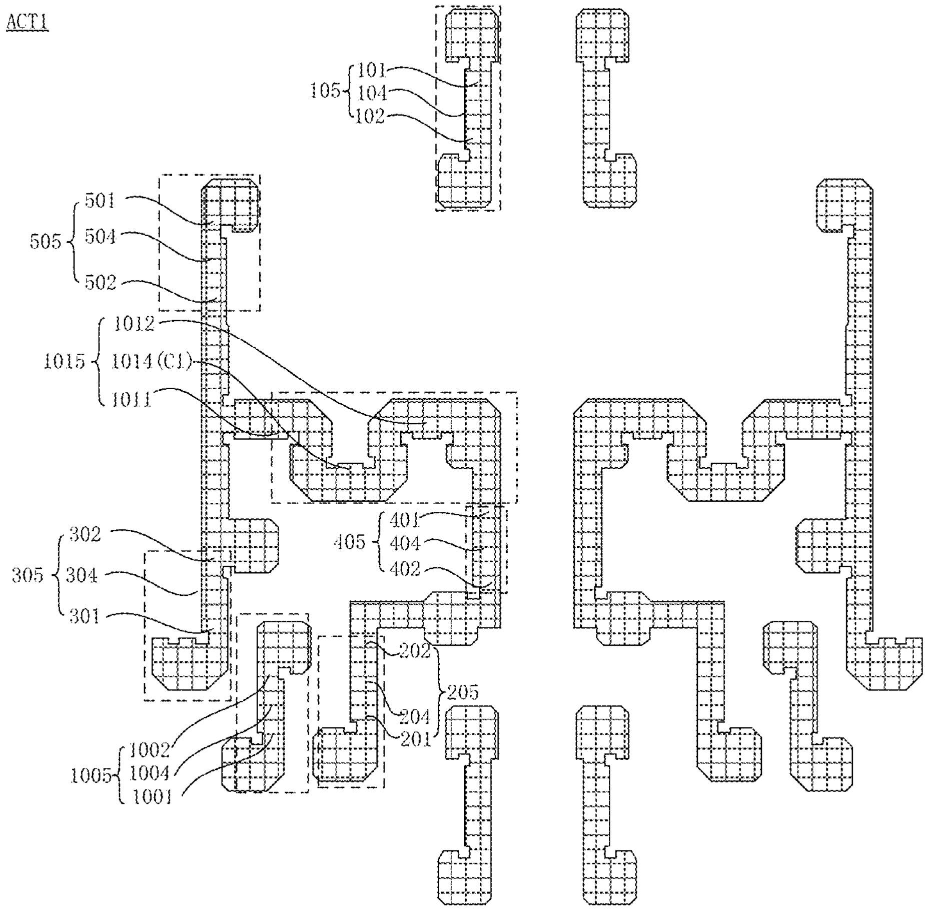
FIG. 49 is a top view of another first active layer provided in embodiments of the present disclosure.
Figure 51:
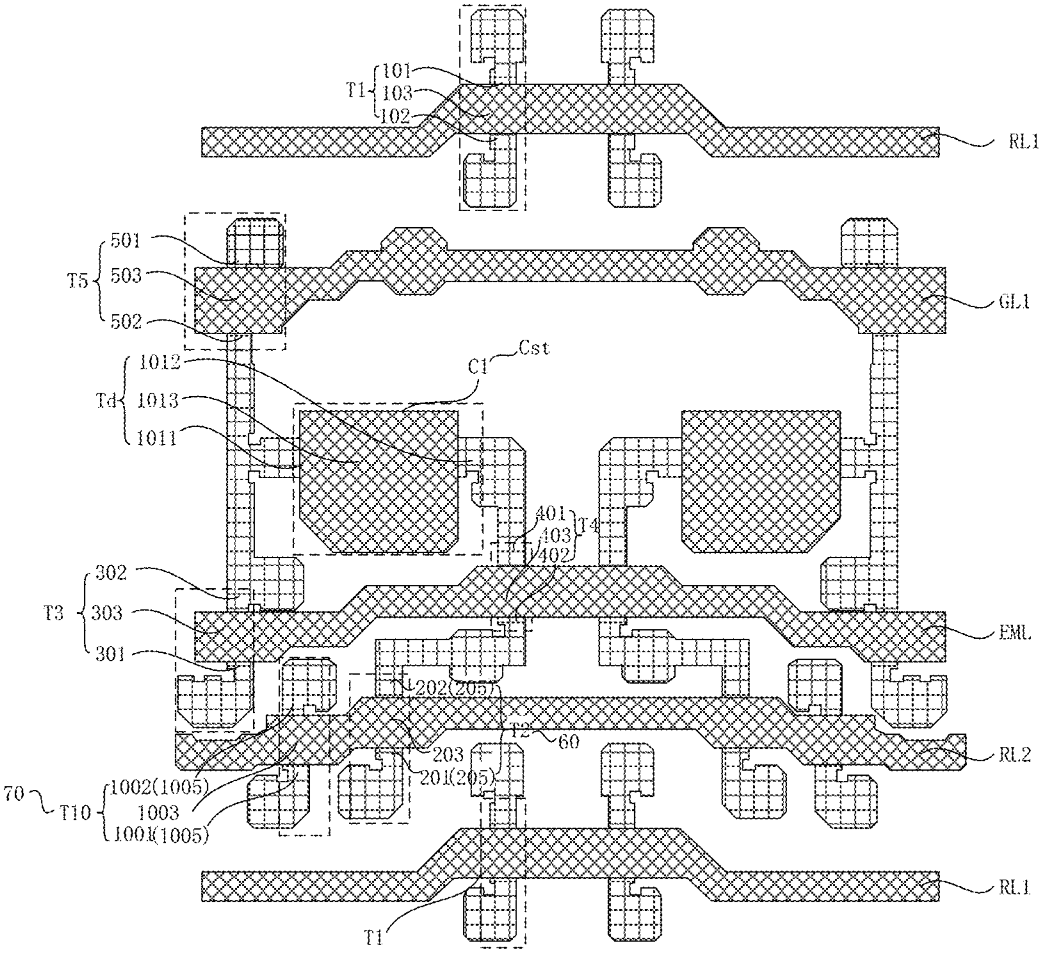
FIG. 51 is a top view of yet other film layers provided in embodiments of the present disclosure.
Figure 59:
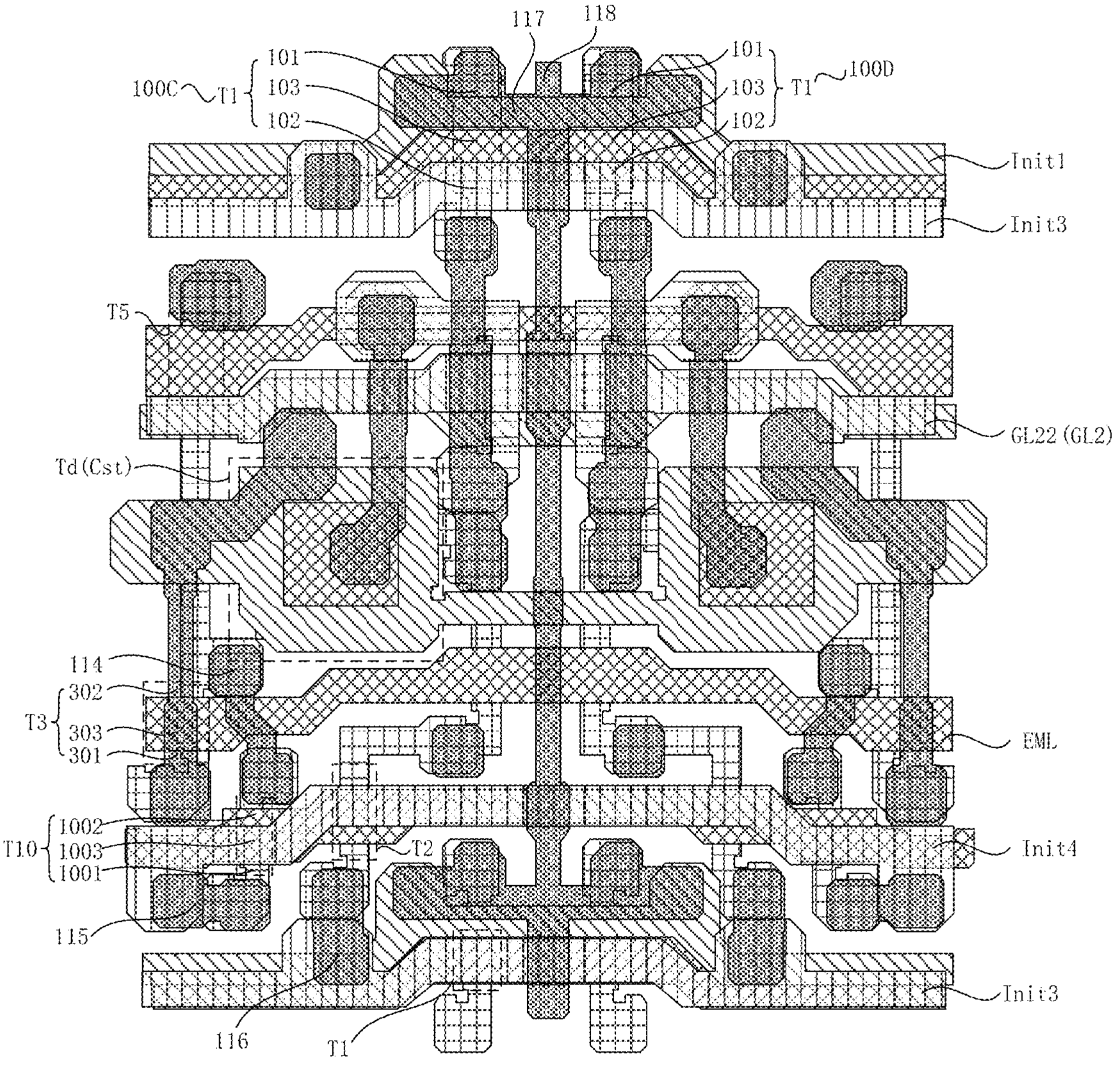
FIG. 59 is a top view of yet other film layers provided in embodiments of the is present disclosure.

As shown in FIGS. 49 and 51, the second reset sub-circuit 60 includes a second transistor T2, and the second transistor T2 includes a second active pattern 205 and a second gate 203. The second active pattern 205 includes a second source portion 201 and a second drain portion 202. The second source portion 201 may serve as the first electrode of the second transistor T2, and the second drain portion 202 may serve as the second electrode of the second transistor T2. The second drain portion 202 and the fourth drain portion 402 are connected to be a one-piece structure. That is, the second drain portion 202 and the fourth drain portion 402 are located in the same layer and electrically connected. The second source portion 201 is used to be connected to the third initialization signal line Init3 (as shown in FIG. 59), and a portion of the second source portion 201 connected to the third initialization signal line Init3 is the second initialization signal terminal INI2 (as shown in FIG. 31C).

In addition, the second active pattern 205 further includes a second channel portion 204. The second channel portion 204 is located between the second source portion 201 and the second drain portion 202, and the second channel portion 204 overlaps with the second gate 203 of the second transistor T2 in the thickness direction of the display panel 200.

As shown in FIGS. 49 and 51, the third reset sub-circuit 70 includes a tenth transistor T10, and the tenth transistor T10 includes a tenth active pattern 1005 and a tenth gate 1003. The tenth active pattern 1005 is arranged in the same layer as the second active pattern 205. The tenth active pattern 1005 includes a tenth source portion 1001 and a tenth drain portion 1002. The tenth source portion 1001 may serve as the first electrode of the tenth transistor T10, and the tenth drain portion 1002 may serve as the second electrode of the tenth transistor T10.

In addition, the tenth active pattern 1005 further includes a tenth channel portion 1004. The tenth channel portion 1004 is located between the tenth source portion 1001 and the tenth drain portion 1002, and the tenth channel portion 1004 overlaps with the tenth gate 1003 of the tenth transistor T10 in the thickness direction of the display panel 200.

Figure 58:
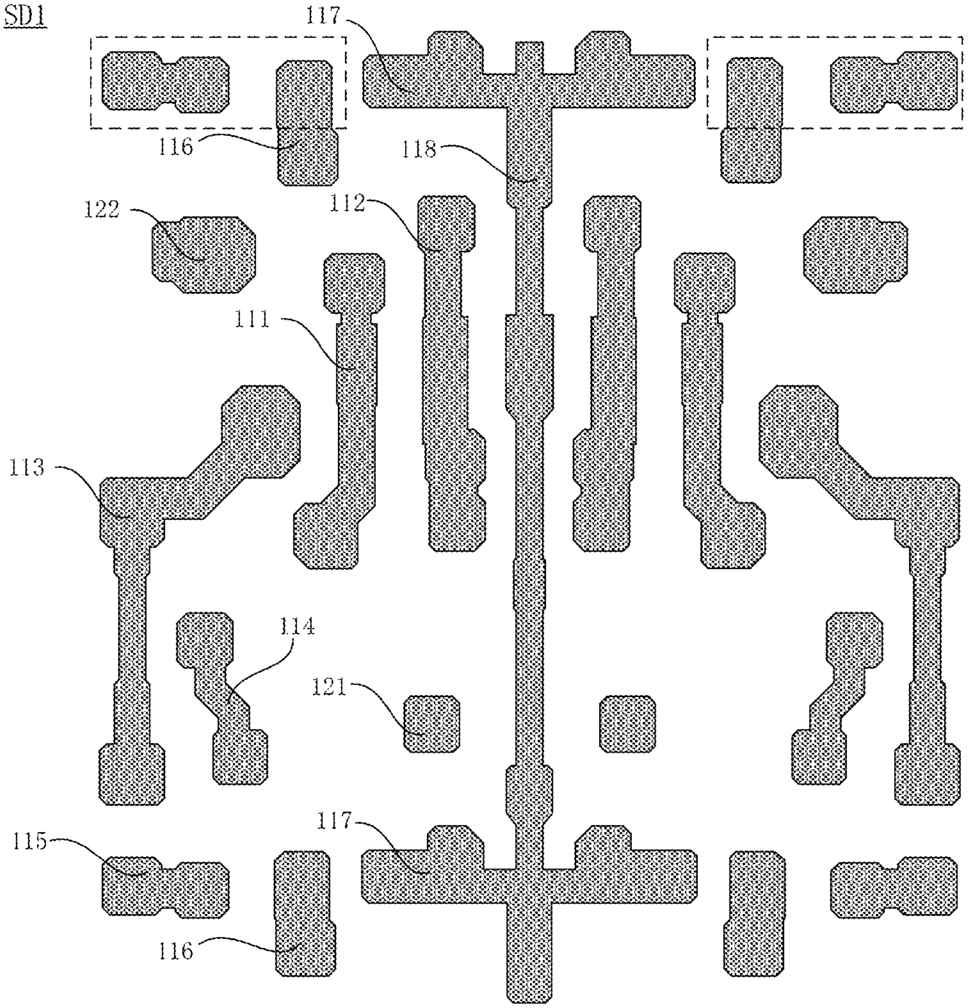
FIG. 58 is a top view of another first connection layer provided in embodiments of the present disclosure.

As shown in FIGS. 58 and 59, the first connection layer SD1 further includes a fourth connection electrode 114, and the tenth drain portion 1002 and the third drain portion 302 are electrically connected through the fourth connection electrode 114. The tenth source portion 1001 is connected to the fourth initialization signal line Init4, and a portion of the tenth source portion 1001 connected to the fourth initialization signal line Init4 is the third initialization signal terminal INI3 (as shown in FIG. 31C).

In some examples, the tenth drain portion 1002 does not overlap with the third drain portion 302 in the thickness direction of the display panel 200. In this case, a first end of the fourth connection electrode 114 overlaps with the tenth drain portion 1002 in the thickness direction of the display panel 200, and a second end of the fourth connection electrode 114 overlaps with the third drain portion 302 in the thickness direction of the display panel 200. In this way, the first end of the fourth connection electrode 114 and the tenth drain portion 1002 may be electrically connected through a fourteenth via hole in an insulating layer located therebetween, and the second end of the fourth connection electrode 114 and the third drain portion 302 may be electrically connected through a fifteenth via hole in an insulating layer located therebetween. As a result, the electrical connection between the tenth drain portion 1002 and the third drain portion 302 can be realized.

Figure 56:
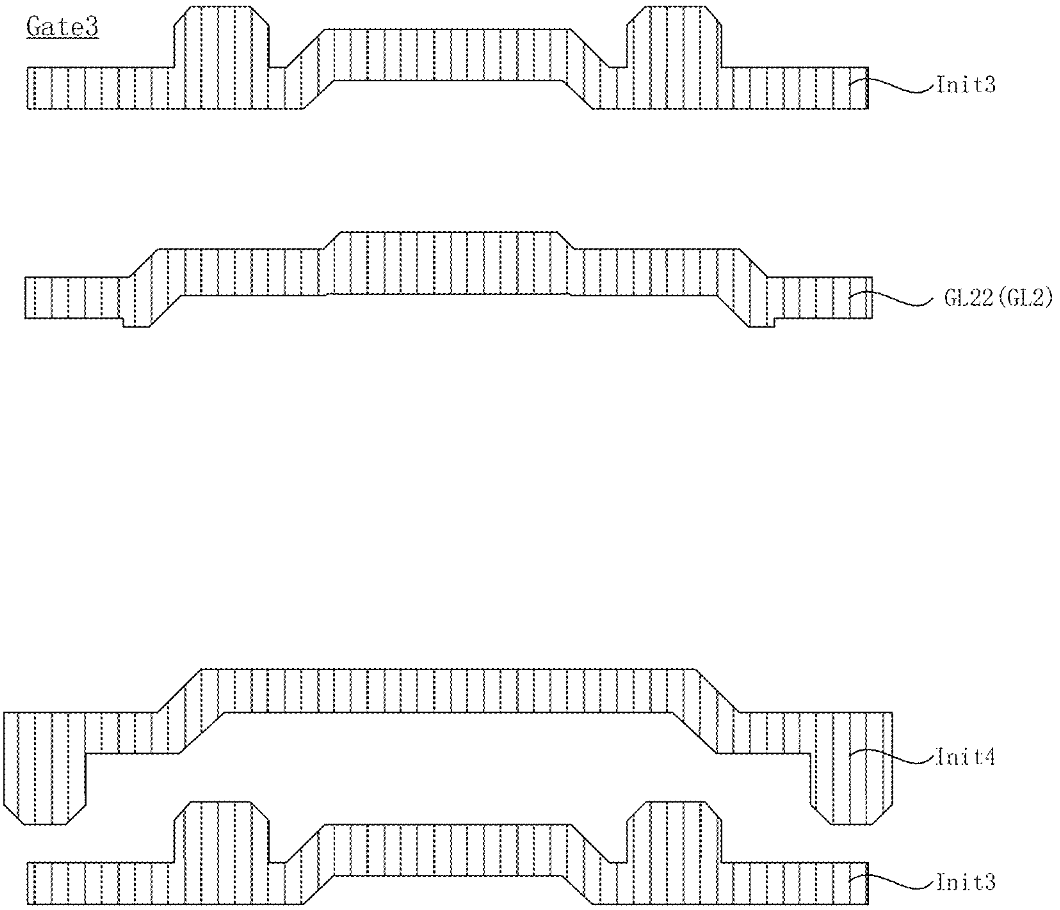
FIG. 56 is a top view of another connection layer provided in embodiments of the present disclosure.
Figure 57:
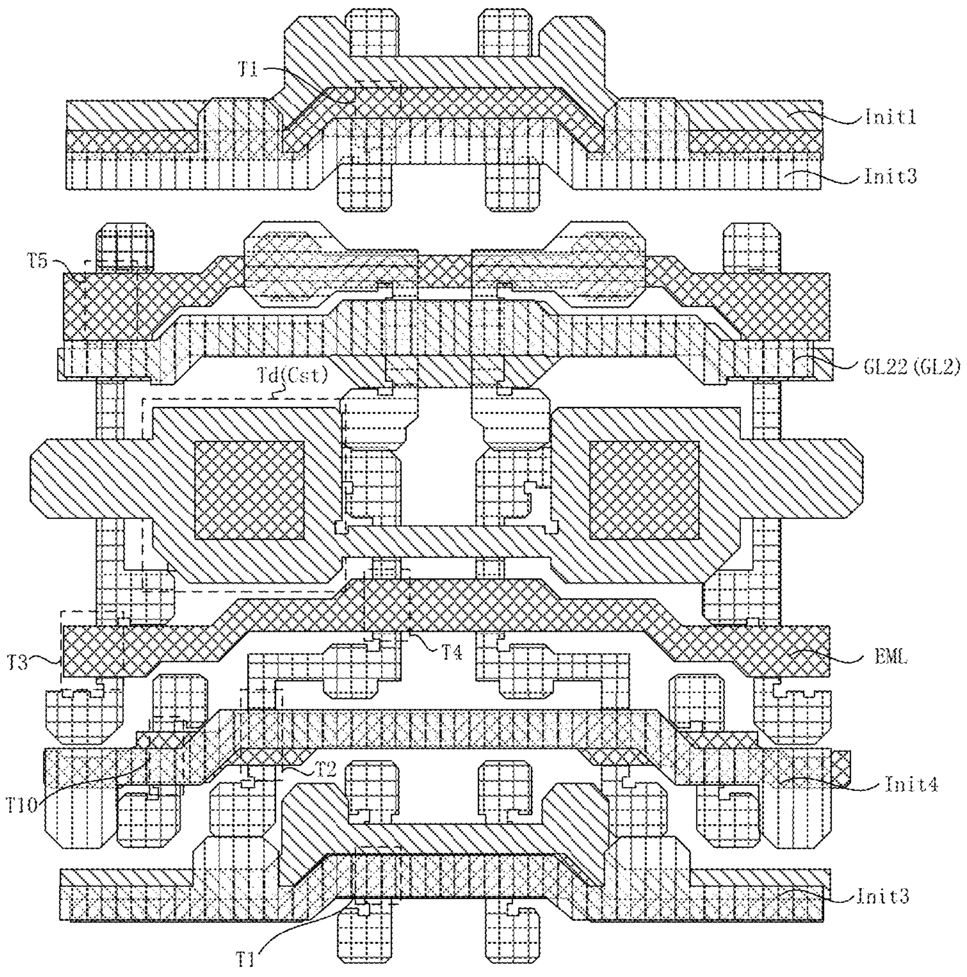
FIG. 57 is a top view of yet other film layers provided in embodiments of the present disclosure.

In some embodiments, as shown in FIG. 56, the third initialization signal line Init3 and the fourth initialization signal line Init4 are located in the connection line layer Gate3.

In some examples, as shown in FIGS. 56 to 59, the first connection layer SD1 further includes a fifth connection electrode 115, and the tenth source portion 1001 and the fourth initialization signal line Init4 are electrically connected through the fifth connection electrode 115.

For example, the tenth source portion 1001 does not overlap with the fourth initialization signal line Init4 in the thickness direction of the display panel 200. A first end is of the fifth connection electrode 115 overlaps with the tenth source portion 1001 in the thickness direction of the display panel 200, and the second end of the fifth connection electrode 115 overlaps with the fourth initialization signal line Init4 in the thickness direction of the display panel 200. In this way, the first end of the fifth connection electrode 115 and the tenth source portion 1001 may be electrically connected through a sixteenth via hole in an insulating layer located therebetween, and the second end of the fifth connection electrode 115 and the fourth initialization signal line Init4 may be electrically connected through a seventeenth via hole in an insulating layer located therebetween. As a result, the electrical connection between the tenth source portion 1001 and the fourth initialization signal line Init4 can be realized.

In some examples, as shown in FIGS. 56 to 59, the first connection layer SD1 further includes a sixth connection electrode 116, and the second source portion 201 and the third initialization signal line Init3 are electrically connected through the sixth connection electrode 116.

For example, the second source portion 201 does not overlap with the third initialization signal line Init3 in the thickness direction of the display panel 200. A first end of the sixth connection electrode 116 overlaps with the second source portion 201 in the thickness direction of the display panel 200, and a second end of the sixth connection electrode 116 overlaps with the third initialization signal line Init3 in the thickness direction of the display panel 200. In this way, the first end of the sixth connection electrode 116 and the second source portion 201 may be electrically connected through an eighteenth via hole in an insulating layer located therebetween, and the second end of the sixth connection electrode 116 and the third initialization signal line Init3 may be electrically connected through a nineteenth via hole in an insulating layer located therebetween. As a result, the electrical connection between the second source portion 201 and the third initialization signal line Init3 can be realized.

It will be noted that, in two pixel circuits 100 that are adjacent in the column direction Y, partial structures of a pixel circuit 100 (referring to the dashed box in FIG. 58) is omitted in FIG. 59 and subsequent drawings, which is only for the convenience of illustration of other structures and does not limit the embodiments of the present disclosure.

Figure 52:
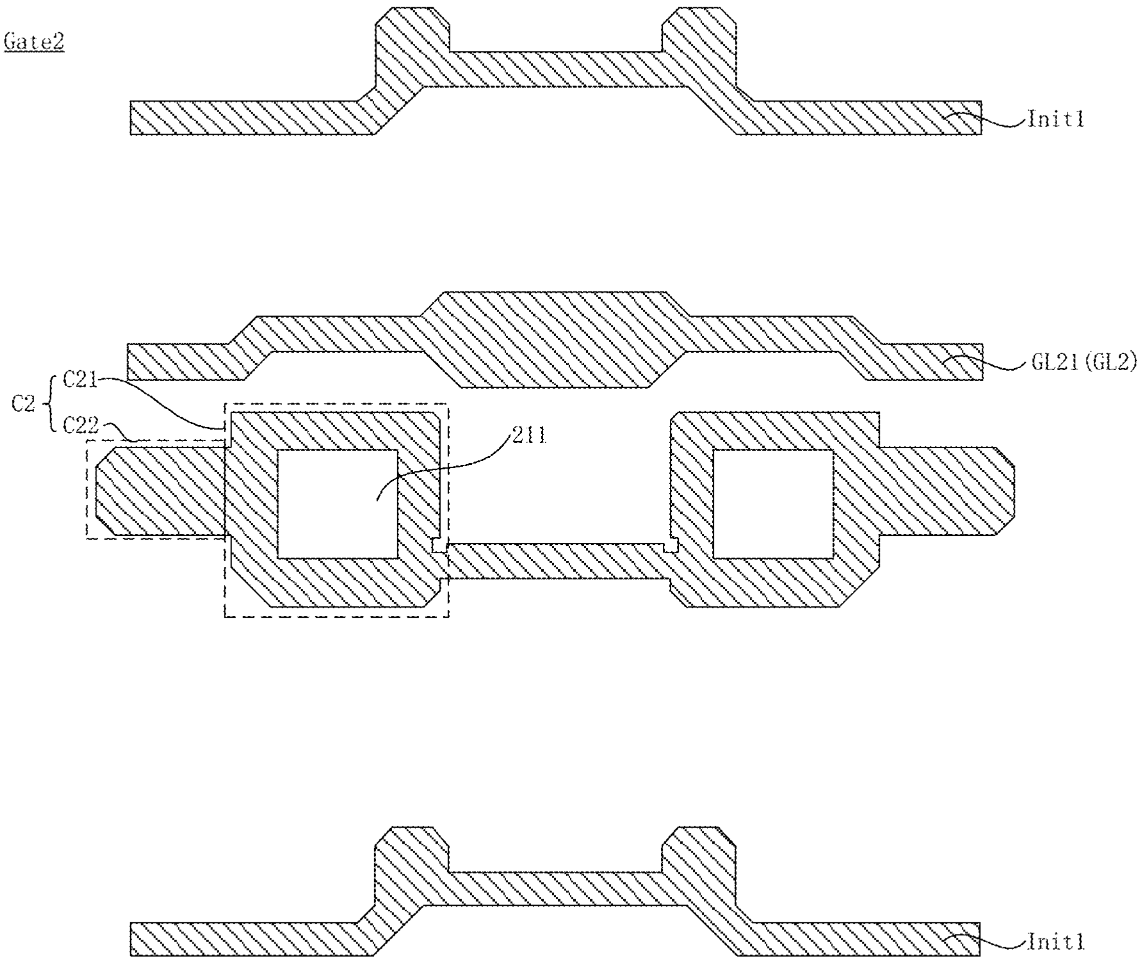
FIG. 52 is a top view of yet another second gate conductive layer provided in embodiments of the present disclosure.
Figure 53:
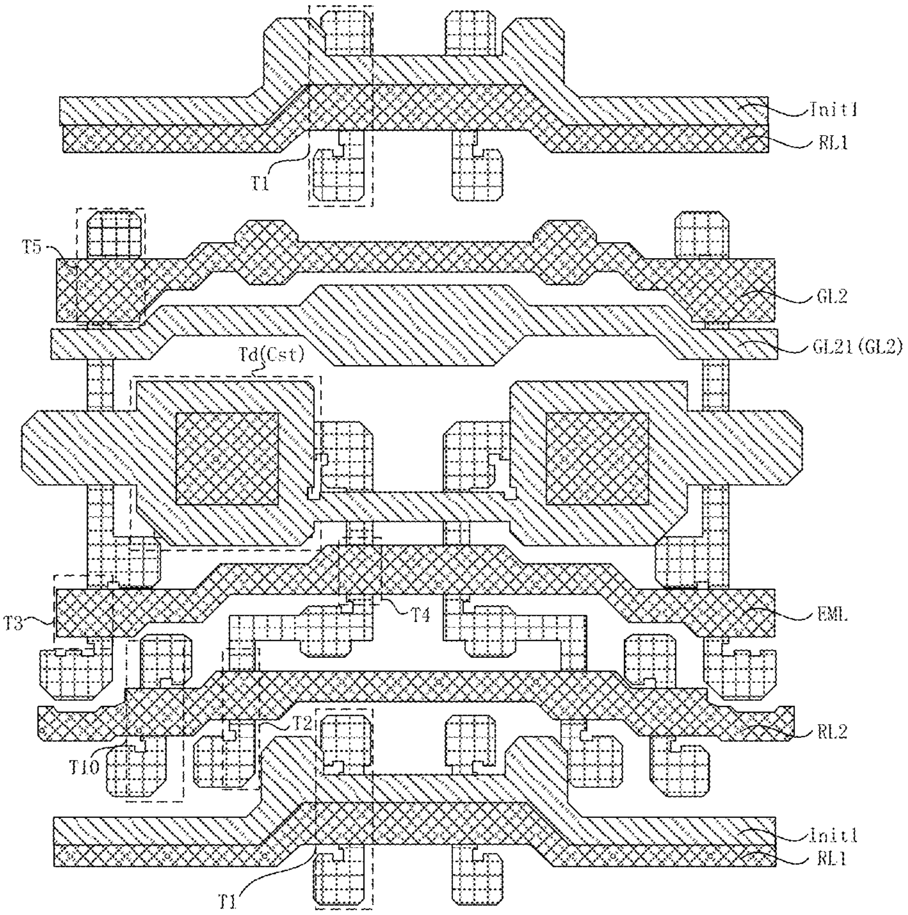
FIG. 53 is a top view of yet other film layers provided in embodiments of the present disclosure.
Figure 54:
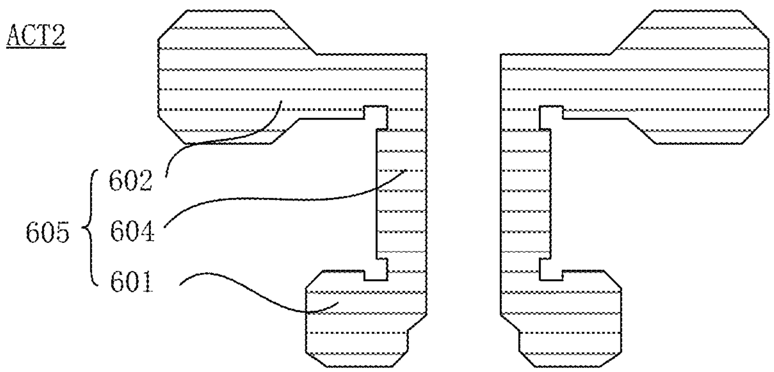
FIG. 54 is a top view of another second active layer provided in embodiments of the present disclosure.
Figure 55:
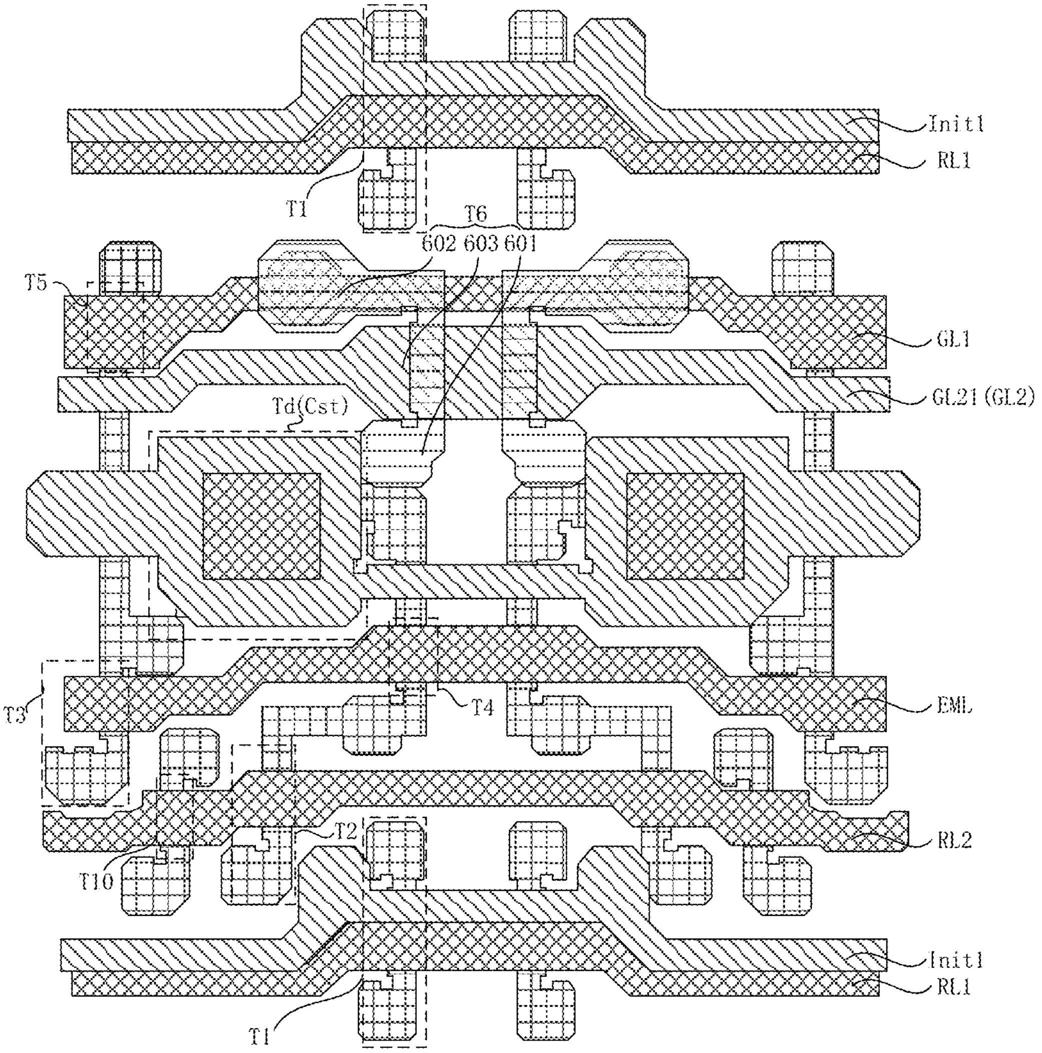
FIG. 55 is a top view of yet other film layers provided in embodiments of the present disclosure.

In some embodiments, as shown in FIG. 52, the first initialization signal line Init1 and the second storage electrode C2 are arranged in the same layer. For example, the first initialization signal line Init1 and the second storage electrode C2 are both arranged in the second gate conductive layer Gate2.

In some examples, as shown in FIGS. 58 and 59, the first connection layer SD1 further includes a plurality of seventh connection electrodes 117 and a plurality of eighth connection traces 118. Two first source portions 101 in two adjacent pixel circuits 100 (e.g., a third pixel circuit 100C and a fourth pixel circuit 100D) in a same row of pixel circuits 100 are electrically connected to the first initialization signal line Init1 through the seventh connection electrode 117. Two adjacent pixel circuits 100 in the same row of pixel circuits 100 may be connected to the same first initialization signal line Init1 with using the seventh connection electrode 117, which enables the two adjacent pixel circuits 100 to be mirror-symmetric, thereby helping improve a pixel ratio of the display panel 200.

In some examples, the first source portion 101 in the pixel circuit 100 (e.g., the third pixel circuit 100C) and the seventh connection electrode 117 are electrically connected through a twentieth via hole in an insulating layer located therebetween; and the first initialization signal line Init1 and the seventh connection electrode 117 are electrically connected through a twenty-first via hole in an insulating layer located therebetween. In this way, the electrical connection between the first source portion 101 and the first initialization signal line Init1 can be realized.

The seventh connection electrode 117 and the third initialization signal line Init3 are both electrically connected to the eighth connection trace 118. In some examples, an extending direction of the eighth connection trace 118 intersects an extending direction of the seventh connection electrode 117. For example, the extending direction of the eighth connection trace 118 is substantially perpendicular to the extending direction of the seventh connection electrode 117. In this way, all first initialization signal lines Init1 and all third initialization signal lines Init3 are in a shape of a grid, which can improve the uniformity of the arrangement of the first initialization signal lines Init1 and the third initialization signal lines Init3 in the display panel 200, thereby improving the charging uniformity of the pixel circuit 100 and the display uniformity of the display panel 200.

In some embodiments, as shown in FIG. 51, two portions of a same reset signal is line (e.g., the second reset signal line RL2) serve as the second gate 203 and the tenth gate 1003, respectively. That is, a portion of the second reset signal line RL2 serves as the second gate 203, and another portion of the second reset signal line RL2 serves as the tenth gate 1003. In this way, the second transistor T2 and the tenth transistor T10 can be simultaneously controlled by one reset signal line, so that the number of signal lines in the display panel 200 can be reduced.

Figure 50:
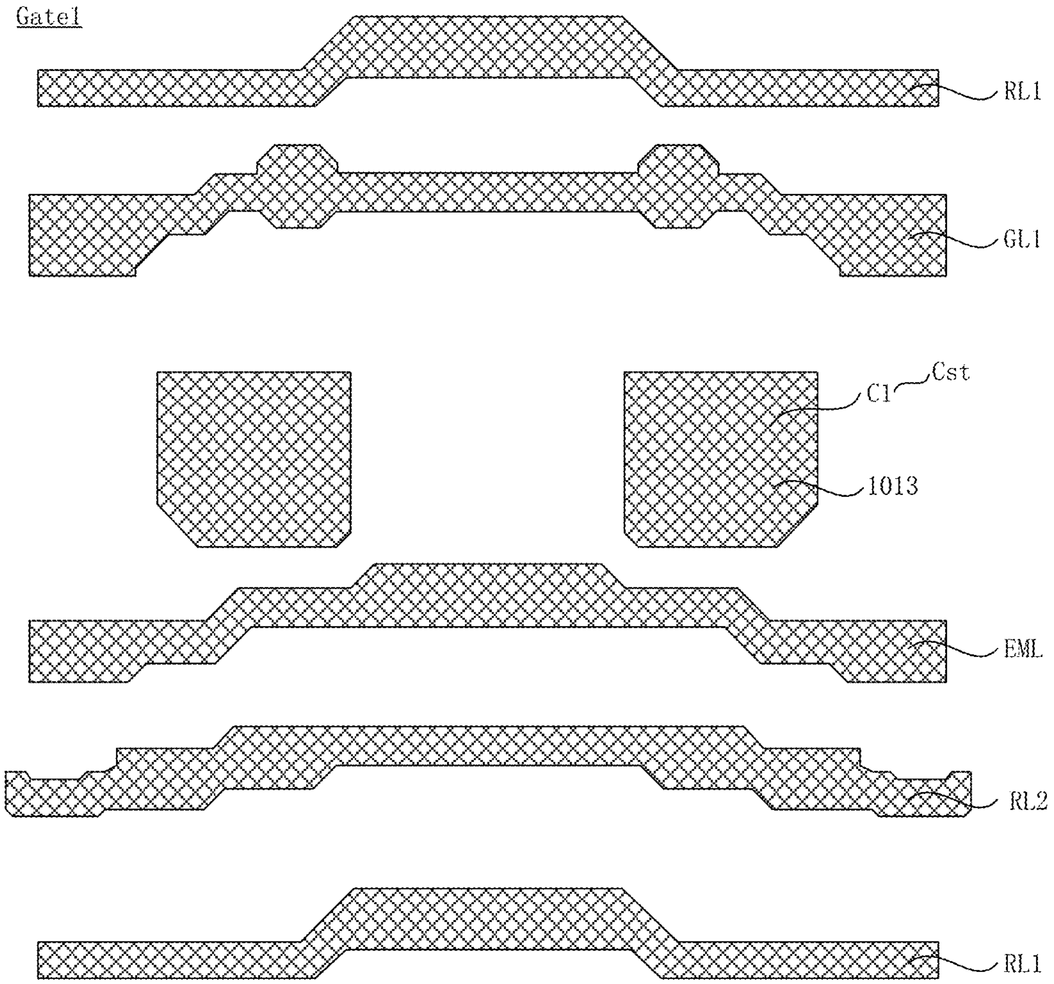
FIG. 50 is a top view of another first gate conductive layer provided in embodiments of the present disclosure.

In some examples, as shown in FIG. 50, the second reset signal line RL2 is arranged in the same layer as the gate 1013. That is, the second reset signal line RL2 is located in the first gate conductive layer Gate1. In this way, it may be possible to simplify the manufacturing process and improve the overall manufacturing efficiency.

Figure 60:
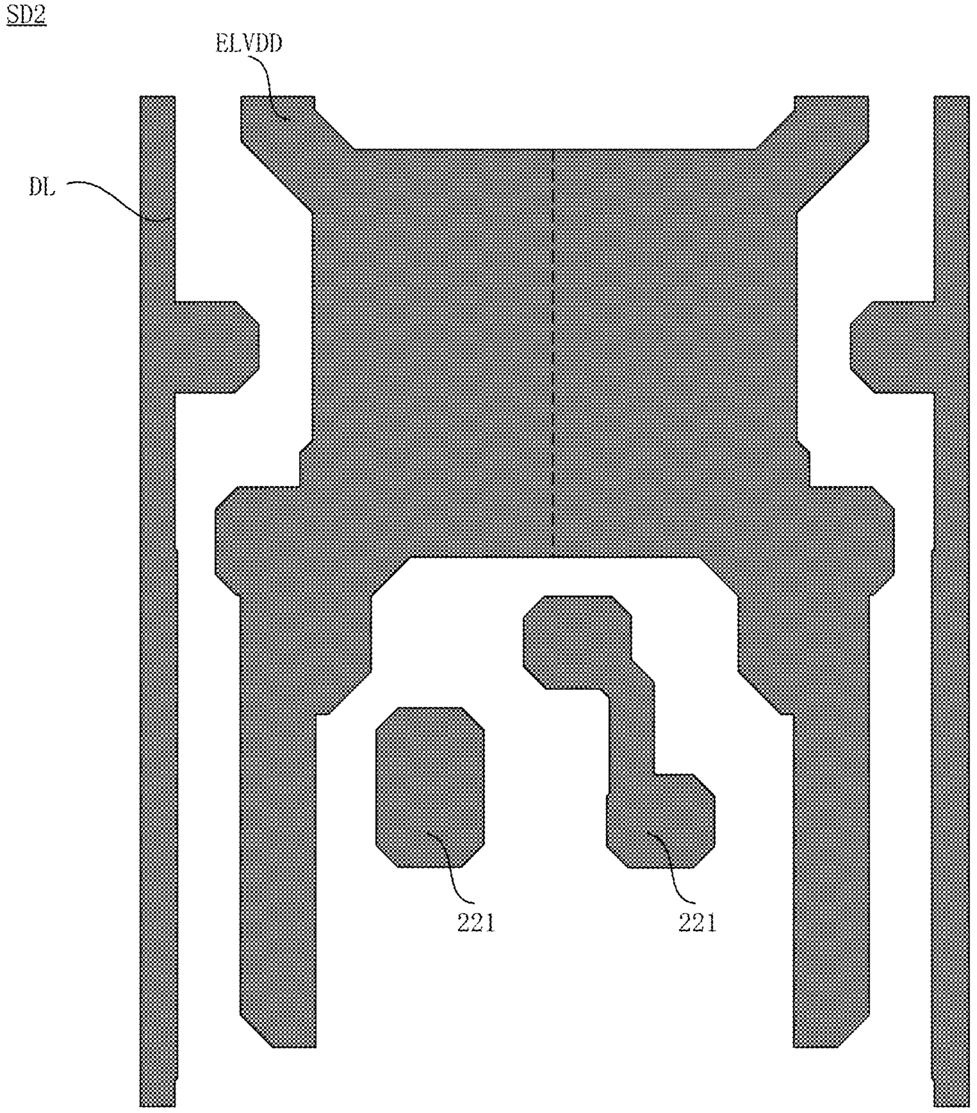
FIG. 60 is a top view of another second connection layer provided in embodiments of the present disclosure.
Figure 61:
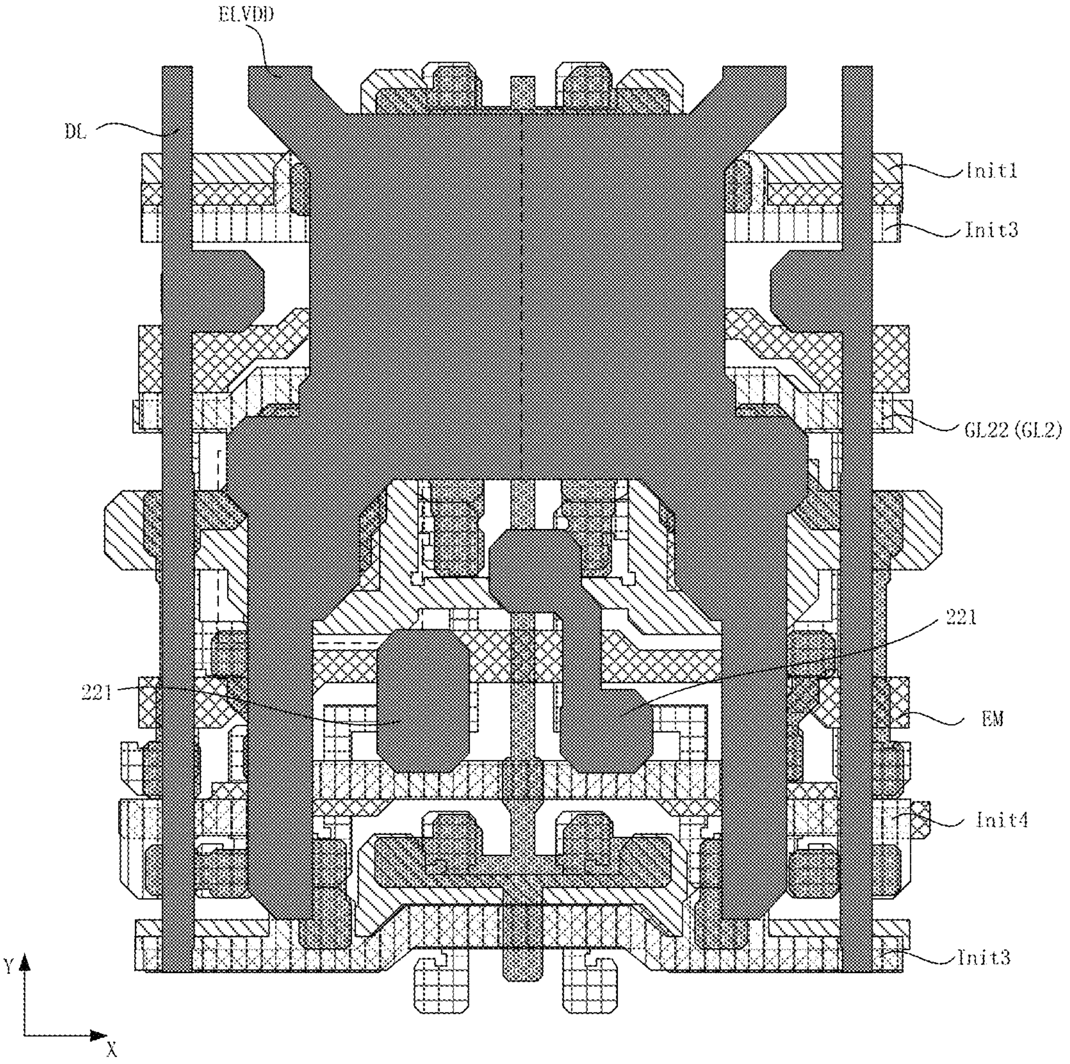
FIG. 61 is a top view of yet other film layers provided in embodiments of the present disclosure.

In some embodiments, as shown in FIGS. 60 and 61, two switching structures 221 that are adjacent in the row direction X have different shapes.

For example, a switching structure 221 in the two adjacent switching structures 221 overlaps with a fourth drain portion 402 in the thickness direction of the display panel 200, and the fourth drain portion 402 is in a pixel circuit 100 where the switching structure 221 is located, and the switching structure 221 further overlaps with an anode 411 of a light-emitting device corresponding to the pixel circuit 100 in the thickness direction of the display panel 200. An end of the other switching structure 221 in the two adjacent switching structures 221 overlaps with a fourth drain portion 402 in the thickness direction of the display panel 200, and the fourth drain portion 402 is in a pixel circuit 100 where the other switching structure 221 is located; and another end of the other switching structure 221 overlaps with an anode 411 of a light-emitting device in the thickness direction of the display panel 200, and the light-emitting device corresponds to the pixel circuit 100.

With such an arrangement, a connection point between one of two adjacent light-emitting devices and its corresponding pixel circuit may be away from a connection point between the other one of the two adjacent light-emitting devices and its corresponding pixel circuit, which facilitates a subsequent arrangement of the light-emitting devices.

Figure 62:
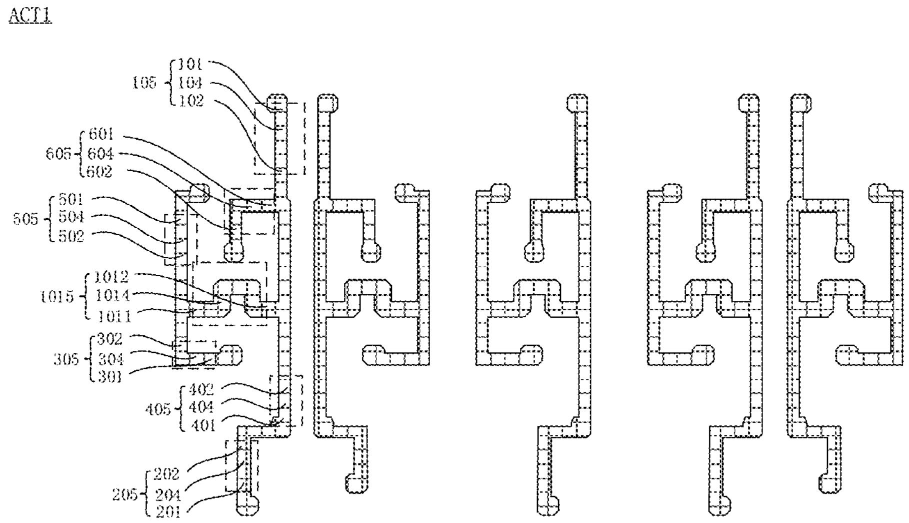
FIG. 62 is a top view of yet another first active layer provided in embodiments of the present disclosure.
Figure 63:
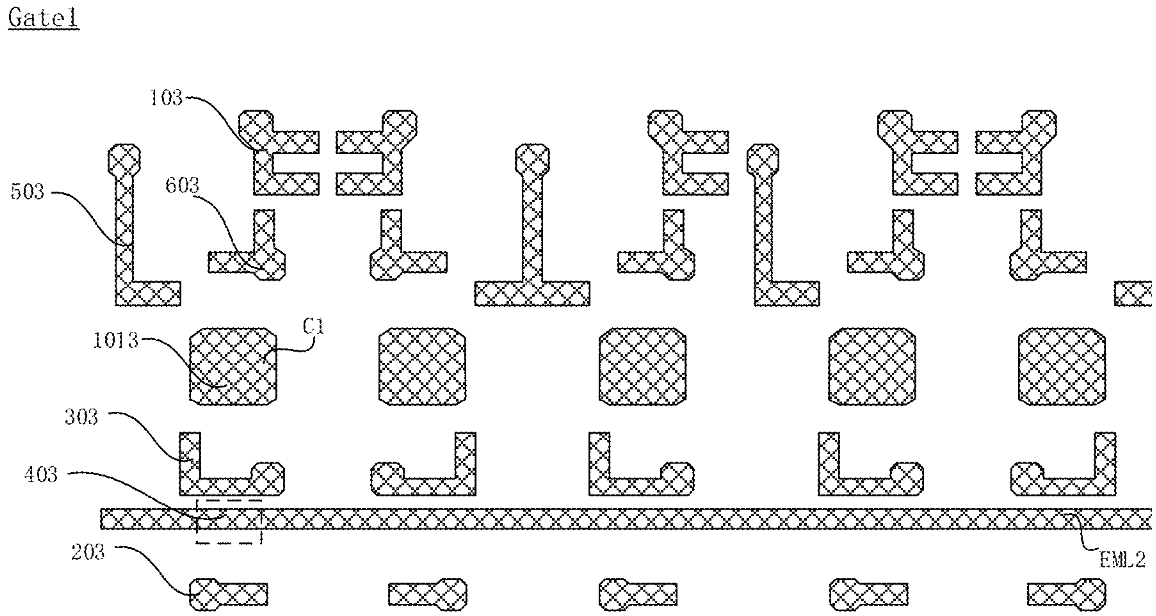
FIG. 63 is a top view of yet another first gate conductive layer provided in embodiments of the present disclosure.

In some embodiments, referring to FIGS. 62 to 70, the sixth active pattern 605 in the pixel circuit 100 may also be arranged in the same layer as the active pattern 1015. As shown in FIG. 62, the sixth source portion 601 included in the sixth active pattern 605 and the drain portion 1012 of the active pattern 1015 are connected to be a one-piece structure. With such an arrangement, the overall structure of the pixel circuit 100 is simple and easy to be manufactured.

In some examples, the first drain portion 102 of the first active pattern 105 and the sixth source portion 601 are connected to be a one-piece structure; and the second drain portion 202 of the second active pattern 205 and the fourth drain portion 402 of the fourth active pattern 405 are connected to be a one-piece structure. With such an arrangement, active patterns of all transistors included in the pixel circuit 100 are located in the same layer (e.g., the first active layer ACT1), which may simplify the manufacturing process of the pixel circuit 100.

Figure 68:
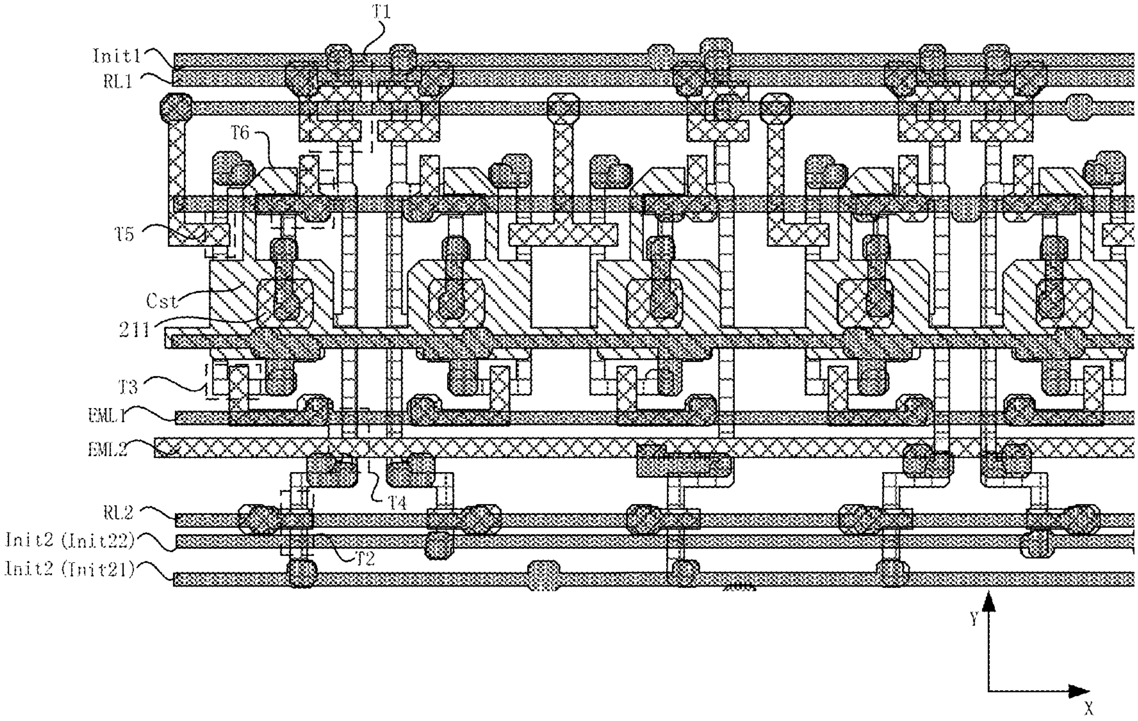
FIG. 68 is a top view of yet other film layers provided in embodiments of the present disclosure.

In some embodiments, as shown in FIG. 68, a portion of the second reset signal line RL2 serves as the second gate 203 of the second transistor T2. That is, the portion of the second reset signal line RL2 may be used as the second gate 203. In this way, it may be possible to reduce the use of materials and reduce the manufacturing cost.

The second reset signal line RL2 and the second initialization signal line Init2 are arranged in the same layer, so that the second reset signal line RL2 and the second initialization signal line Init2 may be fabricated simultaneously. As a result, the manufacturing efficiency of the pixel circuit 100 is improved.

In some examples, an extending direction of the second reset signal line RL2 is and the extending direction of the second initialization signal line Init2 are substantially the same, which may reduce the transmission interference of signals on the second reset signal line RL2 and the second initialization signal line Init2.

Figure 64:
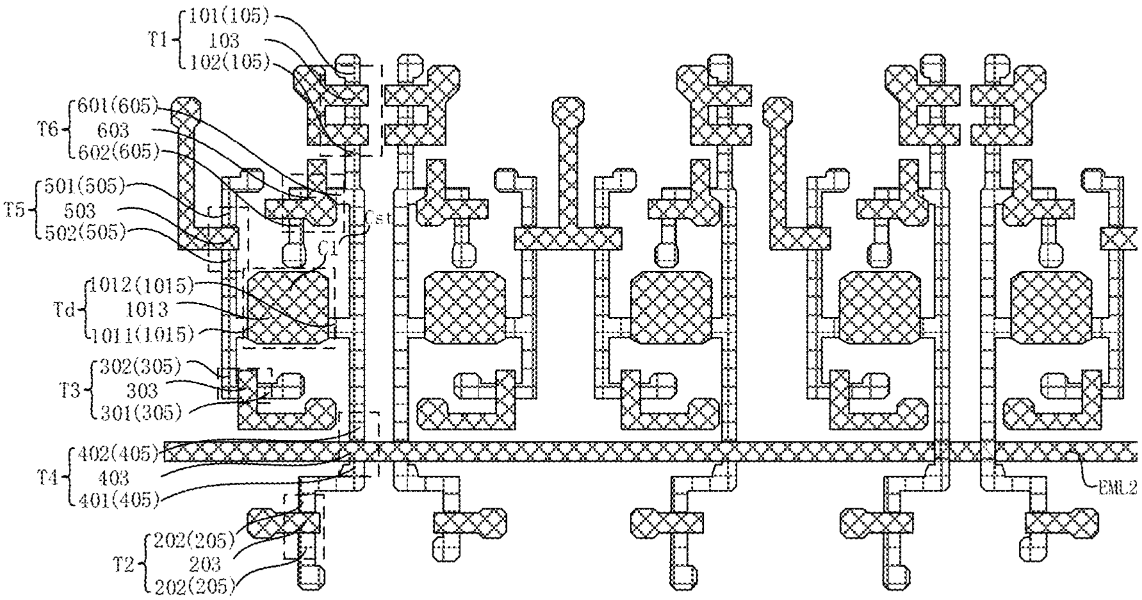
FIG. 64 is a top view of yet other film layers provided in embodiments of the present disclosure.
Figure 65:
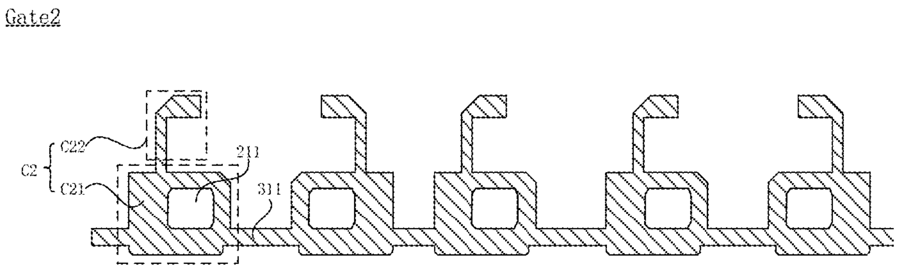
FIG. 65 is a top view of yet another second gate conductive layer provided in embodiments of the present disclosure.
Figure 66:
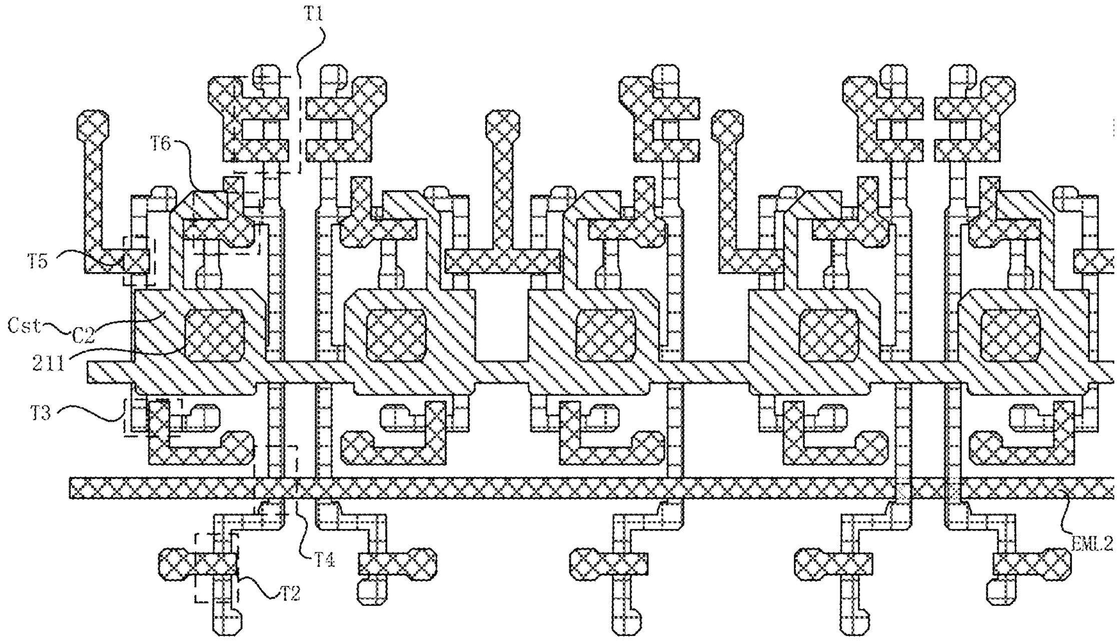
FIG. 66 is a top view of yet other film layers provided in embodiments of the present disclosure.
Figure 67:
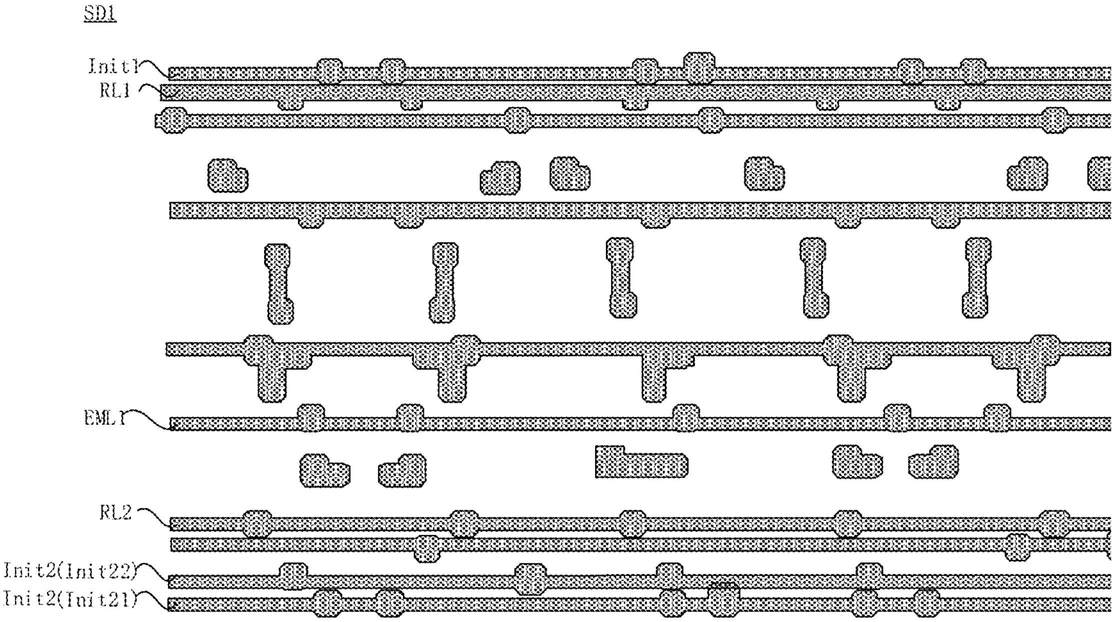
FIG. 67 is a top view of yet another first connection layer provided in embodiments of the present disclosure.

In some embodiments, as shown in FIGS. 64 and 67, portions of two different enable signal lines (e.g., the first enable signal line EML1 and the second enable signal line EML2) serve as the third gate 303 and the fourth gate 403, respectively. That is, in the two different enable signal lines, a portion of an enable signal line (e.g., the first enable signal line EML1) serves as the third gate 303, and a portion of another enable signal line (e.g., the second enable signal line EML2) serves as the fourth gate 403. In this way, the third gate 303 and the fourth gate 403 can be separately controlled by different enable signal lines, thereby improving the flexible control of the pixel circuit 100.

In some embodiments, as shown in FIG. 68, in two pixel circuits 100 that are is adjacent in the row direction X, two second source portions 201 are electrically connected to two different second initialization signal lines Init2 (e.g., a second initialization signal line Init21 and a second initialization signal line Init22 shown in FIG. 68), respectively.

With such an arrangement, different second initialization signals may be provided to the two pixel circuits 100 through the two second initialization signal lines Init2, respectively, so that the two adjacent pixel circuits 100 are separately controlled.

In some examples, two second initialization signal lines Init2 (e.g., the second initialization signal line Init21 and the second initialization signal line Init22 shown in FIG. 68) are located in the first connection layer SD1 and arranged adjacent to each other in the column direction Y.

Figure 69:
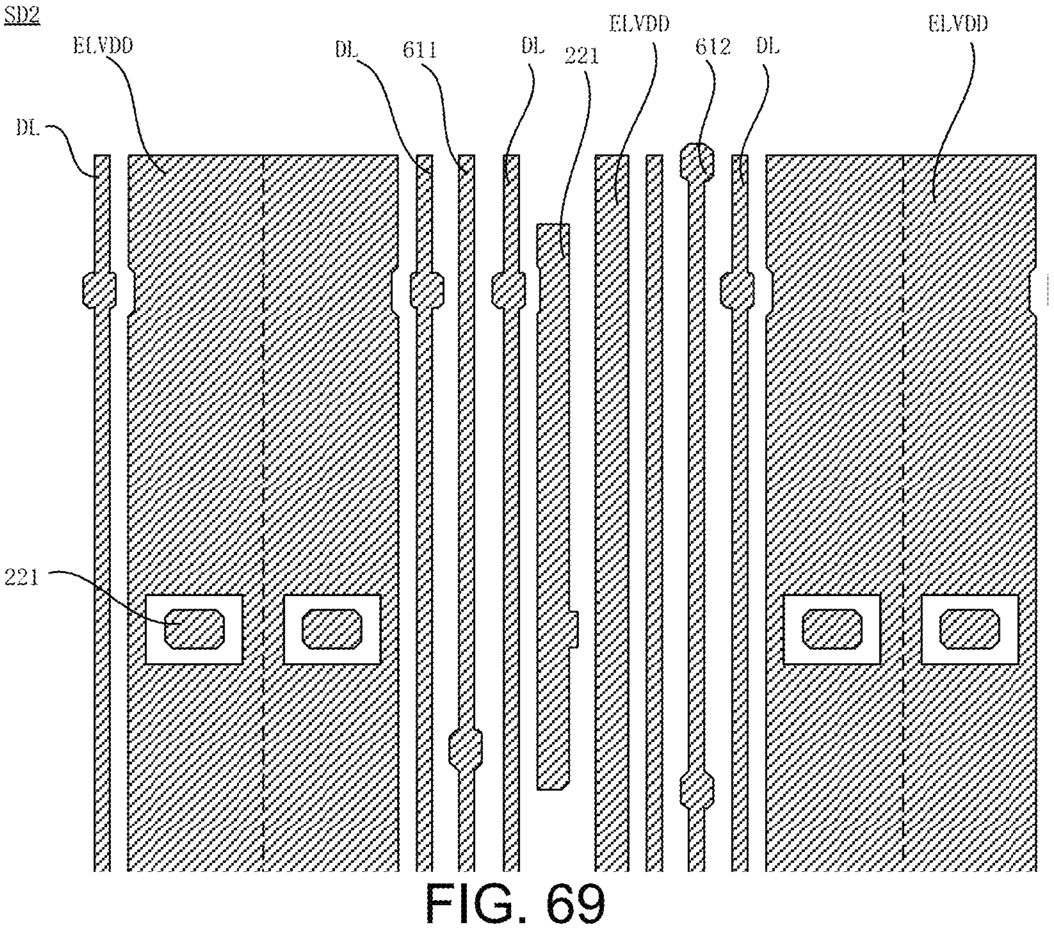
FIG. 69 is a top view of yet another second connection layer provided in embodiments of the present disclosure.
Figure 70:
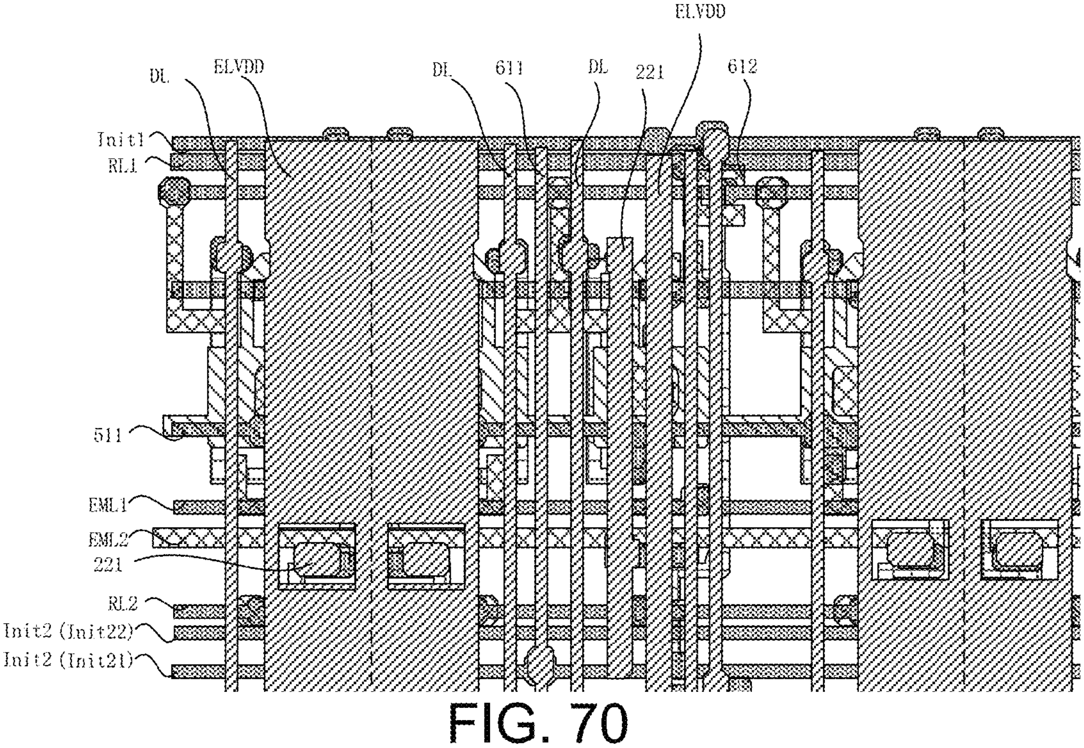
FIG. 70 is a top view of yet other film layers provided in embodiments of the present disclosure.

In some embodiments, as shown in FIGS. 69 and 70, the second connection layer SD2 further includes a plurality of ninth connection traces 611. An extending direction of the ninth connection traces 611 intersects the extending direction of the second initialization signal line Init2. For example, the extending direction of the ninth connection trace 611 is substantially perpendicular to the extending direction of the second initialization signal line Init2. The ninth connection trace 611 and the second initialization signal line Init2 (e.g., the second initialization signal line Init22) are connected through a twenty-second via hole in an insulating layer located therebetween. In this way, second initialization signal lines Init2 (second initialization signal lines Init22) and the plurality of ninth connection traces 611 are in a shape of a grid, which can improve the uniformity of the arrangement of the second initialization signal lines Init2 (the second initialization signal lines Init22) in the display panel 200, thereby improving the charging uniformity of the pixel circuit 100 and the display uniformity of the display panel 200.

In some embodiments, as shown in FIGS. 69 and 70, the second connection layer SD2 further includes a plurality of tenth connection traces 612. An extending direction of the tenth connection trace 612 intersects the extending direction of the first initialization signal line Init1. For example, the extending direction of the tenth connection trace 612 is substantially perpendicular to the extending direction of the first initialization signal line Init1. The tenth connection trace 612 and the first initialization signal line Init1 are connected through a twenty-third via hole in an insulating layer located therebetween. In this way, first initialization signal line Inits1 and the plurality of tenth connection traces 612 are in a shape of a grid, which can improve the uniformity of the arrangement of the first initialization signal lines Init1 in the display panel 200, thereby improving the charging uniformity of the pixel circuit 100 and the display uniformity of the display panel 200.

It will be noted that, the second initialization signal line Init21 may be electrically connected to an eleventh connection trace located in the second connection layer SD2, so that second initialization signal lines Init21 and a plurality of eleventh connection traces may be in a shape of a grid, which can improve the uniformity of the arrangement of the second initialization signal lines Init22 in the display panel 200, thereby improving the charging uniformity of the pixel circuit 100 and the display uniformity of the display panel 200.

In some embodiments, as shown in FIGS. 69 and 70, in three pixel circuits 100 that are adjacent in the row direction X, two adjacent pixel circuits 100 share a same first voltage signal line ELVDD. That is, two first voltage signal lines ELVDD connected to the two adjacent pixel circuits 100 are connected to be a one-piece structure. In this way, the same first voltage signal line ELVDD is easy to cover a signal line below it, thereby shielding the crosstalk of another signal to the signal line.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:

a plurality of pixel circuits, wherein a pixel circuit in the plurality of pixel circuits includes:

a driving sub-circuit, wherein the driving sub-circuit includes:

a driving transistor, wherein the driving transistor includes a gate and an active pattern, the active pattern includes a source portion and a drain portion; and a storage capacitor, wherein the storage capacitor includes a first storage electrode and a second storage electrode, the first storage electrode and the gate share a same electrode, and the second storage electrode is used to be connected to a first voltage signal line;

a fourth sub-circuit, wherein the fourth sub-circuit is configured such that the drain portion and the gate are connected when the fourth sub-circuit is turned on; and a first reset sub-circuit, wherein the first reset sub-circuit includes a first active pattern; the first active pattern is arranged in a same layer as the active pattern, and the first active pattern includes a first source portion and a first drain portion; the first drain portion is connected to the drain portion, and the first source portion is used to be connected to a first initialization signal line.

2. The display panel according to claim 1, wherein the fourth sub-circuit includes a sixth transistor, the sixth transistor includes a sixth active pattern, and a material of the sixth active pattern includes an oxide semiconductor material.

3. The display panel according to claim 2, wherein the pixel circuit further includes a third sub-circuit, and the third sub-circuit includes a fifth transistor; the fifth transistor includes a fifth active pattern, and the fifth active pattern includes a fifth source portion and a fifth drain portion; the fifth drain portion and the source portion are connected to be a one-piece structure, and the fifth source portion is used to be connected to a data line; and the fifth transistor further includes a fifth gate, and the sixth transistor further includes a sixth gate, wherein portions of two different scanning lines serve as the fifth gate and the sixth gate, respectively, and one of the two different scanning lines, a portion of which serves as the fifth gate, is arranged in the same layer as the gate, and another of the two different scanning lines, a portion of which serves as the sixth gate, is located in a different layer from the gate; or the fifth transistor further includes the fifth gate, and the sixth transistor further includes a sixth bottom gate and a sixth top gate, wherein portions of two scanning lines serve as the sixth bottom gate and the sixth top gate, respectively, and the two scanning lines are located in different layers; a portion of another scanning line serves as the fifth gate, and the another scanning line is arranged in the same layer as the gate and in a different layer from the two scanning lines.

4. The display panel according to claim 2, wherein the display panel further comprises a first connection layer, wherein the first connection layer includes a first connection electrode; the sixth active pattern includes a sixth source portion and a sixth drain portion; the sixth drain portion is electrically connected to the gate through the first connection electrode, and the sixth source portion is electrically connected to the drain portion; and the first connection electrode, the gate and the second storage electrode are located in different layers.

5. The display panel according to claim 4, wherein the second storage electrode is located between the gate and the first connection electrode in a thickness direction of the display panel;

the second storage electrode includes an opening, and the opening overlaps with a portion, connected to the gate in the thickness direction of the display panel, of the first connection electrode.

6. The display panel according to claim 1, wherein the display panel further comprises a first connection layer, wherein the first connection layer includes a second connection electrode; the first drain portion and the drain portion are electrically connected through the second connection electrode; and the second connection electrode, the gate and the second storage electrode are located in different layers.

7. The display panel according to claim 6, wherein the first initialization signal line is located in the first connection layer;

the first transistor further includes a first gate; a portion of a first reset signal line serves as the first gate, and the first reset signal line is arranged in a same layer as the gate;

extending directions of the first reset signal line and the first initialization signal line are approximately same.

8. The display panel according to claim 6, wherein the pixel circuit further includes a second sub-circuit, and the second sub-circuit includes a fourth transistor;

the fourth transistor includes a fourth active pattern, and the fourth active pattern includes a fourth source portion and a fourth drain portion; the fourth source portion and the drain portion are connected to be a one-piece structure, and the fourth drain portion is used to be connected to a light-emitting device.

9. The display panel according to claim 8, wherein the pixel circuit further includes a first sub-circuit, and the first sub-circuit includes a third transistor; the third transistor includes a third active pattern, and the third active pattern includes a third source portion and a third drain portion; the third drain portion and the source portion are connected to be a one-piece structure;

the first connection layer further includes a third connection electrode, and the third source portion and the second storage electrode are electrically connected through the third connection electrode.

10. The display panel according to claim 9, wherein the display panel further comprises a second connection layer, and the first voltage signal line and the data line are located in the second connection layer;

the fourth sub-circuit includes a sixth transistor, and the sixth transistor includes a sixth active pattern; the sixth active pattern is located in a different layer from both the active pattern and the fifth active pattern, and a material of the sixth active pattern includes an oxide semiconductor material;

the first connection layer further includes a first connection electrode; the sixth active pattern includes a sixth source portion and a sixth drain portion; the sixth drain portion is electrically connected to the gate through the first connection electrode, and the sixth source portion is electrically connected to the drain portion; and a layer where the gate is located, a layer where the second storage electrode is located, the first connection layer and the second connection layer are sequentially arranged along a thickness direction of the display panel; the first voltage signal line covers the first connection electrode in the thickness direction of the display panel.

11. The display panel according to claim 9, wherein the fourth transistor further includes a fourth gate, and the third transistor further includes a third gate;

two portions of a same enable signal line serve as the third gate and the fourth gate, respectively, and the enable signal line is arranged in a same layer as the gate; or two portions of two different enable signal lines serve as the third gate and the fourth gate, respectively.

12. The pixel circuit according to claim 9, further comprising:

a plurality of light-emitting devices, the light-emitting device being one of the plurality of light-emitting devices, wherein the pixel circuit further includes a second reset sub-circuit, and the second reset sub-circuit includes a second transistor; the second transistor includes a second active pattern, and the second active pattern includes a second source portion and a second drain portion; the second drain portion and the fourth drain portion are connected to be a one-piece structure; and the first connection layer further includes a second initialization signal line, and the second initialization signal line is electrically connected to the second source portion.

13. The display panel according to claim 12, wherein the second transistor further includes a second gate, and a portion of a second reset signal line serves as the second gate;

extending directions of the second reset signal line and the second initialization signal line are substantially same.

14. The display panel according to claim 12, wherein in two pixel circuits that are adjacent in a column direction, a second gate of a second transistor in a former pixel circuit and a first gate of a first transistor in a latter pixel circuit are connected to a same reset signal line.

15. The display panel according to claim 9, wherein the pixel circuit further includes:

a second reset sub-circuit, wherein the second reset sub-circuit includes a second transistor, and the second transistor includes a second active pattern; the second active pattern includes a second source portion and a second drain portion; the second drain portion and the fourth drain portion are connected to be a one-piece structure, and the second source portion is used to be connected to a third initialization signal line; and a third reset sub-circuit, wherein the third reset sub-circuit includes a tenth transistor, and the tenth transistor includes a tenth active pattern; the tenth active pattern is arranged in a same layer as the second active pattern; the tenth active pattern includes a tenth source portion and a tenth drain portion;

wherein the first connection layer further includes a fourth connection electrode; the tenth drain portion and the third drain portion are electrically connected through the fourth connection electrode, and the tenth source portion is used to be connected to a fourth initialization signal line.

16. The display panel according to claim 15, wherein the display panel further comprises a connection line layer, wherein the third initialization signal line and the fourth initialization signal line are located in the connection line layer, and a layer where the gate is located, a layer where the second storage electrode is located, the connection line layer and the first connection layer are sequentially arranged along a thickness direction of the display panel;

the first connection layer further includes a fifth connection electrode and a sixth connection electrode; the second source portion is electrically connected to the third initialization signal line through the sixth connection electrode, and the tenth source portion is electrically connected to the fourth initialization signal line through the fifth connection electrode.

17. The display panel according to claim 16, wherein the first initialization signal line and the second storage electrode are arranged in the same layer;

the first connection layer further includes a plurality of seventh connection electrodes and a plurality of eighth connection trances; two first source portions in two adjacent pixel circuits in a same row of pixel circuits are electrically connected to the first initialization signal line through a seventh connection electrode in the plurality of seventh connection electrodes; an extending direction of an eighth connection trace in the plurality of eighth connection trances intersects an extending direction of the seventh connection electrode, and both the seventh connection electrode and the third initialization signal line are electrically connected to the eighth connection trace.

18. The display panel according to claim 15, wherein the second transistor further includes a second gate, and the tenth transistor further includes a tenth gate;

two portions of a same reset signal line serve as the second gate and the tenth gate, respectively, and the reset signal line is in a same layer as the gate.

19. The display panel according to claim 6, wherein the display panel further comprises a shielding layer, wherein the shielding layer is located at a side of the first storage electrode away from the second storage electrode;

the shielding layer includes a first shielding portion and a second shielding portion; the first shielding portion overlaps with the second storage electrode in a thickness direction of the display panel, and the second shielding portion overlaps with a portion, electrically connected to the drain portion in the thickness direction of the display panel, of the second connection electrode.

20. The display panel according to claim 1, wherein two second storage electrodes in two pixel circuits that are adjacent in a row direction are connected by a connection trace, and the connection trace is arranged in a same layer as the two second storage electrodes.

* * * * *